(12) United States Patent
Saitoh et al.

(10) Patent No.: US 11,474,287 B2
(45) Date of Patent: Oct. 18, 2022

(54) OPTICAL ELEMENT

(71) Applicant: FUJIFILM Corporation, Tokyo (JP)

(72) Inventors: Yukito Saitoh, Minami-ashigara (JP);
Hiroshi Sato, Minami-ashigara (JP);
Ayako Muramatsu, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 165 days.

(21) Appl. No.: 17/034,512

(22) Filed: Sep. 28, 2020

(65) Prior Publication Data

US 2021/0026049 A1    Jan. 28, 2021

Related U.S. Application Data

(63) Continuation of application No. PCT/JP2019/013624, filed on Mar. 28, 2019.

(30) Foreign Application Priority Data

Mar. 29, 2018 (JP) .............................. JP2018-064285
Jul. 27, 2018 (JP) .............................. JP2018-141658

(51) Int. Cl.
*G02B 5/18* (2006.01)
*G02B 5/30* (2006.01)
(Continued)

(52) U.S. Cl.
CPC .............. *G02B 5/18* (2013.01); *G02B 5/3016* (2013.01); *G02F 1/116* (2013.01); *G02F 1/1337* (2013.01); *G02F 2201/305* (2013.01)

(58) Field of Classification Search
CPC .......... G02B 5/18; G02B 5/3016; G02F 1/116; G02F 1/1137; G02F 2201/305
USPC ...................................................... 359/569
See application file for complete search history.

(56) References Cited

U.S. PATENT DOCUMENTS

2008/0278675 A1    11/2008   Escuti
2009/0027599 A1    1/2009    Ohgaru et al.
(Continued)

FOREIGN PATENT DOCUMENTS

CN       102967894 A    3/2013
JP       2008-532085 A  8/2008
(Continued)

OTHER PUBLICATIONS

Chinese Office Action and Search Report for corresponding Chinese Application No. 201980022936.5, dated Oct. 27, 2021, with an English translation.

(Continued)

*Primary Examiner* — Edward J Glick
*Assistant Examiner* — William D Peterson
(74) *Attorney, Agent, or Firm* — Birch, Stewart, Kolasch & Birch, LLP

(57) ABSTRACT

Provided is an optical element with which a high diffraction efficiency can be obtained with a simple configuration. The optical element includes: an optically-anisotropic layer that is formed using a composition including a liquid crystal compound, in which the optically-anisotropic layer has a liquid crystal alignment pattern in which a direction of an optical axis derived from the liquid crystal compound changes while continuously rotating in at least one in-plane direction, and the optically-anisotropic layer has a region in which an alignment direction of a liquid crystal compound in at least one of upper and lower interfaces has a pre-tilt angle with respect to the interface.

13 Claims, 14 Drawing Sheets

(51) Int. Cl.
*G02F 1/11* (2006.01)
*G02F 1/1337* (2006.01)

(56) References Cited

U.S. PATENT DOCUMENTS

| | | | |
|---|---|---|---|
| 2015/0205182 A1* | 7/2015 | Leister | G02B 26/0808 |
| | | | 349/201 |
| 2016/0011353 A1 | 1/2016 | Escuti et al. | |
| 2016/0033698 A1 | 2/2016 | Escuti et al. | |
| 2017/0373459 A1* | 12/2017 | Weng | G02B 30/25 |
| 2018/0101067 A1 | 4/2018 | Chen et al. | |
| 2018/0143438 A1 | 5/2018 | Oh | |
| 2018/0164480 A1 | 6/2018 | Yoshida | |

FOREIGN PATENT DOCUMENTS

| | | |
|---|---|---|
| JP | 2016-519327 A | 6/2016 |
| JP | 2017-522601 A | 8/2017 |
| WO | WO 2016/194961 A1 | 12/2016 |
| WO | WO 2017/030176 A1 | 2/2017 |
| WO | WO 2017/193441 A1 | 11/2017 |

OTHER PUBLICATIONS

Japanese Notice of Reasons for Refusal for corresponding Japanese Application No. 2020-509325, dated Jul. 6, 2021, with an English translation.
International Preliminary Report on Patentability and Written Opinion of the International Searching Authority (Forms PCT/IB/326, PCT/IB/373 and PCT/ISA/237) for International Application No. PCT/JP2019/013624, dated Oct. 8, 2020, with an English translation.
International Search Report (Form PCT/ISA/210) for International Application No. PCT/JP2019/013624, dated Jun. 18, 2019.
Kobashi et al., "Planar optics with patterned chiral liquid crystals," Nature Photonics, vol. 10, 2016, pp. 389-393, 5 pages total.

* cited by examiner

OPTICAL ELEMENT

CROSS-REFERENCE TO RELATED APPLICATIONS

This application is a Continuation of PCT International Application No. PCT/JP2019/013624 filed on Mar. 28, 2019, which claims priority under 35 U.S.C. § 119(a) to Japanese Patent Application No. 2018-064285, filed on Mar. 29, 2018 and Japanese Patent Application No. 2018-141658, filed on Jul. 27, 2018. Each of the above applications is hereby expressly incorporated by reference, in its entirety, into the present application.

BACKGROUND OF THE INVENTION

1. Field of the Invention

The present invention relates to an optical element that can control a transmission or reflection direction of incidence light.

2. Description of the Related Art

In many optical devices or systems, polarized light is used, and an optical element for controlling transmission, reflection, collection, divergence, or the like is required.

JP2016-519327A discloses a polarization conversion system that includes a geometric phase difference hologram having an anisotropic alignment pattern.

JP2017-522601A discloses a diffractive optical element that is formed by patterning a thin film having optical anisotropy.

Kobashi et al "Planar optics with patterned chiral liquid crystals" Nature Photonics, 2016. 66 (2016) discloses that a wave surface of reflected light can be freely designed by changing a phase of light reflected from cholesteric liquid crystal depending on a phase of a helical structure and by spatially controlling a phase of a helical structure.

SUMMARY OF THE INVENTION

For the element described in JP2017-522601A that changes a liquid crystal alignment pattern in a plane to diffract light, application to an optical member such as an augmented reality (AR) image projection device is expected. However, there is a problem in that, in a case where the diffraction angle increases, the diffraction efficiency decreases, that is, the intensity of diffracted light decreases. JP2017-522601A discloses a method of using a complex layer configuration including multiple layers formed of liquid crystal.

An object of the present invention is to provide an optical element having a simple configuration in which diffracted light having a high diffraction efficiency can be obtained even in a case where the diffraction angle increases.

[1] An optical element comprising:
at least one optically-anisotropic layer that is formed using a composition including a liquid crystal compound,
in which at least one of the optically-anisotropic layers has a liquid crystal alignment pattern in which a direction of an optical axis derived from the liquid crystal compound changes while continuously rotating in at least one in-plane direction, and
the optically-anisotropic layer has a region in which an alignment direction of a liquid crystal compound in at least one of upper and lower interfaces has a pre-tilt angle with respect to the interface.

[2] The optical element according to [1],
in which in the at least one interface, the region having a pre-tilt angle and a region not having a pre-tilt angle are periodically present.

[3] The optical element according to [1] or [2],
in which the optically-anisotropic layer has a region having twisting properties in a thickness direction.

[4] The optical element according to [1] or [2],
in which the liquid crystal compound is cholesterically aligned in a thickness direction.

[5] The optical element according to any one of [1] to [4], comprising:
two or more optically-anisotropic layers having different alignment patterns.

[6] The optical element according to [5],
in which the two or more optically-anisotropic layers have different pre-tilt angles.

[7] The optical element according to [5] or [6],
in which the two or more optically-anisotropic layers have the same tilt orientation with respect to the interface of the optical axis derived from the liquid crystal compound.

[8] The optical element according to [5] or [6],
in which the two or more optically-anisotropic layers have different tilt orientations with respect to the interface of the optical axis derived from the liquid crystal compound.

[9] The optical element according to any one of [5] to [8],
in which the two or more optically-anisotropic layers have different average values of tilt angles in a thickness direction with respect to the interface of the optical axis derived from the liquid crystal compound.

[10] The optical element according to any one of [1] to [9],
in which at least one of the optically-anisotropic layers has a region having different tilt angles of optical axes derived from the liquid crystal compound in a thickness direction.

[11] The optical element according to any one of [1] to [10],
wherein in a case where a length over which the direction of the optical axis derived from the liquid crystal compound rotates by 180° in a plane is set as a single period, at least one of the optically-anisotropic layers has regions having different lengths of the single periods in a plane.

[12] The optical element according to any one of [3] to [11],
in which at least one of the optically-anisotropic layers has a region where a tilt angle of twist in a thickness direction with respect to at least one of interfaces of an equiphase surface and a tilt angle of the optical axis derived from the liquid crystal compound in the thickness direction are different from each other in the thickness direction.

[13] The optical element according to any one of [1] to [12], further comprising:
a patterned alignment film that is laminated on one surface of at least one surface of the optically-anisotropic layer.

An optical element according to an aspect of the present invention is a diffractive optical element comprising: an optically-anisotropic layer that is formed using a composition including a liquid crystal compound, in which the optically-anisotropic layer has a liquid crystal alignment pattern in which a direction of an optical axis derived from the liquid crystal compound changes while continuously rotating in at least one in-plane direction, and the optically-anisotropic layer has a region in which an alignment direction of a liquid crystal compound in at least one of upper and lower interfaces has a pre-tilt angle with respect to the interface. With the above-described configuration, in the optical element according to an aspect of the present invention, diffracted light having a high diffraction efficiency can be obtained.

DESCRIPTION OF THE PREFERRED EMBODIMENTS

Hereinafter, an embodiment of an optical element according to the present invention will be described with reference to the drawings. In each of the drawings, for easy visual recognition, the reduced scale of components is different from the actual scale. In the present specification, numerical ranges represented by "to" include numerical values before and after "to" as lower limit values and upper limit values. In addition, "perpendicular" or "parallel" regarding an angle represents a range of the exact angle ±10°.

Figure 1:
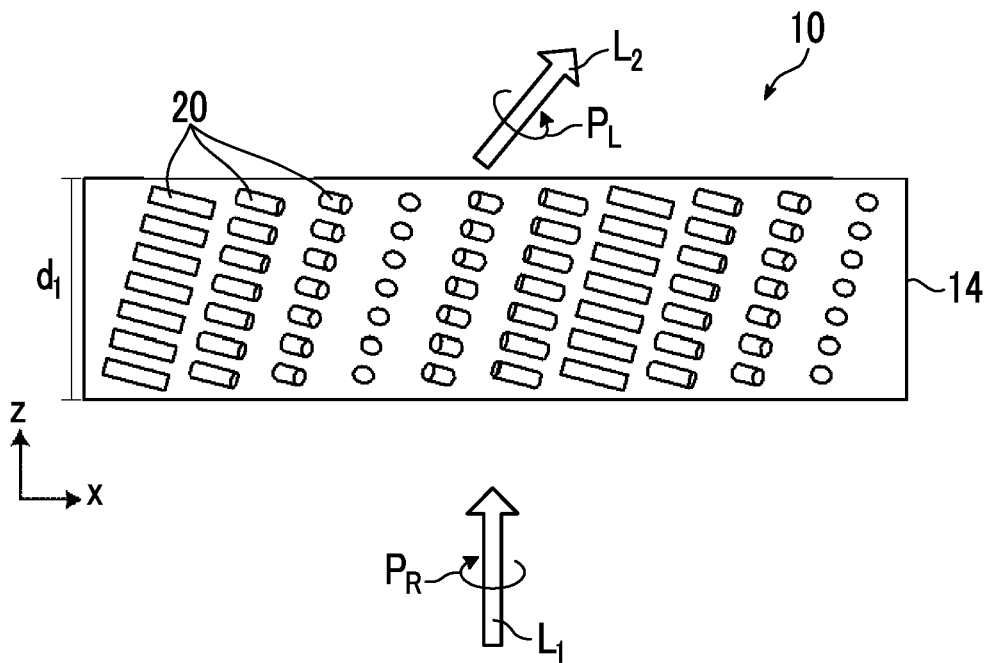
FIG. 1 is a schematic side view showing a liquid crystal alignment pattern in an optically-anisotropic layer of an optical element according to a first embodiment.
Figure 2:
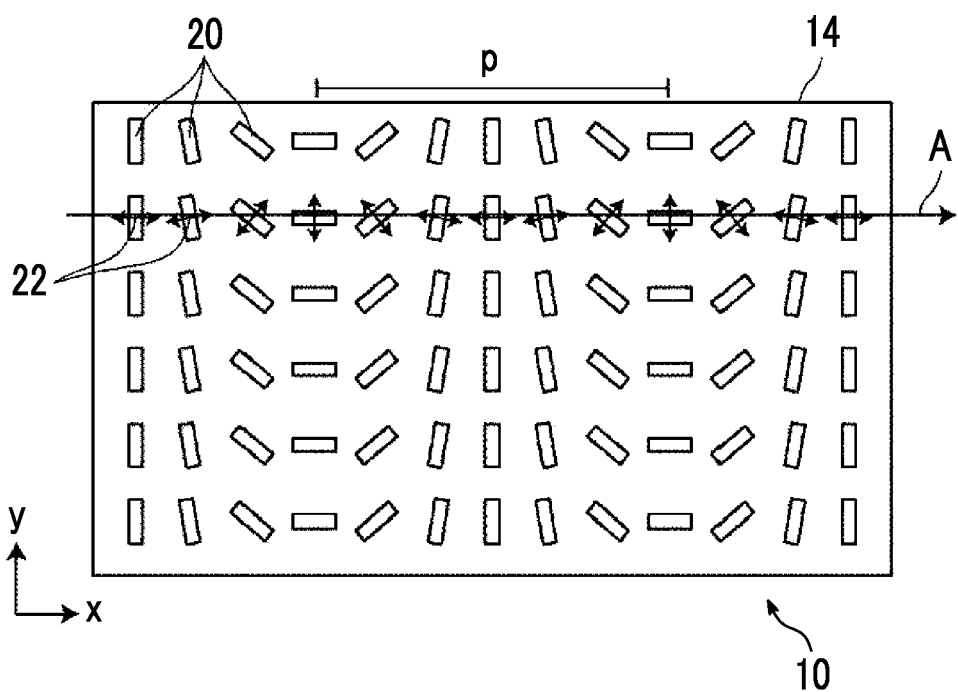
FIG. 2 is a schematic plan view showing the liquid crystal alignment pattern in the optically-anisotropic layer of the optical element according to the first embodiment.

FIG. 1 is a schematic side view showing a liquid crystal alignment pattern in an optical element 10 according to a first embodiment. FIG. 2 is a schematic plan view showing the liquid crystal alignment pattern in the optical element 10 shown in FIG. 1. In the drawing, a sheet plane of the sheet-shaped optical element 10 will be defined as "x-y plane", and a thickness direction will be defined as "z direction".

The optical element 10 includes an optically-anisotropic layer 14 that is a cured layer of a liquid crystal composition including a liquid crystal compound. The optically-anisotropic layer 14 has a liquid crystal alignment pattern in which an optical axis (slow axis) of the liquid crystal compound is arranged in at least one in-plane direction of the optically-anisotropic layer and in which the direction of the optical axis of the liquid crystal compound changes while rotating. The optically-anisotropic layer has a region in which an alignment direction of the liquid crystal compound in at least one of upper and lower interfaces has a pre-tilt angle with respect to the interface. In the following description, the alignment direction of the liquid crystal compound in the optically-anisotropic layer having a pre-tilt angle with respect to the interface will also be referred to as "the optically-anisotropic layer having a pre-tilt angle".

In addition, FIG. 1 shows a configuration in which only the optically-anisotropic layer 14 is provided as the optical element 10. However, the present invention is not limited to this configuration, and another layer may be provided. For example, in an example shown in FIG. 6 below, the optical element 10 may include: an alignment film 13 that is provided on a support 12; and the optically-anisotropic layer 14 that is provided on the alignment film 13.

In the optical element 10 according to the embodiment, a retardation R $(=\Delta n \cdot d_1)$ of the optically-anisotropic layer 14 in the thickness direction (in the drawing, the z direction) with respect to light having the wavelength λ is 0.36λ to 0.64λ. The retardation R is preferably 0.4λ to 0.6λ, more preferably 0.45λ to 0.55λ, and still more preferably 0.5λ. An represents a birefringence of the optically-anisotropic layer 14, and $d_1$ represents a thickness. For example, in a case where light having a wavelength of 550 nm is assumed as incidence light, the retardation R with respect to the light having a wavelength of 550 nm may be in a range of 198 nm to 352 nm and is preferably 275 nm. By having the retardation R, the optically-anisotropic layer 14 exhibits a function as a λ/2 plate, that is, a function of imparting a phase difference of 180° $(=\pi=\lambda/2)$ between linearly polarized light components of incidence light perpendicular to each other.

The optical element 10 according to the embodiment functions a transmission diffraction grating (diffractive optical element). The principle in which the optical element 10 functions as a diffraction grating will be described.

As shown in FIGS. 1 and 2, in the optically-anisotropic layer 14, the liquid crystal compound 20 is obtained by immobilizing a liquid crystal alignment pattern in which an optical axis changes while continuously rotating in one direction (direction along an axis A in FIG. 2) in a plane (in the xy plane). That is, the liquid crystal compound 20 is aligned such that an angle between an in-plane component of the major axis (the axis of extraordinary light: director) of the liquid crystal compound 20 defined as the optical axis 22 of the liquid crystal compound 20 and the axis A changes while rotating.

The liquid crystal alignment pattern in which the direction of the optical axis 22 changes while rotating is a pattern in which the liquid crystal compound 20 is aligned and immobilized such that an angle between the optical axis 22 of the liquid crystal compound 20 arranged along the axis A and the axis A varies depending on positions in the axis A direction and gradually changes from $\phi$ to $\phi+180°$ or $\phi-180°$. In the following description, as shown in FIG. 2, the liquid crystal alignment pattern in which the optical axis of the liquid crystal compound is parallel to a surface of the optically-anisotropic layer and the direction of the optical axis continuously changes while rotating in the in-plane direction in a plurality of local regions (unit regions) that are arranged in the in-plane direction will be referred to as "horizontal rotation alignment", the local region having a configuration where the direction of the optical axis is constant.

"Changing while continuously rotating" may represent that regions the same angle such as 30° rotate to be adjacent to each other in a range of 0° to 180° (=0°) as shown in FIGS. 1 and 2. In a case where the average value of the directions of the optical axes in the unit region changes linearly at a constant ratio, it can be said that the direction of the optical axis gradually changes. However, a change in the slope of the optical axis between regions having different slopes and adjacent to each other in the axis A direction is 45° or less. It is preferable that a change in slope between regions adjacent to each other is as small as possible.

The distance over which an angle between the axis A direction and the axis A of the optical axis 22 changes from $\phi$ to $\phi+180°$ (returning to the original position) is a period p of 180° rotation (hereinafter, referred to as "rotation period p"). It is preferable that the optically-anisotropic layer has a region where the rotation period p of the direction of the optical axis is 0.1 µm to 5 µm in a plane. The rotation period p may be determined depending on a wavelength of incidence light into the optical element and a desired emission angle.

With the above-described configuration of the optically-anisotropic layer 14, the optical element 10 imparts a phase difference of $\lambda/2$ and emits incidence light incident at an incidence angle of 0°, that is, vertically incident light at an emission angle $\theta_2$. That is, as shown in FIG. 1, in a case where light $L_1$ of right circularly polarized light $P_R$ (hereinafter, also referred to as "incidence light $L_1$") is vertically (along the normal line of the plane) incident into a plane of the optically-anisotropic layer 14, light $L_2$ of left circularly polarized light $P_L$ (hereinafter, also referred to as "emitted light $L_2$") having the angle $\theta_2$ with respect to the normal direction is emitted. In the optical element 10, in a case where light having a predetermined wavelength is incident, as the rotation period p of the optically-anisotropic layer 14 decreases, the emission angle of the emitted light $L_2$ increases.

Further, in the optically-anisotropic layer, the optical axis of liquid crystal in at least one of upper and lower interfaces is obliquely aligned, that is, has a pre-tilt angle with respect to a substrate surface. By providing a mechanism of pre-tilting liquid crystal in the interface of the optically-anisotropic layer, the optically-anisotropic layer 14 has a pre-tilt angle with respect to the substrate surface and further has a tilt angle due to the influence of the surface even in a bulk portion distant from the surface. By pre-tilting liquid crystal as described above, in a case where light is diffracted in a $L_2$ direction, the effective birefringence of liquid crystal can be increased, and the diffraction efficiency can be increased.

The pre-tilt angle can be measured by cutting the optically-anisotropic layer with a microtome and observing a cross-section with a polarizing microscope.

In the optically-anisotropic layer, it is preferable that the region having a pre-tilt angle is present on an air interface side or an alignment film side during application to the alignment film, and it is more preferable that the region is present on the alignment film side and the region having a pre-tilt angle and a region not having a pre-tilt angle are periodically present. In the optical element, the optically-anisotropic layer has a region having a pre-tilt angle in at least one interface.

<Optically-Anisotropic Layer>

In order to form the optically-anisotropic layer, the composition including the liquid crystal compound may include other components such as a leveling agent, an alignment controller, a polymerization initiator, or an alignment assistant in addition to the liquid crystal compound. In addition, the polymerizable liquid crystal compound for forming the optically-anisotropic layer may be a rod-shaped liquid crystal compound or a disk-shaped liquid crystal compound.

By forming an alignment film on the support, applying the composition to the alignment film, and curing the applied liquid crystal composition, the optically-anisotropic layer that is formed of the cured layer of the liquid crystal composition is obtained by immobilizing the predetermined liquid crystal alignment pattern can be obtained.

—Rod-Shaped Liquid Crystal Compound—

The rod-like liquid crystal compound used in the present invention may be high molecular weight compound or a low molecular weight compound. In addition, in a case where the rod-shaped liquid crystal compound is immobilized in the optically-anisotropic layer, liquid crystal properties may be lost. Preferable examples of the rod-shaped liquid crystal compound include an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, and an alkenylcyclohexylbenzonitrile compound. As the rod-shaped liquid crystal compound, not only the above-described low molecular weight liquid crystal molecules but also high molecular weight liquid crystal molecules can be used. As the liquid crystal molecules, liquid crystal molecules having a partial structure that may cause a polymerization or crosslinking reaction to occur due to an actinic ray, an electron beam, heat, or the like is suitably used. The number of partial structures is 1 to 6 and preferably 1 to 3. In order to immobilize the alignment state, it is preferable that the rod-shaped liquid crystal material that can be used in the present invention is a polymerizable rod-shaped liquid crystal compound having a polymerizable group. As the polymerizable group, a radically polymerizable unsaturated group or a cationically polymerizable group is preferable. Specific examples of the polymerizable group include a polymerizable group and a polymerizable liquid crystal compound.

Examples of the polymerizable rod-shaped liquid crystal compound that can be used include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO1995/022586, WO1995/024455, WO1997/000600, WO1998/023580, WO1998/052905, JP1989-272551A (JP-H1-272551A), JP1994-016616A (JP-H6-016616A), JP1995-110469A (JP-H7-110469A), JP1999-080081A (JP-H11-080081A), clam 1 of JP1999-513019A (JP-H11-513019A), JP2001-328973A, paragraphs "0064" to "0086" of JP2002-062427A, and paragraphs "0026" to "0098" of JP2005-289880A.

—Disk-Shaped Liquid Crystal Compound—

As the disk-shaped liquid crystal compound, for example, compounds described in JP2007-108732A and JP2010-244038A can be preferably used. In addition, it is preferable that the optically-anisotropic layer exhibits a function of an λ/2 plate with respect to a wide wavelength range and is formed of a liquid crystal material having a reverse birefringence dispersion. In addition, it is also preferable that the optically-anisotropic layer can be made to have a substantially wide wavelength range by imparting a twist component to liquid crystals or by laminating different phase difference layers.

—Other Components—

As the other components such as an alignment controller, a polymerization initiator, or an alignment assistant, well-known materials can be used. In order to form an optically-anisotropic layer according to a second embodiment, a chiral agent for obtaining a cholesteric liquid crystalline phase having a rotation axis in a thickness direction may be added.

(Alignment Controller)

In the present invention, in a case where the liquid crystal composition (hereinafter, also referred to as "composition") is applied to the alignment film, it is preferable that at least one additive (alignment controller) for providing the region having a pre-tilt angle is added to at least one of an alignment film side or an air interface side. By adding the above-described additive to the composition, the region having a pre-tilt angle can be provided in the optically-anisotropic layer.

In the present invention, in a case where the composition is applied to the alignment film, it is preferable that an air interface alignment agent may be added in addition to the liquid crystal compound in order to provide a pre-tilt angle to the air interface side. As a result, the region having a pre-tilt angle can be formed in at least one of upper and lower interfaces of the optically-anisotropic layer. The air interface alignment agent includes: a fluoropolymer (X) including a constitutional unit represented by Formula (A) described below; and a fluoropolymer (Y) having a polar group without having the constitutional unit represented by Formula (A) described below. The air interface alignment agent is suitably used for forming an optically-anisotropic layer included in a phase difference plate described below.

In the present invention, as described above, by mixing the fluoropolymer (X) and the fluoropolymer (Y) with the air interface alignment agent, thickness unevenness of the formed optically-anisotropic layer can be suppressed, and the pre-tilt angle can be controlled.

Although the details are not clear, it is presumed that, by inserting the rod-shaped liquid crystal compound between fluoropolymers (X) arranged at a regular interval, the pre-tilt angle of the optically-anisotropic layer after polymerization can be controlled. In addition, it is presumed that the fluoropolymer (Y) holds the arrangement of the fluoropolymers (X) such that thickness unevenness of the formed optically-anisotropic layer can be suppressed.

In the present invention, it is preferable that the air interface alignment agent included in the composition includes at least: a fluoropolymer (X) including a constitutional unit represented by Formula (A) described below; and a fluoropolymer (Y) having a polar group without having the constitutional unit represented by Formula (A) described below.

<Fluoropolymer (X)>

The fluoropolymer (X) includes a constitutional unit represented by Formula (A) described below.

(In Formula (A), Mp represents a trivalent group forming a part of a polymer main chain, L represents a single bond or a divalent linking group, and X represents a substituted or unsubstituted fused ring functional group.)

In Formula (A), Mp represents a trivalent group forming a part of a polymer main chain.

Preferable examples of Mp include a substituted or unsubstituted long-chain or branched alkylene group having 2 to 20 carbon atoms (not including the number of carbon atoms in a substituent) (for example, an ethylene group, a propylene group, a methyl ethylene group, a butylene group, or a hexylene group), a substituted or unsubstituted cyclic alkylene group having 3 to 10 carbon atoms (for example, a cyclopropylene group, a cyclobutylene group, or a cyclohexylene group), a substituted or unsubstituted vinylene group, a substituted or unsubstituted cyclic vinylene group, a substituted or unsubstituted phenylene group, a group having an oxygen atom (for example, a group having an ether group, an acetal group, an ester group, a carbonate group, or the like), a group having a nitrogen atom (for example, group having an amino group, an imino group, an amido group, a urethane group, a ureido group, an imido group, an imidazole group, an oxazole group, a pyrrole group, an anilide group, a maleinimide group, or the like), a group having a sulfur atom (for example, a group having a sulfide group, a sulfone group, a thiophene group, or the like), a group having a phosphorus atom (for example, a group having a phosphine group, a phosphate group, or the like), a group having a silicon atom (for example, a group having a siloxane group), a group obtained by linking two or more of the above-described groups, and a group obtained by substituting one hydrogen atom in each of the above-described groups with a -L-X group.

Among these, a substituted or unsubstituted ethylene group, a substituted or unsubstituted methylethylene group, a substituted or unsubstituted cyclohexylene group, or a substituted or unsubstituted vinylene group where one hydrogen atom is substituted with a -L-X group is preferable, a substituted or unsubstituted ethylene group, a substituted or unsubstituted methylethylene group, or a substituted or unsubstituted vinylene group where one hydrogen atom is substituted with a -L-X group is more preferable, and a substituted or unsubstituted ethylene group or a substituted or unsubstituted methylethylene group where one hydrogen atom is substituted with a -L-X group is still more preferable. Specifically, Mp-1 or Mp-2 described below is preferable.

Hereinafter, specific preferable example of Mp will be shown, but Mp is not limited to these examples. In addition, a portion represented by * in Mp represents a portion linked to L.

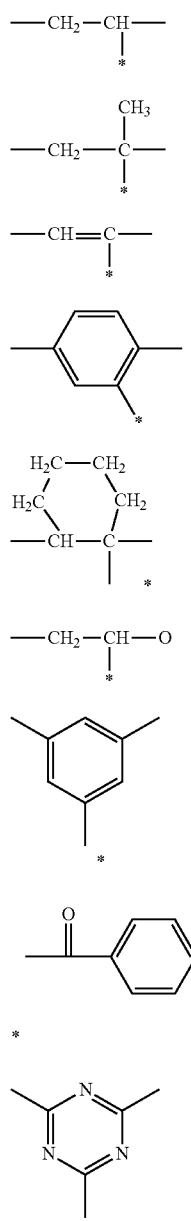

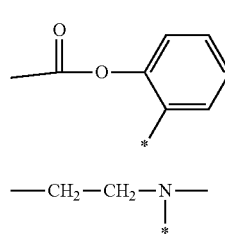

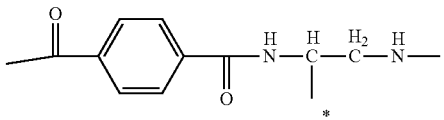

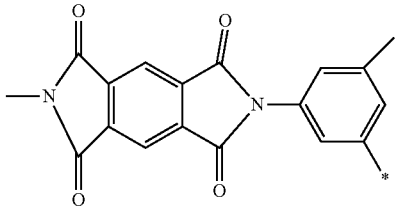

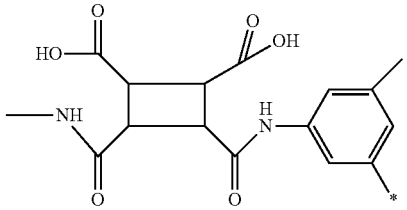

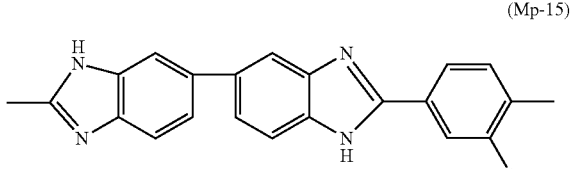

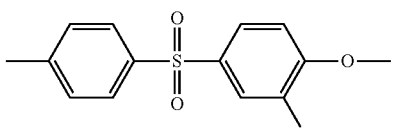

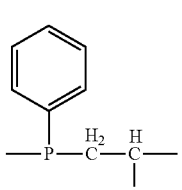

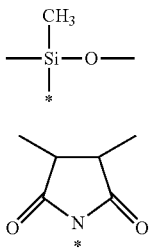

In a case where L (a single bond or a divalent linking group) in Formula (A) represents a divalent linking group, it is preferable that the divalent linking group is a divalent linking group represented by *-L1-L2- (* represents a linking site to a main chain) where L1 represents *—COO—, *—CONH—, *—OCO—, or *—NHCO— and L2 represents an alkylene group having 2 to 20 carbon atoms, a polyoxyalkylene group having 2 to 20 carbon atoms, or a divalent linking group including a combination thereof.

In particular, a linking group where L1 represents *—COO— and L2 represents a polyoxyalkylene group having 2 to 20 carbon atoms is preferable.

The number of rings in the substituted or unsubstituted fused ring functional group represented by Formula (A) is not limited and is preferably 2 to 5. The substituted or unsubstituted fused ring functional group may be a hydrocarbon aromatic fused ring consisting of only carbon atoms as atoms forming the ring, or may be an aromatic fused ring in which heterocycles including heteroatoms as ring-constituting atoms are fused.

In addition, for example, X represents a substituted or unsubstituted indenyl group having 5 to 30 carbon atoms, a substituted or unsubstituted naphthyl group having 6 to 30 carbon atoms, a substituted or unsubstituted fluorenyl group having 12 to 30 carbon atoms, an anthryl group, a pyrenyl group, a perylenyl group, or a phenanthrenyl group.

Among these, X represents preferably a substituted or unsubstituted indenyl group having 5 to 30 carbon atoms or a substituted or unsubstituted naphthyl group having 6 to 30 carbon atoms, more preferably a substituted or unsubstituted naphthyl group having 10 to 30 carbon atoms, and still more preferably a substituted or unsubstituted naphthyl group having 10 to 20 carbon atoms.

Hereinafter, preferable specific examples of the constitutional unit represented by Formula (A) will be shown, but the present invention is not limited thereto.

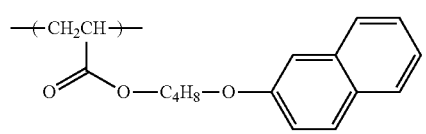
A-1

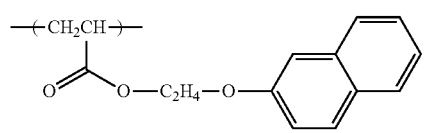
A-2

A-3

A-4

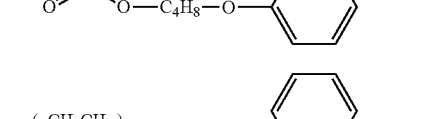
A-5

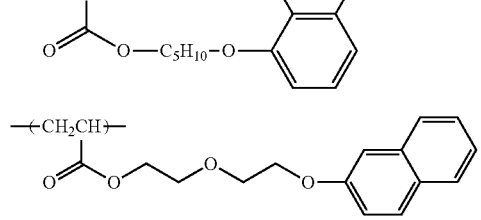
A-6

-continued

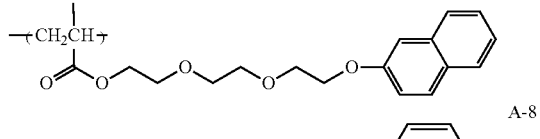
A-7

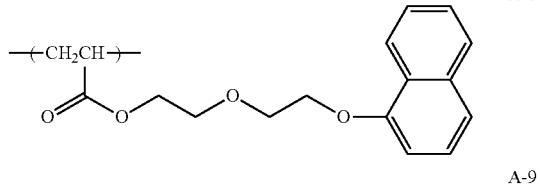
A-8

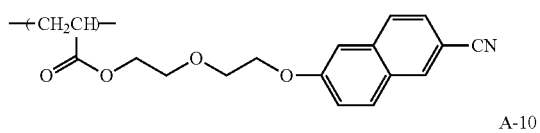
A-9

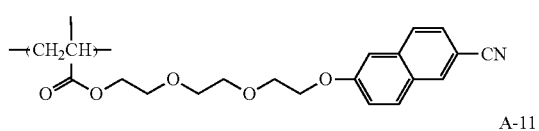
A-10

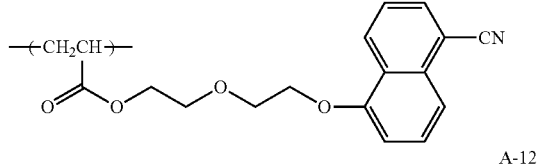
A-11

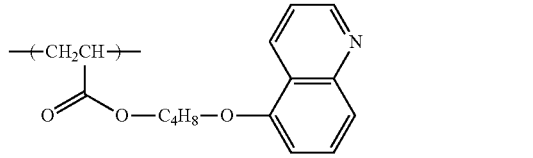
A-12

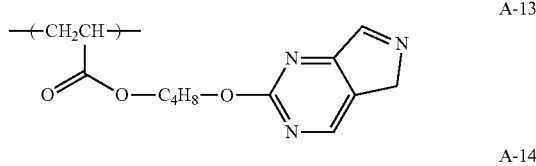
A-13

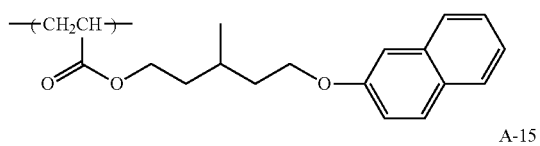
A-14

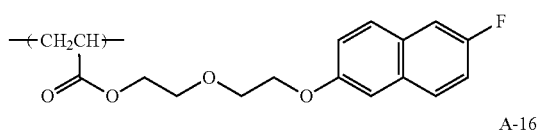
A-15

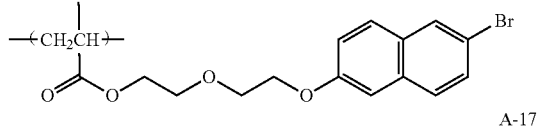
A-16

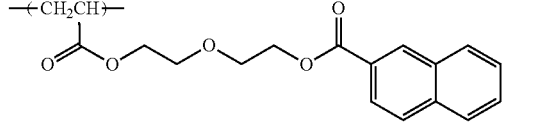
A-17

A-18
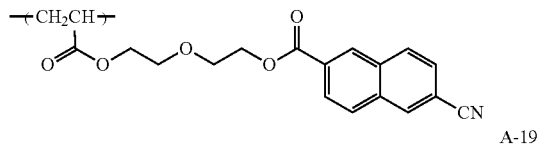

A-19
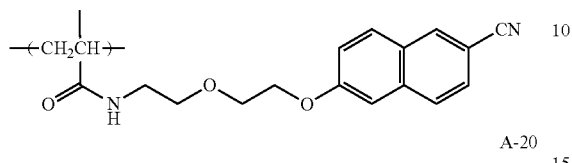

A-20
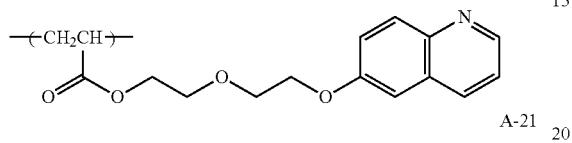

A-21
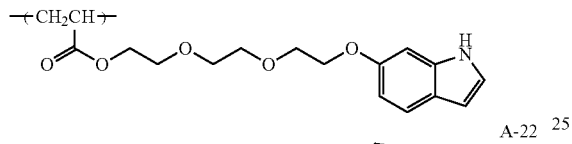

A-22
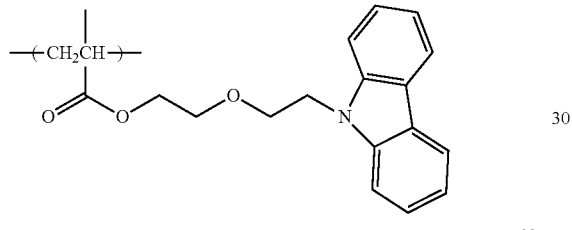

A-23
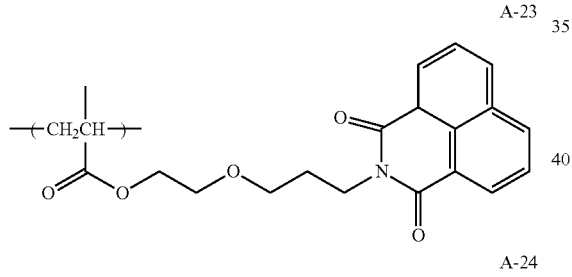

A-24
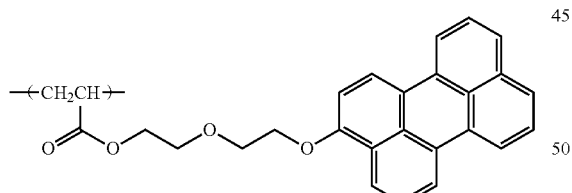

A-25
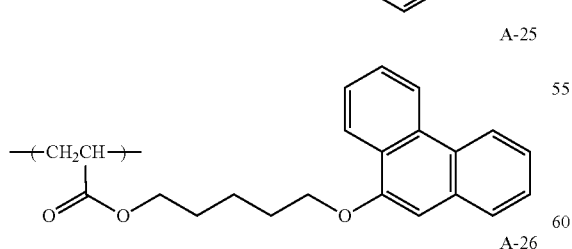

A-26
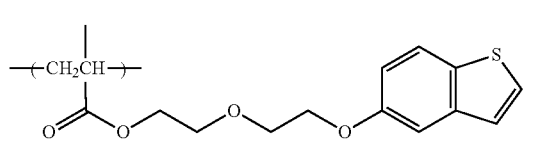

A-27
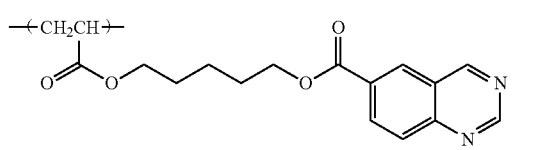

A-28
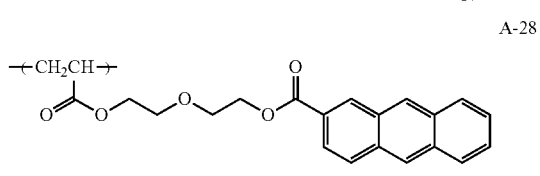

A-29
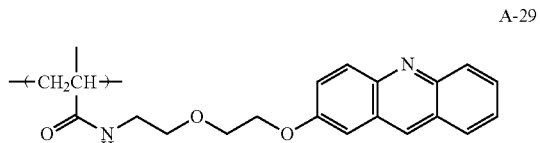

A-30
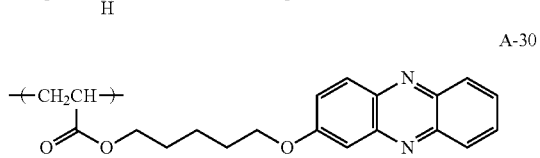

A-31
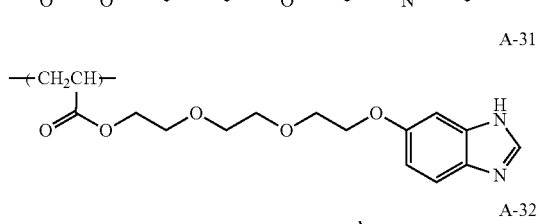

A-32
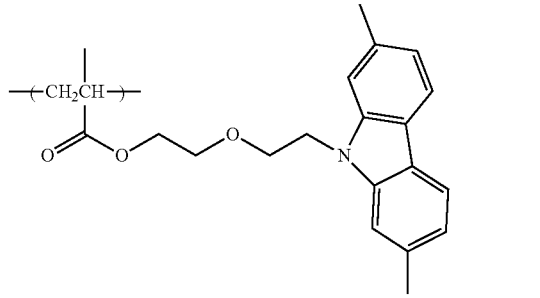

A-33
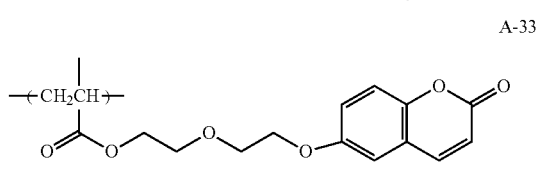

A-34
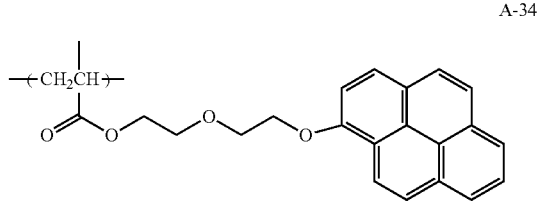

In addition, in addition to the constitutional unit represented by Formula (A), it is preferable that the fluoropolymer (X) includes, for example, a constitutional unit derived from a fluoroaliphatic group-containing monomer, and it is more preferable that the fluoropolymer (X) includes a constitutional unit represented by the following Formula (B).

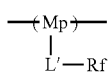

(B)

(In Formula (B), Mp represents a trivalent group forming a part of a polymer main chain, L' represents a single bond or a divalent linking group, and Rf represents a substituent having at least one fluorine atom).

Mp in Formula (B) has the same definition and the same preferable range as Mp in Formula (A).

In a case where L' (a single bond or a divalent linking group) represents a divalent linking group, the divalent linking group is preferably —O—, —NRa11- (where Ra11 represents a hydrogen atom, an aliphatic hydrocarbon group having 1 to 10 carbon atoms, or an aryl group having 6 to 20 carbon atoms), —S—, —C(=O)—, —S(=O)$_2$—, a substituted or unsubstituted alkylene group having 1 to 20 carbon atoms, or and a divalent linking group selected from groups formed by two or more of the above-described groups being linked to each other.

Examples of the divalent linking group formed by two or more of the above-described groups being linked to each other include —C(=O)O—, —OC(=O)—, —OC(=O)O—, —C(=O)NH—, —NHC(=O)—, and —C(=O)O(CH$_2$)maO— (where ma represents an integer of 1 to 20).

Further, in a case where Mp in Formula (B) represents Mp-1 or Mp-2, L' represents —O—, —NRa11- (Ra11 represents preferably a hydrogen atom or an aliphatic hydrocarbon group having 1 to 10 carbon atoms), —S—, —C(=O)—, —S(=O)$_2$—, a substituted or unsubstituted alkylene group having 1 to 20 carbon atoms, or a divalent linking group selected from groups formed by two or more of the above-described groups being linked to each other, and more preferably —O—, —C(=O)O—, —C(=O)NH—, or a divalent linking group consisting of one of the above-described groups and an alkylene group.

Preferable examples of Rf include an aliphatic hydrocarbon group having 1 to 30 carbon atoms in which at least one fluorine atom is substituted (for example, a trifluoroethyl group, a perfluorohexylethyl group, a perfluorohexylpropyl group, a perfluorobutylethyl group, or a perfluorooctylethyl group). In addition, it is preferable that Rf has a CF$_3$ group or a CF$_2$H group at a terminal, and it is more preferable Rf has a CF$_3$ group at a terminal.

It is more preferable that Rf represents an alkyl group having a CF$_3$ group at a terminal or an alkyl group having a CF$_2$H group at a terminal. The alkyl group having a CF$_3$ group at a terminal is an alkyl group in which a part or all of hydrogen atoms in the alkyl group are substituted with fluorine atoms. An alkyl group having a CF$_3$ group at a terminal in which 50% or higher of hydrogen atoms are substituted with fluorine atoms is preferable, an alkyl group having a CF$_3$ group at a terminal in which 60% or higher of hydrogen atoms are substituted with fluorine atoms is more preferable, and an alkyl group having a CF$_3$ group at a terminal in which 70% or higher of hydrogen atoms are substituted with fluorine atoms is still more preferable. The remaining hydrogen atoms may be further substituted with a substituent described below as an example of a substituent group D.

The alkyl group having a CF$_2$H group at a terminal is an alkyl group in which a part or all of hydrogen atoms in the alkyl group are substituted with fluorine atoms. An alkyl group having a CF$_2$H group at a terminal in which 50% or higher of hydrogen atoms are substituted with fluorine atoms is preferable, an alkyl group having a CF$_2$H group at a terminal in which 60% or higher of hydrogen atoms are substituted with fluorine atoms is more preferable, and an alkyl group having a CF$_2$H group at a terminal in which 70% or higher of hydrogen atoms are substituted with fluorine atoms is still more preferable. The remaining hydrogen atoms may be further substituted with a substituent described below as an example of a substituent group D.

Substituent Group D

The substituent group D include an alkyl group (an alkyl group having preferably 1 to 20 carbon atoms (which are carbon atoms in the substituent; hereinafter, the same shall be applied to the substituent group D), more preferably 1 to 12 carbon atoms, and still more preferably 1 to 8 carbon atoms; for example, a methyl group, an ethyl group, an isopropyl group, a tert-butyl group, an n-octyl group, an n-decyl group, an n-hexadecyl group, a cyclopropyl group, a cyclopentyl group, or a cyclohexyl group), an alkenyl group (an alkenyl group having preferably 2 to 20 carbon atoms, more preferably 2 to 12 carbon atoms, and still more preferably 2 to 8 carbon atoms; for example, a vinyl group, a 2-butenyl group, or a 3-pentenyl group), an alkynyl group (an alkynyl group having preferably 2 to 20 carbon atoms, more preferably 2 to 12 carbon atoms, and still more preferably 2 to 8 carbon atoms; for example, a propargyl group or a 3-pentynyl group), a substituted or unsubstituted amino group (an amino group having preferably 0 to 20 carbon atoms, more preferably 0 to 10 carbon atoms, still more preferably 0 to 6 carbon atoms; for example, a unsubstituted amino group, a methylamino group, a dimethylamino group, or a diethylamino group), an alkoxy group (an alkoxy group having preferably 1 to 20 carbon atoms, more preferably 1 to 12 carbon atoms, and still more preferably 1 to 8 carbon atoms; for example, a methoxy group, an ethoxy group, or a butoxy group), an acyl group (an acyl group having preferably 1 to 20 carbon atoms, more preferably 1 to 16 carbon atoms, and still more preferably 1 to 12 carbon atoms; for example, an acetyl group, a formyl group, or a pivaloyl group), an alkoxycarbonyl groups (an alkoxycarbonyl group having preferably 2 to 20 carbon atoms, more preferably 2 to 16 carbon atoms, and still more preferably 2 to 12 carbon atoms; for example, a methoxycarbonyl group or an ethoxycarbonyl group), an acyloxy group (an acyloxy group having preferably 2 to 20 carbon atoms, more preferably 2 to 16 carbon atoms, and still more preferably 2 to 10 carbon atoms; for example, an acetoxy group), an acylamino group (an acylamino group having preferably 2 to 20 carbon atoms, more preferably 2 to 16 carbon atoms, and still more preferably 2 to 10 carbon atoms; for example, an acetylamino group), an alkoxycarbonylamino group (an alkoxycarbonylamino group having preferably 2 to 20 carbon atoms, more preferably 2 to 16 carbon atoms, and still more preferably 2 to 12 carbon atoms; for example, a methoxycarbonylamino group), a sulfonylamino group (a sulfonylamino group having preferably 1 to 20 carbon atoms, more preferably 1 to 16 carbon atoms, and still more preferably 1 to 12 carbon atoms; for example, a methanesulfonylamino group or an ethanesulfonylamino group), a sulfamoyl group (a sulfamoyl group having preferably 0 to 20 carbon atoms, more preferably 0 to 16 carbon atoms, and still more preferably 0 to 12 carbon atoms; for example, a sulfamoyl group, a methylsulfamoyl group, or a dimethylsulfamoyl group), an alkylthio group (an alkylthio group having preferably 1 to 20 carbon atoms, more preferably from 1 to 16 carbon atoms, and still more preferably from 1 to 12 carbon atoms;

for example, a methylthio group or an ethylthio group), a sulfonyl group (a sulfonyl group having preferably 1 to 20 carbon atoms, more preferably from 1 to 16 carbon atoms, and still more preferably from 1 to 12 carbon atoms; for example, a mesyl group or a tosyl group), a sulfinyl group (a sulfinyl group having preferably 1 to 20 carbon atoms, more preferably from 1 to 16 carbon atoms, and still more preferably from 1 to 12 carbon atoms; for example, a methanesulfinyl group or an ethanesulfinyl group), a ureido group (a ureido group having preferably 1 to 20 carbon atoms, more preferably 1 to 16 carbon atoms, and still more preferably 1 to 12 carbon atoms; for example, an unsubstituted ureido group or a methylureido group), a phosphoric amide group (a phosphoric amide group having preferably 1 to 20 carbon atoms, more preferably 1 to 16 carbon atoms, and still more preferably 1 to 12 carbon atoms; for example, a diethylphosphoric amide group), a hydroxy group, a mercapto group, a halogen atom (for example, a fluorine atom, a chlorine atom, a bromine atom, or an iodine atom), a cyano group, a sulfo group, a carboxyl group, a nitro group, a hydroxamic acid group, a sulfino group, a hydrazino group, an imino group, and a silyl group (a silyl group having preferably from 3 to 40 carbon atoms, more preferably from 3 to 30 carbon atoms, and still more preferably from 3 to 24 carbon atoms; for example, trimethylsilyl or triphenylsilyl). The substituents may be further substituted with the substituents. In addition, in a case where two or more substituents are present, the substituents may be the same as or different from each other. In addition, if possible, the substituents may be linked to each other to form a ring.

Examples of the alkyl group having a $CF_3$ group at a terminal or the alkyl group having a $CF_2H$ group at a terminal are as follows.

R1: n-$C_8F_{17}$—
R2: n-$C_6F_{13}$—
R3: n-$C_4F_9$—
R4: n-$C_8F_{17}$—$(CH_2)_2$—
R5: n-$C_6F_{13}$—$(CH_2)_3$—
R6: n-$C_4F_9$—$(CH_2)_2$—
R7: H—$(CF_2)_8$—
R8: H—$(CF_2)_6$—
R9: H—$(CF_2)_4$—
R10: H—$(CF_2)_8$—$(CH_2)_2$—
R11: H—$(CF_2)_6$—$(CH_2)_3$—
R12: H—$(CF_2)_4$—$(CH_2)_2$—
R13: n-$C_7F_{15}$—$(CH_2)_2$—
R14: n-$C_6F_{13}$—$(CH_2)_3$—
R15: n-$C_4F_9$—$(CH_2)_2$—

Hereinafter, specific examples of the constitutional unit derived from the fluoroaliphatic group-containing monomer will be shown, but the present invention is not limited thereto.

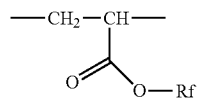

| | |
|---|---|
| Rf=—$CH_2CH_2C_4F_9$ | (B-1) |
| —$CH_2CH_2CH_2C_4F_9$ | (B-2) |
| —$CH_2CH_2C_6F_{13}$ | (B-3) |
| —$CH_2CH_2C_8F_{17}$ | (B-4) |
| —$CH_2CH_2OCH_2CH_2C_4F_9$ | (B-5) |
| —$CH_2CH_2OCH_2CH_2CH_2C_4F_8$ | (B-6) |
| —$CH_2CH_2OCH_2CH_2C_6F_{13}$ | (B-7) |
| —$CH_2CH_2OCH_2CH_2C_8F_{17}$ | (B-8) |
| —$CH_2CH_2C_4F_8H$ | (B-9) |
| —$CH_2CH_2CH_2C_4F_8H$ | (B-10) |
| —$CH_2CH_2C_8F_{12}H$ | (B-11) |
| —$CH_2CH_2C_8F_{16}H$ | (B-12) |
| —$CH_2CH_2OCH_2CH_2C_4F_8H$ | (B-13) |
| —$CH_2CH_2OCH_2CH_2CH_2C_4F_8H$ | (B-14) |
| —$CH_2CH_2OCH_2CH_2C_8F_{12}H$ | (B-15) |
| —$CH_2CH_2OCH_2CH_2C_8F_{16}H$ | (B-16) |
| —$CH_2CH_2OCH_2CH_2C_5F_{10}H$ | (B-17) |

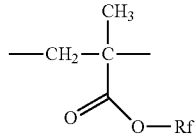

| | |
|---|---|
| Rf=—$CH_2CH_2C_4F_9$ | (B-18) |
| —$CH_2CH_2CH_2C_4F_9$ | (B-19) |
| —$CH_2CH_2C_6F_{13}$ | (B-20) |
| —$CH_2CH_2C_8F_{17}$ | (B-21) |
| —$CH_2CH_2OCH_2CH_2C_4F_9$ | (B-22) |
| —$CH_2CH_2OCH_2CH_2CH_2C_4F_9$ | (B-23) |
| —$CH_2CH_2OCH_2CH_2C_6F_{13}$ | (B-24) |
| —$CH_2CH_2OCH_2CH_2C_8F_{17}$ | (B-25) |
| —$CH_2CH_2C_4F_5H$ | (B-26) |
| —$CH_2CH_2CH_2C_4F_8H$ | (B-27) |
| —$CH_2CH_2C_6F_{12}H$ | (B-28) |
| —$CH_2CH_2C_8F_{16}H$ | (B-29) |
| —$CH_2CH_2OCH_2CH_2C_4F_8H$ | (B-30) |
| —$CH_2CH_2OCH_2CH_2CH_2C_4F_8H$ | (B-31) |
| —$CH_2CH_2OCH_2CH_2C_6F_{12}H$ | (B-32) |
| —$CH_2CH_2OCH_2CH_2C_8F_6H$ | (B-33) |
| —$CH_2CH_2OCH_2CH_2C_5F_{18}H$ | (B-34) |

In addition, in addition to the constitutional unit having the structure represented by Formula (A) and the constitutional unit derived from the fluoroaliphatic group-containing monomer that is represented by Formula (B), the fluoropolymer (X) used in the present invention may include a constitutional unit derived from a monomer that is copolymerizable with the monomer forming the constitutional unit.

The copolymerizable monomer is not particularly limited within a range not departing from the scope of the present invention. As the preferable monomer, for example, from the viewpoint of improving solubility in a solvent or preventing aggregation of a polymer, a monomer forming a hydrocarbon polymer (for example, polyethylene, polypropylene, polystyrene, polymaleimide, polyacrylic acid, polyacrylic acid ester, polyacrylamide, or polyacryl anilide), polyether, polyester, polycarbonate, polyamide, polyamic acid, polyimide, polyurethane, or polyureide can be preferably used.

Further, as the main chain structure, a constitutional unit that is the same as the unit having the group represented by Formula (A) is preferable.

Hereinafter, specific examples of the copolymerizable constitutional unit will be shown, but the present invention is not limited to the following specific examples. In particular, C-2, C-3, C-10, C-11, C-12, or C-19 is preferable, and C-11 or C-19 is more preferable.

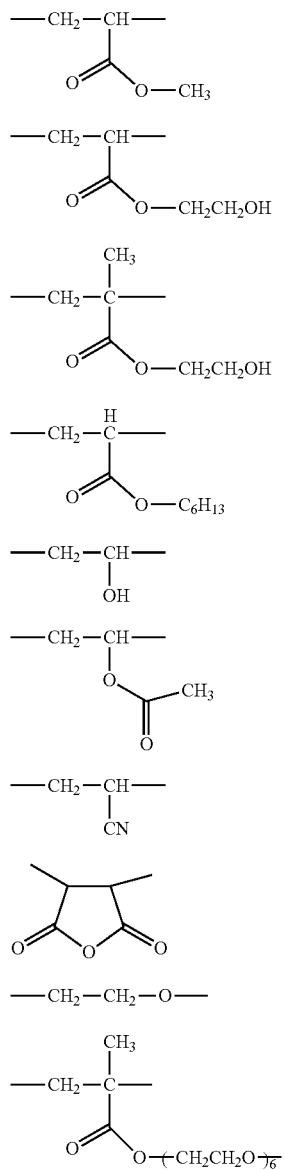
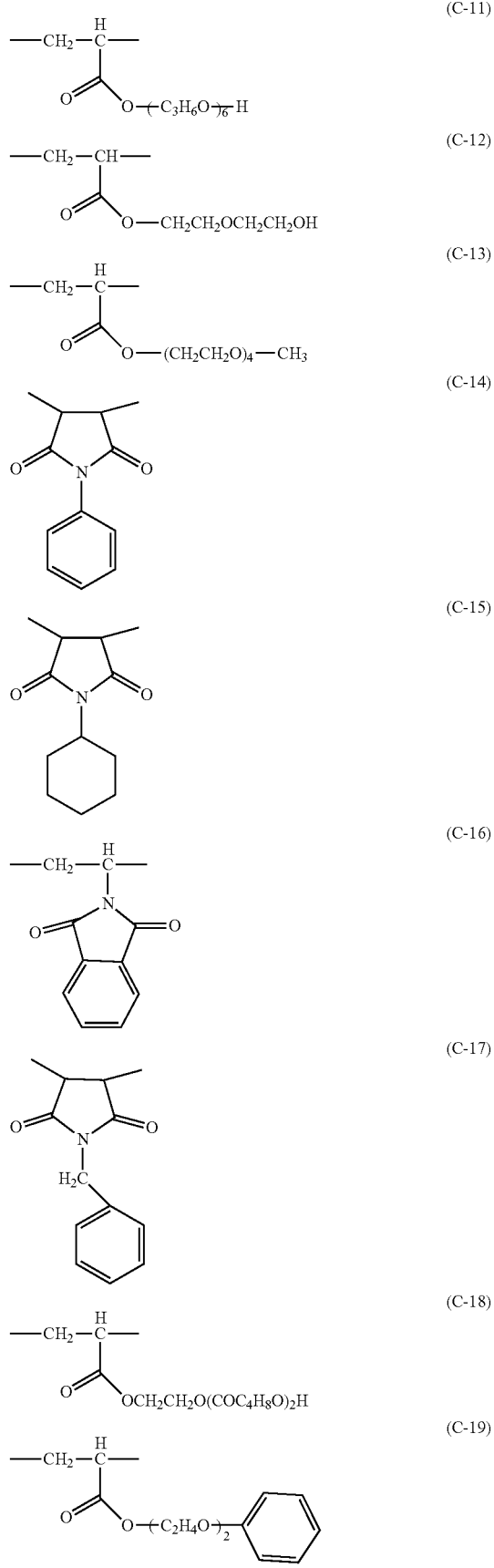

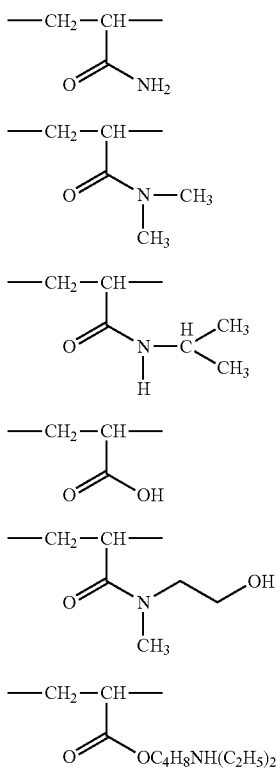

(C-20)
(C-21)
(C-22)
(C-23)
(C-24)
(C-25)

In the fluoropolymer (X), the content of the constitutional unit represented by Formula (A) is preferably 1 mass % to 90 mass % and more preferably 3 mass % to 80 mass %.

In addition, in the fluoropolymer (X), the content of the repeating unit derived from the fluoroaliphatic group-containing monomer (preferably the constitutional unit represented by Formula (B)) is preferably 5 mass % to 90 mass % and more preferably 10 mass % to 80 mass %.

The content of a constitutional unit other than the above-described two constitutional units is preferably 60 mass % or lower and more preferably 50 mass % or lower.

In addition, the fluoropolymer (X) may be a random copolymer into which the respective constitutional units are irregularly introduced or may be a block copolymer into which the respective constitutional units are regularly introduced. In a case where the fluoropolymer (X) is the block copolymer, the block copolymer may be synthesized by introducing the respective constitutional units in any introduction order or by using the same component twice or more.

In addition, as the constitutional unit represented by Formula (A), the constitutional unit represented by Formula (B), or the like, only one kind may be used, or two or more kinds may be used. In a case where two or more constitutional units represented by Formula (A) are included, it is preferable that X represents the same fused ring skeleton (a combination of a substituted group and an unsubstituted group). In a case where two or more constitutional units are included, the content refers to a total content.

Further, the range of the number-average molecular weight (Mn) of the fluoropolymer (X) is preferably 1000 to 1000000, more preferably 3000 to 200000, and still more preferably 5000 to 100000. In addition, a molecular weight distribution (Mw/Mn; Mw represents a weight-average molecular weight) of the polymer used in the present invention is preferably 1 to 4 and more preferably 1.5 to 4.

Here, the number-average molecular weight can be measured as a value in terms of polystyrene (PS) obtained by gel permeation chromatography (GPC).

<Fluoropolymer (Y)>

The fluoropolymer (Y) includes a polar group without including the constitutional unit represented by Formula (A).

Here, the polar group refers to a group having at least one heteroatom or at least one halogen atom, and specific examples thereof include a hydroxyl group, a carbonyl group, a carboxy group, an amino group, a nitro group, an ammonium group, and a cyano group. Among these, a hydroxyl group or a carboxy group is preferable.

In the present invention, it is preferable that the fluoropolymer (Y) includes a constitutional unit represented by the following Formula (C).

(C)

(In Formula (C), Mp represents a trivalent group forming a part of a polymer main chain, L represents a single bond or a divalent linking group, and Y represents a polar group.)

Mp in Formula (C) has the same definition and the same preferable range as Mp in Formula (A). In a case where L" (a single bond or a divalent linking group) in Formula (A) represents a divalent linking group, it is preferable that the divalent linking group is a divalent linking group represented by *-L1-L3- (* represents a linking site to a main chain) where L1 represents *—COO—, *—CONH—, *—COO—, or *—NHCO— and L3 represents an alkylene group having 2 to 20 carbon atoms, a polyoxyalkylene group having 2 to 20 carbon atoms, —C(=O)—, —OC(=O)O—, an aryl group, or a divalent linking group including a combination thereof.

Among these, it is preferable that L" represents a single bond; a divalent linking group where L1 represents *—COO and L3 represents a divalent linking group including a combination of an alkylene group, —OC(=O)O—, and an aryl group; or a divalent linking group where L1 represents *—COO— and L3 represents a polyoxyalkylene group having 2 to 20 carbon atoms.

In addition, examples of the polar group represented by Y in Formula (C) include a hydroxyl group, a carbonyl group, a carboxy group, an amino group, a nitro group, an ammonium group, and a cyano group. Among these, a hydroxyl group, a carboxy group, or a cyano group is preferable.

In addition, as in the fluoropolymer (X), in addition to the constitutional unit represented by Formula (C), it is preferable that the fluoropolymer (Y) includes, for example, a constitutional unit derived from a fluoroaliphatic group-containing monomer, and it is more preferable that the fluoropolymer (X) includes a constitutional unit represented by Formula (B).

Likewise, as in the fluoropolymer (X), in addition to the constitutional unit having the structure represented by Formula (C) and the constitutional unit derived from the fluoroaliphatic group-containing monomer that is represented by Formula (B), the fluoropolymer (Y) may include a constitutional unit derived from a monomer that is copolymerizable with the monomer forming the constitutional unit.

In the fluoropolymer (Y), the content of the constitutional unit represented by Formula (C) is preferably 45 mass % or lower, more preferably 1% to 20 mass %, and still more preferably 2% to 10 mass %.

In addition, in the fluoropolymer (Y), the content of the repeating unit derived from the fluoroaliphatic group-containing monomer (preferably the constitutional unit represented by Formula (B)) is preferably 55 mass % or higher, more preferably 80 mass % to 99 mass % and still more preferably 90 mass % to 98 mass %. The content of a constitutional unit other than the above-described two constitutional units is preferably 60 mass % or lower and more preferably 50 mass % or lower.

In addition, the fluoropolymer (Y) may be a random copolymer into which the respective constitutional units are irregularly introduced or may be a block copolymer into which the respective constitutional units are regularly introduced. In a case where the fluoropolymer (Y) is the block copolymer, the block copolymer may be synthesized by introducing the respective constitutional units in any introduction order or by using the same component twice or more.

In addition, as the constitutional unit represented by Formula (C), the constitutional unit represented by Formula (B), or the like, only one kind may be used, or two or more kinds may be used. In a case where two or more constitutional units represented by Formula (C) are included, it is preferable that Y represents the same polar group. In a case where two or more constitutional units are included, the content refers to a total content.

Further, the range of the weight-average molecular weight of the fluoropolymer (Y) is preferably 10000 to 35000 and more preferably 15000 to 30000.

Here, the weight-average molecular weight can be measured as a value in terms of polystyrene (PS) obtained by gel permeation chromatography (GPC).

(Mass Ratio Between Fluoropolymer (X) and Fluoropolymer (Y) (A:B))

The mass ratio is preferably 98:2 to 2:98, more preferably 98:2 to 55:45, and still more preferably 98:2 to 60:40.

In the present invention, the content of the air interface alignment agent including the fluoropolymer (X) and the fluoropolymer (Y) is preferably 0.2 mass % to 10 mass %, more preferably 0.2 mass % to 5 mass %, and still more preferably 0.2 mass % to 3 mass % with respect to the total solid content of the liquid crystal composition.

[Other Components]

In the present invention, the liquid crystal composition may include components other than the liquid crystal compound and the photo alignment compound.

For example, the liquid crystal composition may include a polymerization initiator.

As the polymerization initiator, for example, a thermal polymerization initiator or a photopolymerization initiator can be used depending on the type of the polymerization reaction. Examples of the photopolymerization initiator include an α-carbonyl compound, acyloin ether, an α-hydrocarbon-substituted aromatic acyloin compound, a polynuclear quinone compound, a combination of a triarylimidazole dimer and p-aminophenyl ketone, acridine, a phenazine compound, and an oxadiazole compound.

The amount of the polymerization initiator used is preferably 0.01% to 20 mass % and more preferably 0.5% to 5 mass % with respect to the total solid content of the composition.

In addition from the viewpoints of the uniformity of the coating film and the strength of the film, the liquid crystal composition may include a polymerizable monomer.

Examples of the polymerizable monomer include a radically polymerizable compound or a cationically polymerizable compound. The polymerizable monomer is preferably a polyfunctional radically polymerizable monomer and is preferably copolymerizable with the disk-shaped liquid crystal compound having the polymerizable group. For example, compounds described in paragraphs "0018" to "0020" in JP2002-296423A can be used.

The addition amount of the polymerizable monomer is preferably 1 to 50 parts by mass and more preferably 5 to 30 parts by mass with respect to 100 parts by mass of the liquid crystal compound.

In addition from the viewpoints of the uniformity of the coating film and the strength of the film, the liquid crystal composition may include a surfactant.

Examples of the surfactant include a well-known compound of the related art. In particular, a fluorine compound is preferable. Specific examples of the surfactant include a compound described in paragraphs "0028" to "0056" of JP2001-330725A and a compound described in paragraphs "0069" to "0126" of JP2003-295212A.

In addition, the liquid crystal composition may include a solvent and preferably an organic solvent. Examples of the organic solvent include amides (for example, N,N-dimethylformamide), sulfoxides (for example, dimethyl sulfoxide), heterocyclic compounds (for example, pyridine), hydrocarbons (for example, benzene, or hexane), alkyl halides (for example, chloroform or dichloromethane), esters (for example, methyl acetate, ethyl acetate, or butyl acetate), ketones (for example, acetone or methyl ethyl ketone), and ethers (for example, tetrahydrofuran or 1,2-dimethoxyethane). Alkyl halide or ketone is preferable. Two or more organic solvents may be used in combination.

(Onium Salt)

In the present invention, in a case where the composition is applied to the alignment film, The liquid crystal compound provides the region having a pre-tilt angle on the alignment film side. Therefore, it is preferable that at least one onium salt is included as the alignment controller. The onium salt contributes to providing a constant pre-tilt angle to molecules of the rod-shaped liquid crystal compound on the aligned film interface side. Examples of the onium salt include an onium salt such as an ammonium salt, a sulfonium salt, or a phosphonium. A quaternary onium salt is preferable, and a quaternary ammonium salt is more preferable.

In general, the quaternary ammonium salt can be obtained by alkylation (Menschutkin reaction), alkenylation, alkynylation, or arylation of a tertiary amine (for example, trimethylamine, triethylamine, tributylamine, triethanolamine, N-methylpyrrolidine, N-methylpiperidine, N,N-dimethylpiperazine, triethylenediamine, or N,N,N',N'-tetramethylethylenediamine) or a nitrogen-containing heterocycle (for example, a pyridine ring, a picoline ring, a 2,2'-bipyridyl ring, a 4,4'-bipyridyl ring, a 1,10-phenanthroline ring, a quinoline ring, an oxazole ring, a thiazole ring, a N-methylimidazole ring, a pyrazine ring, or a tetrazole ring).

As the quaternary ammonium salt, a quaternary ammonium salt consisting of a nitrogen-containing heterocycle is preferable, and a quaternary pyridinium salt is more preferable. More specifically, it is preferable that the quaternary ammonium salt is a quaternary pyridinium salt represented by the following Formula (3a) or Formula (3b).

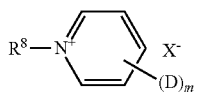

Formula (3a)

In Formula (3a), $R^8$ represents an alkyl group, an alkenyl group, an alkynyl group, an aralkyl group, an aryl group, or a heterocyclic group that is substituted or unsubstituted, D represents a hydrogen-bonding group, m represents an integer of 1 to 3, and $X^-$ represents an anion.

First, Formula (3a) will be described.

As the alkyl group represented by $R^8$, a substituted or unsubstituted alkyl group having 1 to 18 carbon atoms is preferable, and a substituted or unsubstituted alkyl group having 1 to 8 carbon atom is more preferable. The alkyl group may be linear, branched, or cyclic. Examples of the alkyl group include methyl, ethyl, n-propyl, isopropyl, n-butyl, isobutyl, t-butyl, n-hexyl, n-octyl, neopentyl, cyclohexyl, adamantyl, and cyclopropyl.

Examples of a substituent of the alkyl group are as follows: a substituted or unsubstituted alkenyl group (for example, vinyl) having 2 to 18 carbon atoms (preferably 2 to 8 carbon atoms); a substituted or unsubstituted alkynyl group (for example, ethynyl) having 2 to 18 carbon atoms (preferably 2 to 8 carbon atoms); a substituted or unsubstituted aryl group (for example, phenyl or naphthyl) having 6 to 10 carbon atoms; a halogen atom (for example, F, Cl, or Br), a substituted or unsubstituted alkoxy group (for example, methoxy or ethoxy) having 1 to 18 carbon atoms (preferably 1 to 8 carbon atoms); a substituted or unsubstituted aryloxy group (for example, phenoxy, biphenyloxy, or p-methoxyphenoxy) having 6 to 10 carbon atoms; a substituted or unsubstituted alkylthio group (for example, methylthio or ethylthio) having 1 to 18 carbon atoms (preferably 1 to 8 carbon atoms); a substituted or unsubstituted arylthio group (for example, phenylthio) having 6 to 10 carbon atoms; a substituted or unsubstituted acyl group (for example, acetyl or propionyl) having 2 to 18 carbon atoms (preferably 2 to 8 carbon atoms);

a substituted or unsubstituted alkylsulfonyl group or arylsulfonyl group (for example, methanesulfonyl or p-toluenesulfonyl) having 1 to 18 carbon atoms (preferably 1 to 8 carbon atoms); a substituted or unsubstituted acyloxy group (for example, acetoxy or propionyloxy) having 2 to 18 carbon atoms (preferably 2 to 8 carbon atoms); a substituted or unsubstituted alkoxycarbonyl group (for example, methoxycarbonyl or ethoxycarbonyl) having 2 to 18 carbon atoms (preferably 2 to 8 carbon atoms); a substituted or unsubstituted aryloxycarbonyl group (for example, naphthoxycarbonyl) having 7 to 11 carbon atoms; an unsubstituted amino group or a substituted amino group (for example, methylamino, dimethylamino, diethylamino, anilino, methoxyphenylamino, chlorophenylamino, pyridylamino, methoxycarbonylamino, n-butoxycarbonylamino, phenoxycarbonylamino, methylcarbamoylamino, ethylthiocarbamoylamino, phenylcarbamoylamino, acetylamino, ethylcarbonylamino, cyclohexylcarbonylamino, benzoylamino, chloroacetylamino, or methylsulfonylamino) having 1 to 18 carbon atoms (preferably 1 to 8 carbon atoms);

a substituted or unsubstituted carbamoyl group (for example, unsubstituted carbamoyl, methylcarbamoyl, ethylcarbamoyl, n-butylcarbamoyl, t-butylcarbamoyl, dimethylcarbamoyl, morpholinocarbamoyl, or pyrrolidinocarbamoyl) having 1 to 18 carbon atoms (preferably 1 to 8 carbon atoms); an unsubstituted sulfamoyl group or a substituted sulfamoyl group (for example, methylsulfamoyl or phenylsulfamoyl) having 1 to 18 carbon atoms (preferably 1 to 8 carbon atoms); a cyano group; a nitro group; a carboxy group; a hydroxyl group; and a heterocyclic group (for example, an oxazole ring, a benzoxazole ring, a thiazole ring, a benzothiazole ring, an imidazole ring, a benzimidazole ring, an indolenine ring, a pyridine ring, a piperidine ring, a pyrrolidine ring, a morpholine ring, a sulfolane ring, a furan ring, a thiophene ring, a pyrazole ring, a pyrrole ring, a chroman ring, or a coumarin ring). As the substituent of the alkyl group, an aryloxy group, an arylthio group, an arylsulfonyl group, or an aryloxycarbonyl group is preferable.

As the alkenyl group represented by $R^8$, a substituted or unsubstituted alkenyl group having 2 to 18 carbon atoms is preferable, a substituted or unsubstituted alkenyl group having 2 to 8 carbon atom is more preferable, and examples thereof include vinyl, aryl, 1-propenyl, and 1,3-butadienyl. As a substituent of the alkenyl group, the above-described examples of the substituent of the alkyl group are preferable.

As the alkynyl group represented by $R^8$, a substituted or unsubstituted alkynyl group having 2 to 18 carbon atoms is preferable, a substituted or unsubstituted alkynyl group having 2 to 8 carbon atom is more preferable, and examples thereof include ethynyl and 2-propynyl. As a substituent of the alkynyl group, the above-described examples of the substituent of the alkyl group are preferable.

As the aralkyl group represented by $R^8$, a substituted or unsubstituted aralkyl group having 7 to 18 carbon atoms is preferable. For example, benzyl, methylbenzyl, biphenylmethyl, or naphthylmethyl is preferable. Examples of a substituent of the aralkyl group include the above-described examples of the substituent of the alkyl group.

As the aryl group represented by $R^8$, a substituted or unsubstituted aryl group having 6 to 18 carbon atoms is preferable, and examples thereof include phenyl, naphthyl, and fluorenyl. As a substituent of the aryl group, the above-described examples of the substituent of the alkyl group are preferable. In addition, an alkyl group (for example, methyl or ethyl), an alkynyl group, or a benzoyl group is also preferable.

The heterocyclic group represented by R8 is 5- or 6-membered ring saturated or unsaturated heterocycle including a carbon atom, a nitrogen atom, an oxygen atom, or a sulfur atom, and examples thereof include an oxazole ring, a benzoxazole ring, a thiazole ring, a benzothiazole ring, an imidazole ring, a benzimidazole ring, an indolenine ring, a pyridine ring, a piperidine ring, a pyrrolidine ring, a morpholine ring, a sulfolane ring, a furan ring, a thiophene ring, a pyrazole ring, a pyrrole ring, a chroman ring, and a coumarin ring. The heterocyclic group maybe substituted. In this case, as a substituent of the alkyl group, the above-described examples of the substituent of the alkyl group are preferable. As the heterocyclic group represented by R8, a benzoxazole ring or a benzothiazole ring is preferable.

It is preferable that $R^8$ represents an alkyl group, an aralkyl group, an aryl group, or a heterocyclic group that is substituted or unsubstituted.

D represents a hydrogen-bonding group. A hydrogen bond is present between hydrogen atoms that form a covalent bond between an electronegative atom (for example, O, N, F, CO and an electronegative atom. A theoretical explanation for a hydrogen bond is reported in, for example, H. Uneyama and K. Morokuma, Journal of American Chemical Society, Vol 99, pp. 1316 to 1332, 1977. Specific examples of the form of a hydrogen bond include a form shown in FIG. 17, p. 98, Intermolecular Force and Surface Force, J. N.

Israerachiviri, translated by Kondo Tamotsu and Oshima Hiroyuki, McGraw-Hill (1991). Specific examples of the hydrogen bond include examples described in G. R. Desiraju, Angewandte Chemistry International Edition English, Vol. 34, p. 2311, 1995.

Preferable examples of the hydrogen-bonding group include a mercapto group, a hydroxy group, an amino group, a carbonamide group, a sulfonamide group, an acid amido group, an ureido group, a carbamoyl group, a carboxyl group, a sulfo group, a nitrogen-containing heterocyclic group (for example, an imidazolyl group, a benzimidazolyl group, a pyrazolyl group, a pyridyl group, a 1,3,5-triazine group, a pyrimidyl group, a pyridazyl group, a quinolyl group, a benzimidazolyl group, a benzothiazolyl group, a succinimide group, a phthalimido group, a maleimide group, an uracil group, a thiouracil group, a barbituric acid group, a hydantoin group, a maleic hydrazide group, an isatin group, and an uramil group). Preferable examples of the hydrogen-bonding group include an amino group, a carbonamide group, a sulfonamide group, an ureido group, a carbamoyl group, a carboxyl group, a sulfo group, and a pyridyl group. Among these, an amino group, a carbamoyl group, or a pyridyl group is more preferable.

The anion represented by $X^-$ may be an inorganic anion or an organic anion, and examples thereof include a halogen anion (for example, a fluoride ion, a chloride ion, a bromide ion, or an iodide ion), a sulfonate ion (for example, a methanesulfonate ion, a trifluoromethanesulfonate ion, a methyl sulfate ion, a p-toluenesulfonate ion, a p-chlorobenzenesulfonate ion, a 1,3-benzenedisulfonate ion, a 1,5-naphthalenedisulfonate ion, or a 2,6-naphthalenedisulfonate ion), a sulfate ion, a thiocyanate ion, a perchlorate ion, a tetrafluoroborate ion, a picrate ion, an acetate ion, a phosphate ion (for example, a hexafluorophosphate ion), and a hydroxyl ion. It is preferable that $X^-$ represents a halogen anion, a sulfonate ion, or a hydroxyl ion. $X^-$ is not necessarily a monovalent anion and may be a divalent or higher anion. In this case, a ratio between a cation and an anion in the compound is not necessarily 1:1 and may be appropriately determined.

In Formula (3a) m represents preferably 1.

In addition, it is more preferable that the quaternary ammonium salt represented by Formula (3a) is represented by the following Formula (4).

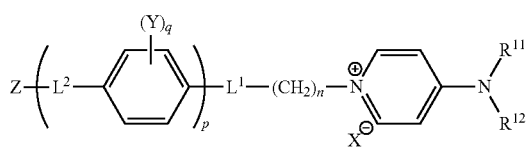

Formula (4)

In Formula (4), $L^1$ and $L^2$ each independently represent a divalent linking group or a single bond.

The divalent linking group is a substituted or unsubstituted alkylene group (for example, a methylene group, an ethylene group, or a 1,4-butylene group) having 1 to 10 carbon atoms, —O—, —C(=O)—, —C(=O)O—, —OC(=O)O—, —S—, —NR'—, —C(=O)NR"—, —S(=O)$_2$—, or a divalent linking group obtained by linking two or more of the above-described groups, and R' and R" represent a hydrogen atom or a substituted or unsubstituted alkyl group. In a case where the divalent linking group is bilaterally asymmetric (for example, —C(=O)O—), linking may be performed in any direction.

Y represents a substituent other than a hydrogen atom substituted with a phenyl group. Examples of the substituent represented by Y include a halogen atom, an alkyl group (including a cycloalkyl group and a bicycloalkyl group), an alkenyl group (including a cycloalkenyl group and a bicycloalkenyl group), an alkynyl group, an aryl group, a heterocyclic group, a cyano group, a hydroxyl group, a nitro group, an alkoxy group, an aryloxy group, an acyloxy group, a carbamoyloxy group, an amino group (including an anilino group), an acylamino group, a sulfamoylamino group, a mercapto group, an alkylthio group, an arylthio group, an acyl group, an aryloxycarbonyl group, an alkoxycarbonyl group, and a carbamoyl group.

$R^{11}$ and $R^{12}$ represent a hydrogen atom, an alkyl group, an aryl group, an acyl group, a carbamoyl group, a hydroxyl group, or an amino group. In addition, $R^{11}$ and $R^{12}$ may be linked to each other to form a ring.

Z represents a hydrogen atom, a substituted or unsubstituted aliphatic hydrocarbon group (for example, an alkyl group having 1 to 30 carbon atoms or an alkenyl group having 2 to 30 carbon atoms), or a substituted or unsubstituted aryl group (for example, a phenyl group having 6 to 30 carbon atoms), n and p represent an integer of 1 to 10, and q represents an integer of 0 to 4. However, in a case where p represents 2 or more, L2's, Y's, and q's included in the repeating units thereof may be the same as or different from each other.

Hereinafter, the preferable quaternary ammonium represented by Formula (4) will be described in detail.

In Formula (4), as the divalent linking group represented by $L^1$, —O— or a single bond is preferable. As the divalent linking group represented by $L^2$, —O—, —C(=O)O—, —OC(=O)O—, or a single bond is preferable.

As the substituent represented by Y in Formula (4), a halogen atom (for example, a fluorine atom, a chlorine atom, a bromine atom, or an iodine atom) or an alkyl group (a linear, branched, or cyclic substituted or unsubstituted alkyl group is preferable, and an alkyl group (preferably an alkyl group having 1 to 30 carbon atoms, for example, methyl, ethyl, n-propyl, isopropyl, t-butyl, n-octyl, 2-chloroethyl, 2-cyanoethyl, or 2-ethylhexyl), an alkoxy group (for example, a methoxy group or an ethoxy group), or a cyano group is more preferable.

In Formula (4), $R^{11}$ and $R^{12}$ represent preferably a substituted or unsubstituted alkyl group and most preferably a methyl group.

In Formula (4), p represents preferably 1 to 5 and more preferably 2 to 4, n represents preferably 1 to 4 and more preferably 1 or 2, and q represents 0 or 1. In a case where p represents 2 or more, it is more preferable that q represents 1 or more in at least one constitutional unit.

Next, Formula (3b) will be described.

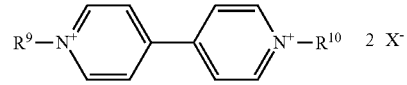

Formula (3b)

In Formula (3b), $R^9$ and $R^{10}$ each independently represents an alkyl group, an alkenyl group, an alkynyl group, an aralkyl group, an aryl group, or a heterocyclic group that is substituted or unsubstituted, and X⁻ represents an anion. The alkyl group, the alkenyl group, the alkynyl group, the aralkyl group, the aryl group, or the heterocyclic group that is substituted or unsubstituted and is represented by each of $R^9$ and $R^{10}$ has the same definition and the same preferable range as the group represented by $R^8$ in Formula (3a). The anion represented by X– has the same definition and the same preferable range as the anion represented by X⁻ in Formula (3a). X⁻ is not necessarily a monovalent anion and may be a divalent or higher anion. In this case, a ratio between a cation and an anion in the compound is not necessarily 1:2 and may be appropriately determined.

Specific examples of the onium salt that can be used in the present invention will be shown below, but the onium salt used in the present invention is not limited to these examples. In the following specific examples, No. II-1 to II-12 are examples of the compound represented by Formula (3b), and No. II-13 to II-32 are examples of the compound represented by Formula (3a).

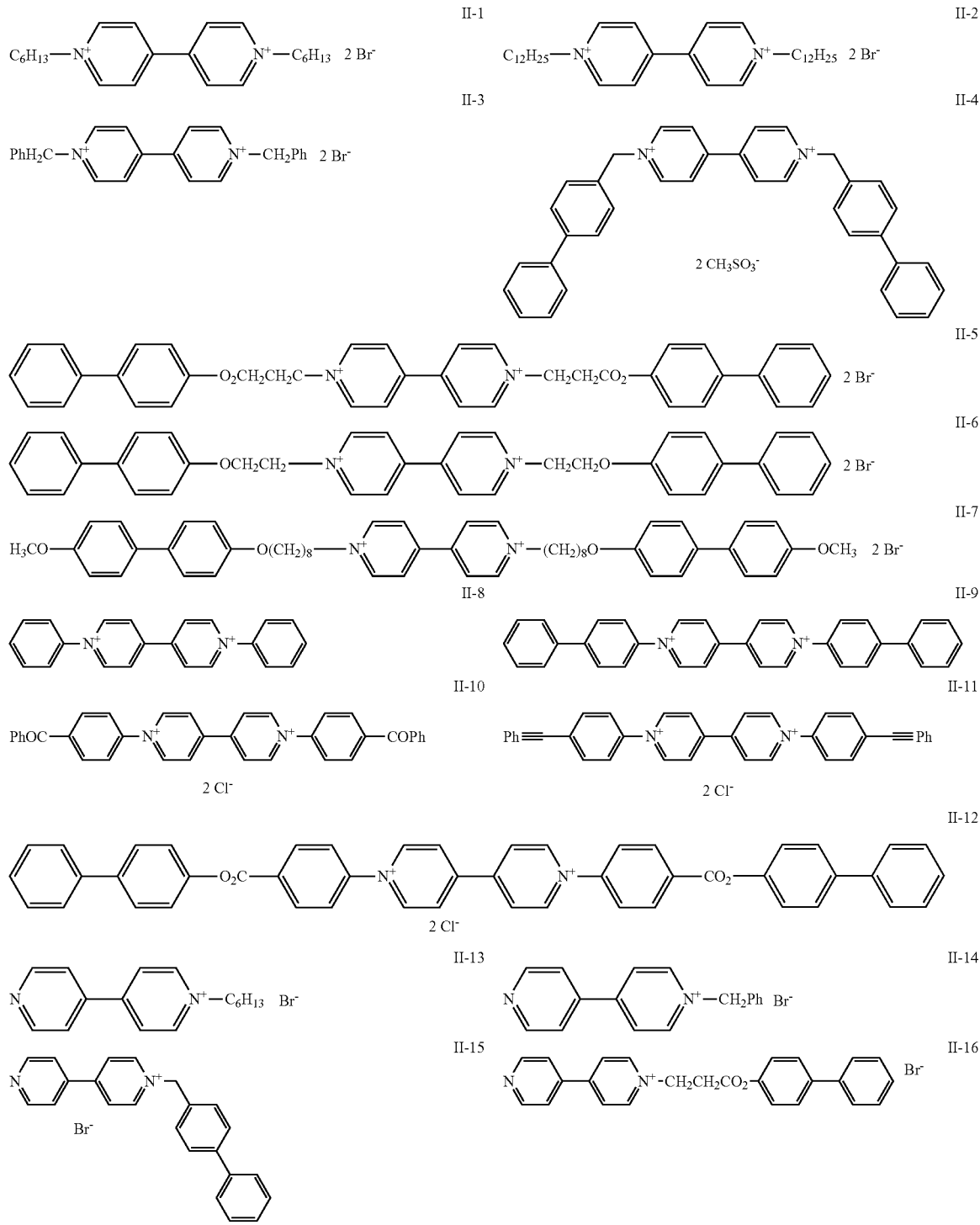

-continued
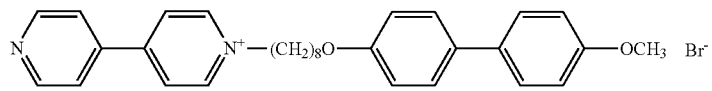 II-17
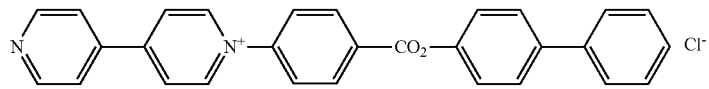 II-18
 II-19 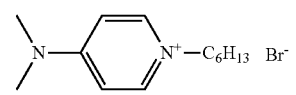 II-20
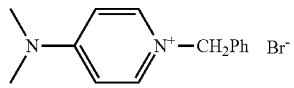 II-21 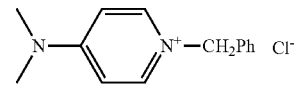 II-22
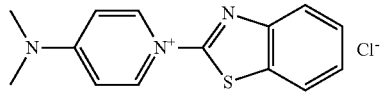 II-23 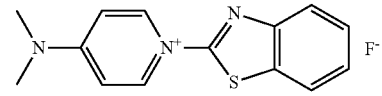 II-24
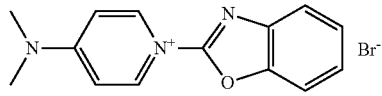 II-25 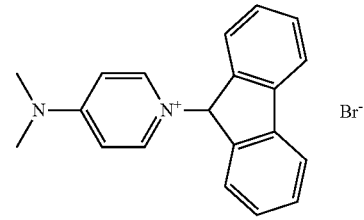 II-26
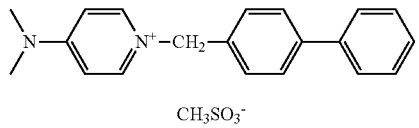 II-27 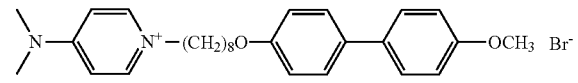 II-28
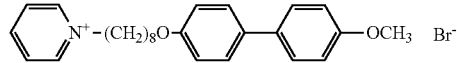 II-29 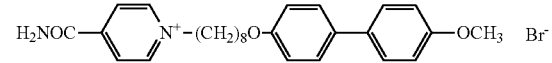 II-30
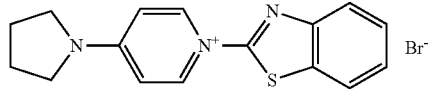 II-31 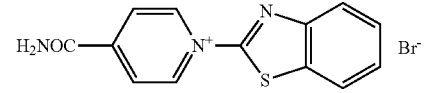 II-32
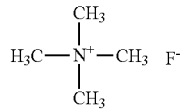 II-33 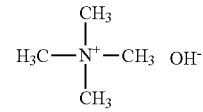 II-34
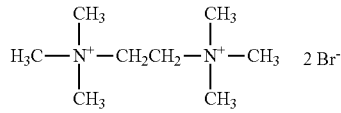 II-35 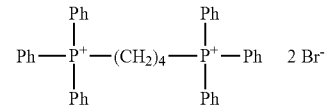 II-36
 II-37 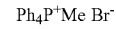 II-38

In addition, quaternary ammonium salts of the following (1) to (60) are also preferable.
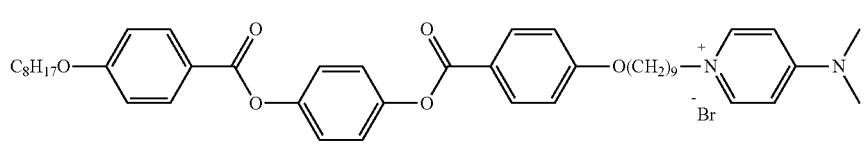 (1)
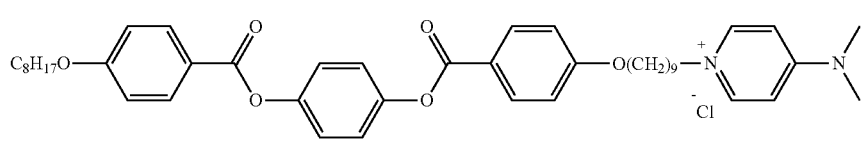 (2)
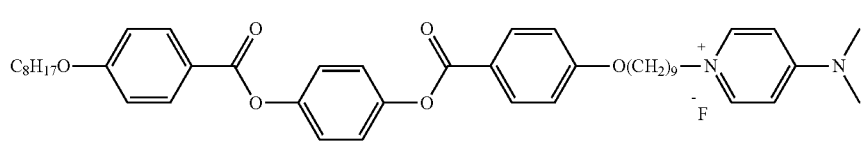 (3)
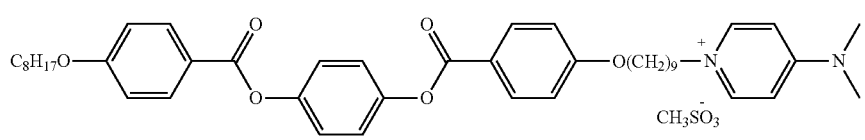 (4)
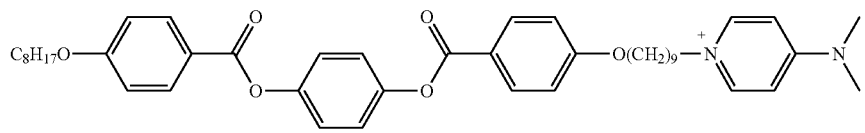 (5)
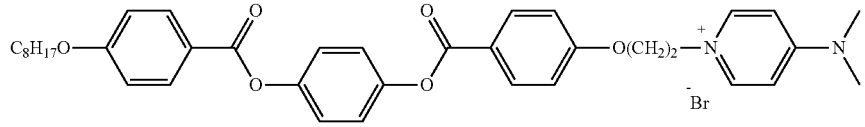 (6)
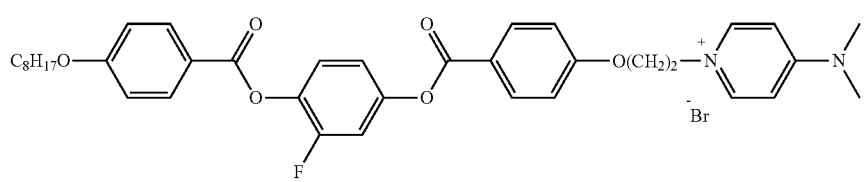 (7)
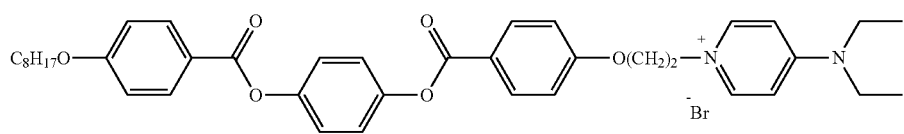 (8)
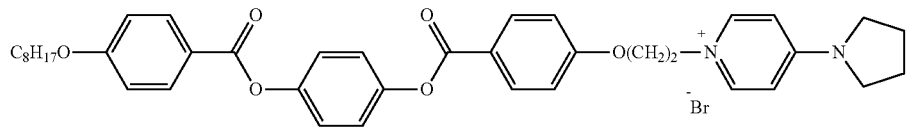 (9)
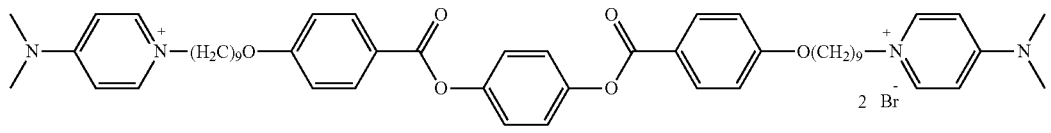 (10)

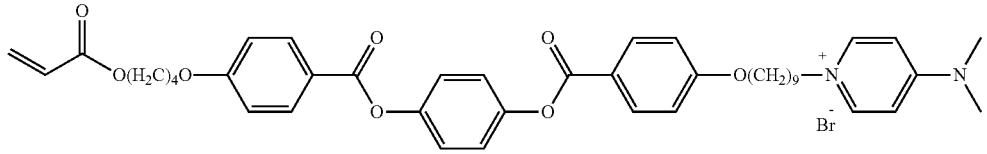
(11)
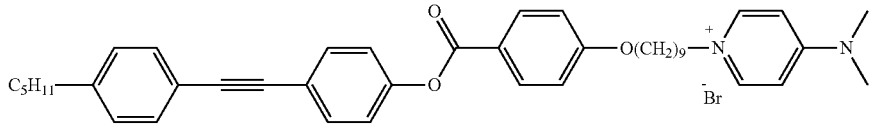
(12)
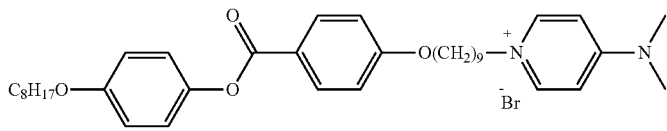
(13)
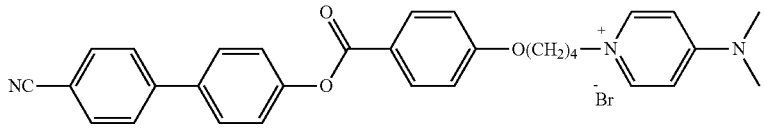
(14)
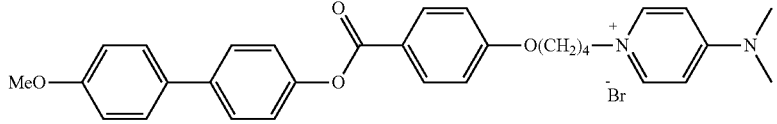
(15)
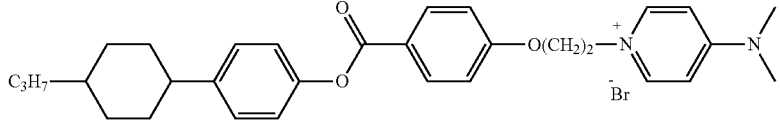
(16)
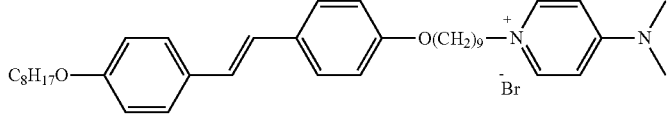
(17)
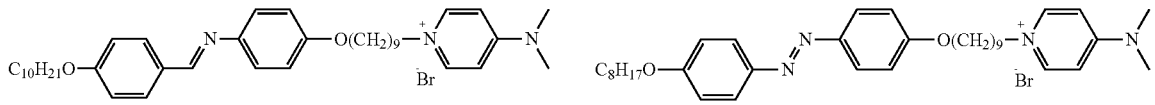
(18) (19)
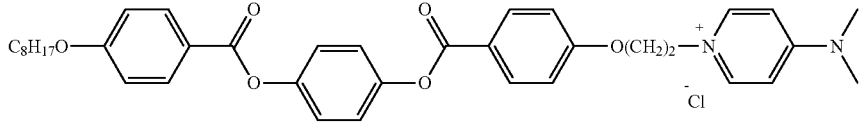
(20)
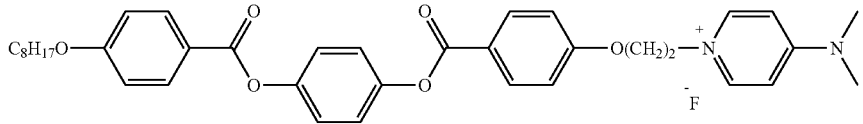
(21)
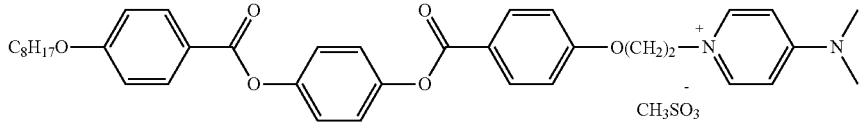
(22)

-continued
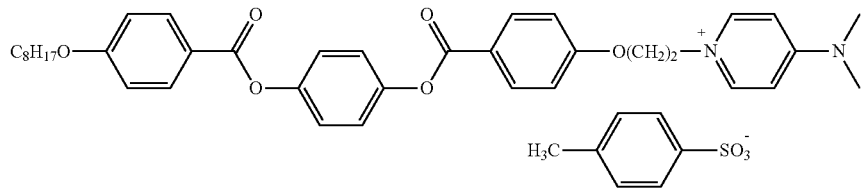
(23)
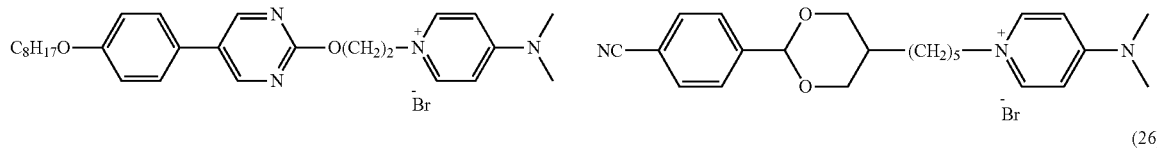
(24) (25)
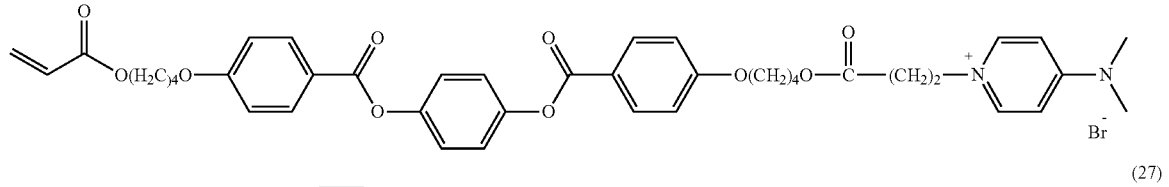
(26)
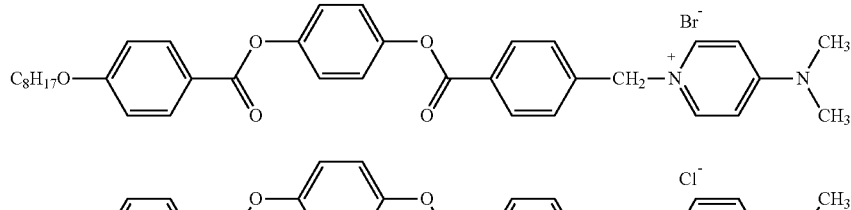
(27)
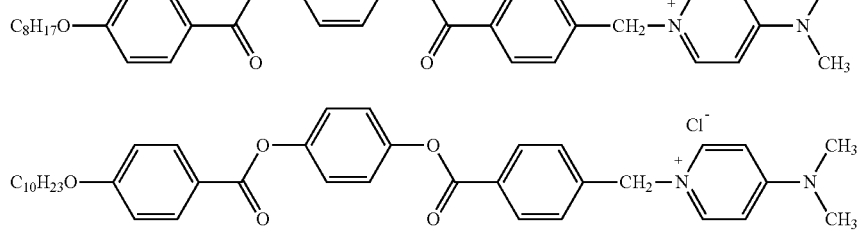
(28)
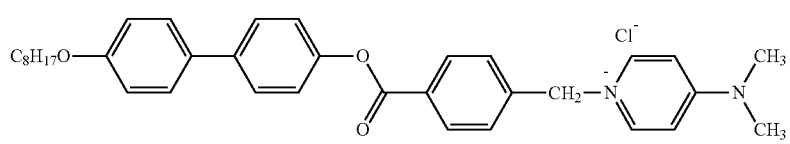
(29)
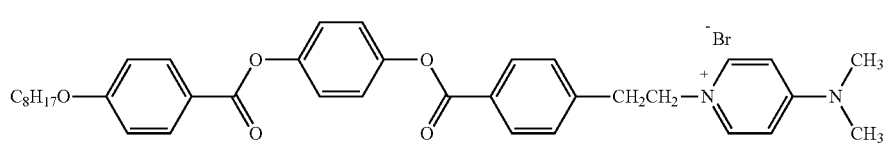
(30)
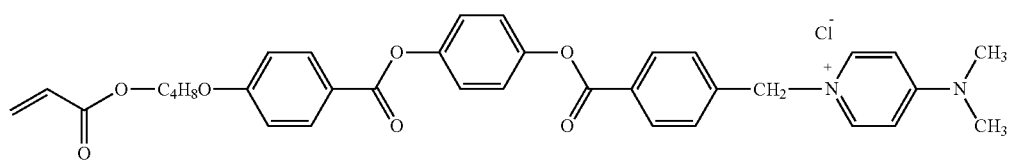
(31)
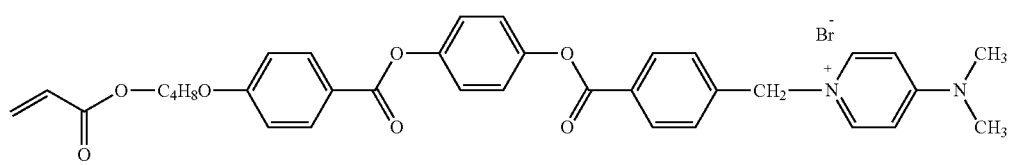
(32)
(33)

-continued
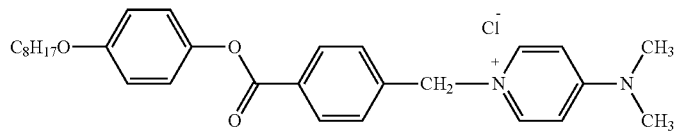
(34)
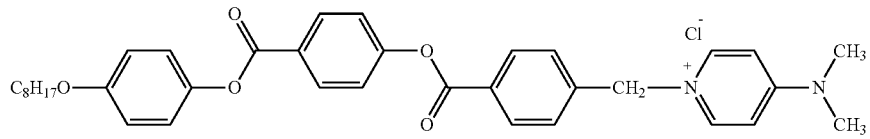
(35)
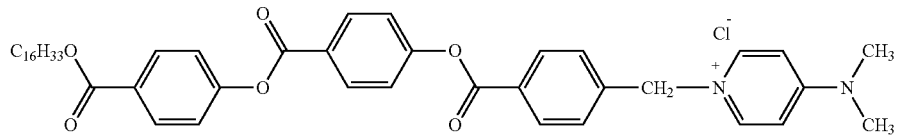
(36)
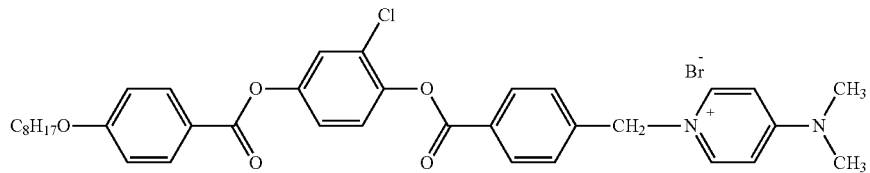
(37)
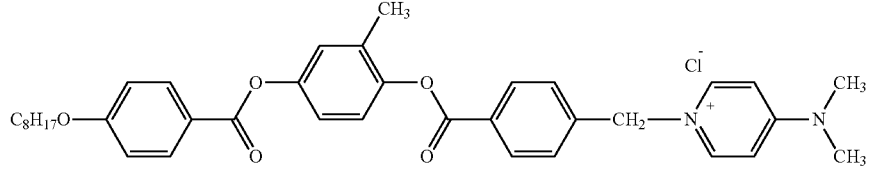
(38)
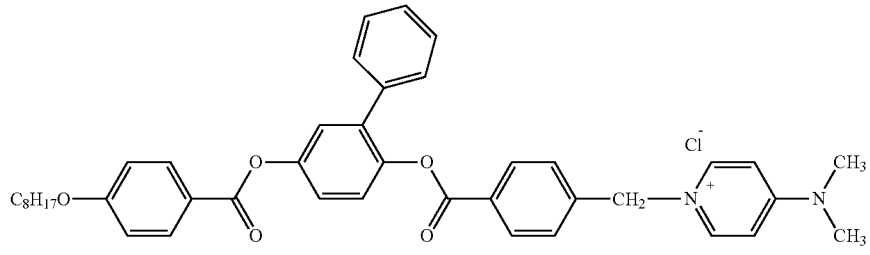
(39)
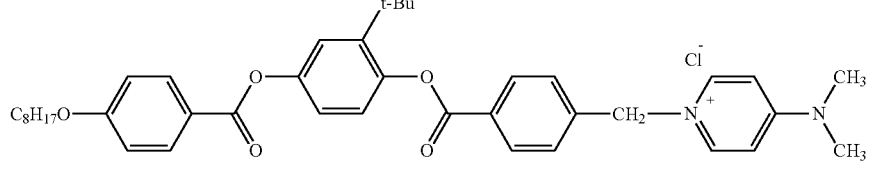
(40)
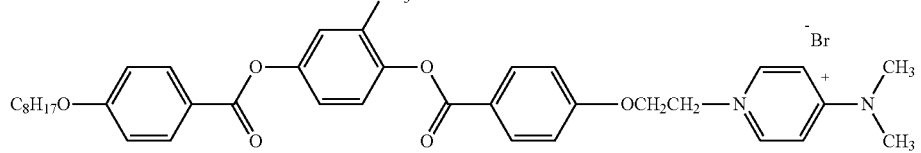
(41)
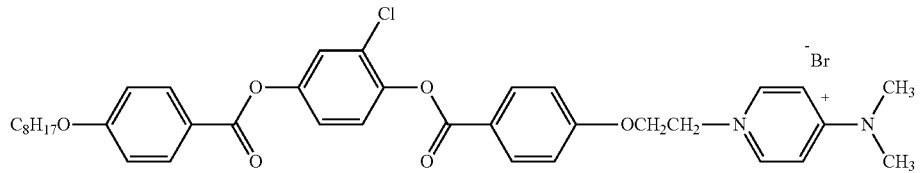
(42)

-continued
(43)
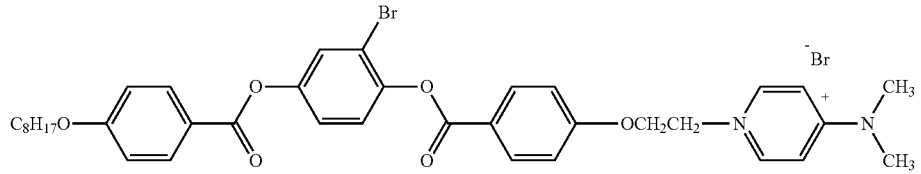
(44)
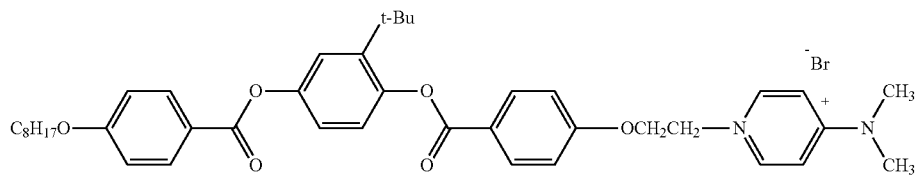
(45)
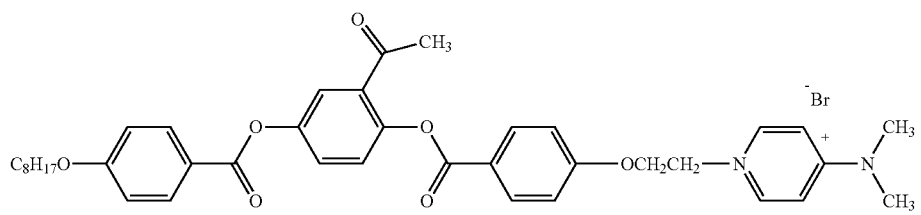
(46)
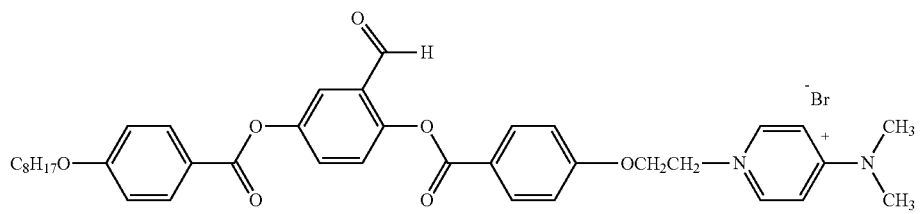
(47)
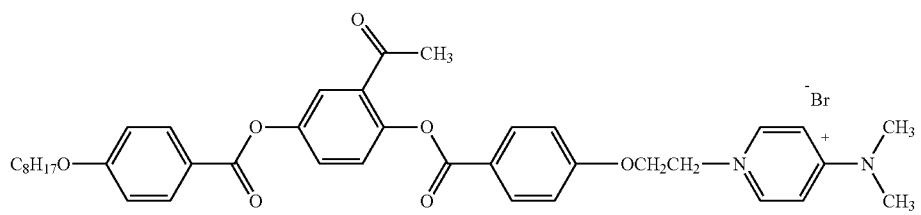
(48)
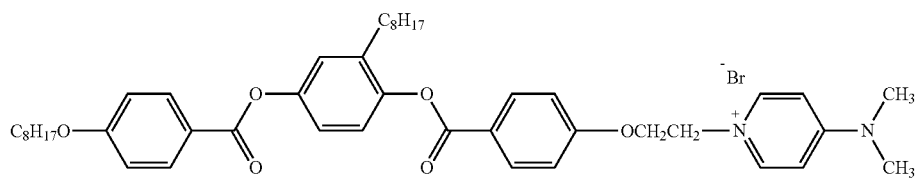
(49)
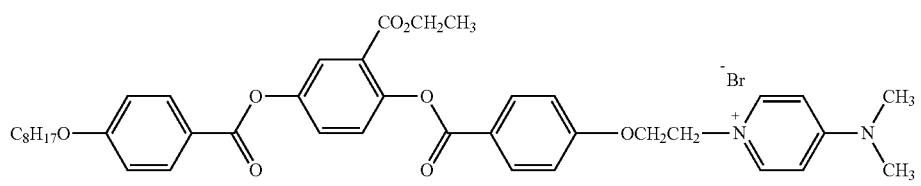
(50)
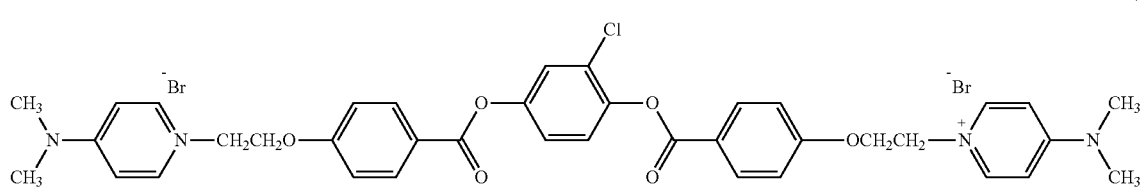

(51)
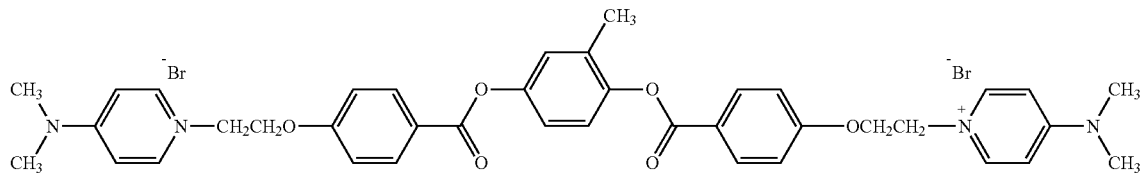
(52)
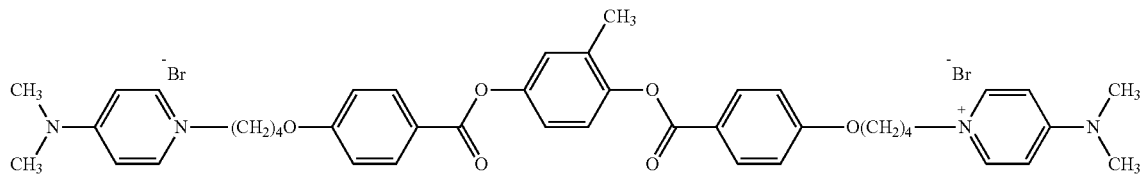
(53)
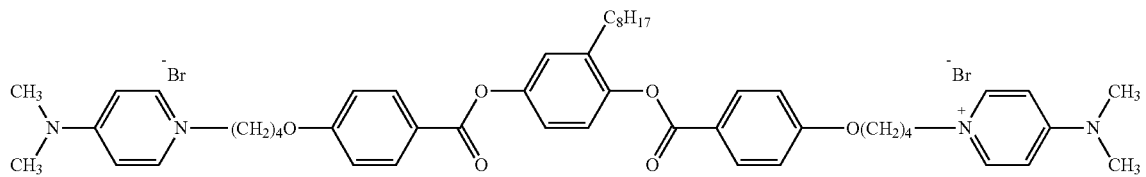
(54)
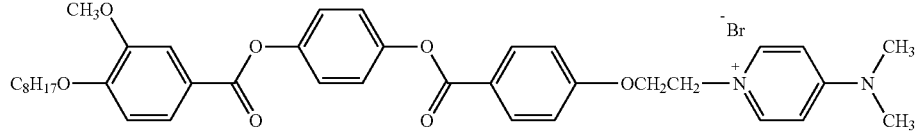
(55)
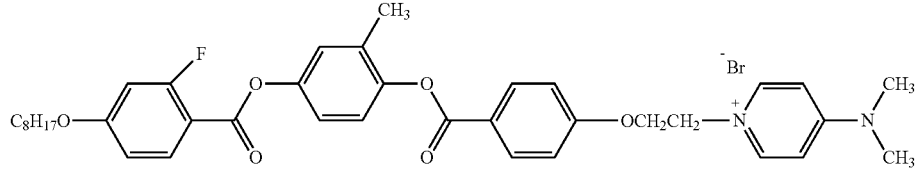
(56)
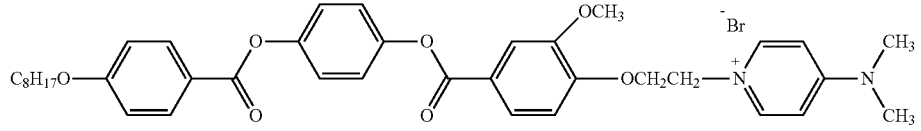
(57)
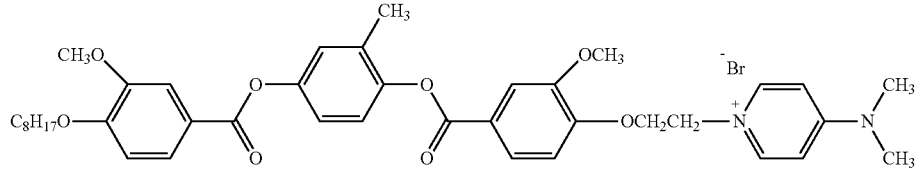
(58)
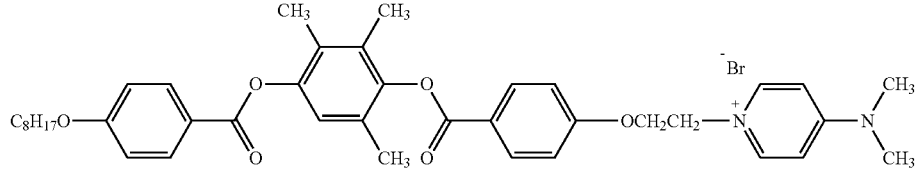

-continued

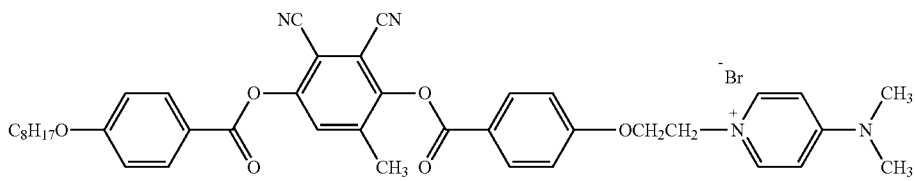

(59)

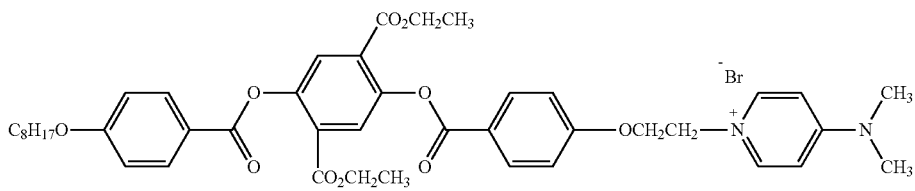

(60)

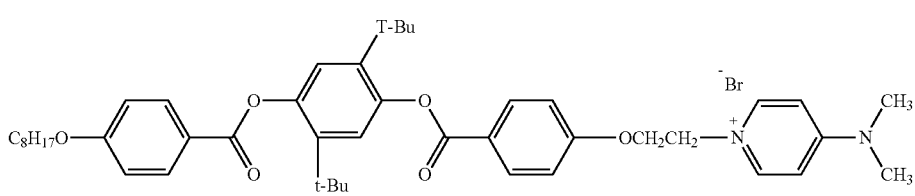

(61)

The pyridinium derivative is obtained by alkylation (Menschutkin reaction) of a pyridine ring.

In the present invention, the preferable content of the onium salt in the composition varies depending on the kind thereof, and typically is preferably 0.01% to 10 mass %, more preferably 0.05% to 7 mass %, and still more preferably 0.05% to 5 mass5 with respect to the content of the rod-shaped liquid crystal compound used in combination. Two or more onium salts may be used. In this case, it is preferable that the total content of all the onium salts to be used is in the above-described range.

—Solvent—

As a solvent of the liquid crystal composition, an organic solvent is preferably used. Examples of the organic solvent include amides (for example, N,N-dimethylformamide), sulfoxides (for example, dimethyl sulfoxide), heterocyclic compounds (for example, pyridine), hydrocarbons (for example, benzene, or hexane), alkyl halides (for example, chloroform or dichloromethane), esters (for example, methyl acetate, or butyl acetate), ketones (for example, acetone, methyl ethyl ketone, or cyclohexanone), and ethers (for example, tetrahydrofuran or 1,2-dimethoxyethane). Alkyl halide or ketone is preferable. Two or more organic solvents may be used in combination.

<Support>

As the support, a transparent support is preferable, and examples thereof include a polyacrylic resin film such as polymethyl methacrylate, a cellulose resin film such as cellulose triacetate, and a cycloolefin polymer film (for example, trade name "ARTON", manufactured by JSR Corporation; or trade name "ZEONOR", manufactured by Zeon Corporation). The support is not limited to a flexible film and may be a non-flexible substrate such as a glass substrate.

<Alignment Film for Forming Optically-Anisotropic Layer>

Examples of the alignment film for forming the optically-anisotropic layer include a rubbed film formed of an organic compound such as a polymer, an obliquely deposited film formed of an inorganic compound, a film having a microgroove, and a film formed by lamination of LB films formed with the Langmuir-Blodgett technique using an organic compound such as ω-tricosanoic acid, dioctadecylmethylammonium chloride, or methyl stearate. As the alignment film, a film formed by rubbing a surface of a polymer layer is preferable. The rubbing treatment is performed by rubbing a surface of a polymer layer with paper or fabric in a given direction multiple times. As the kind of the polymer used for the alignment film, for example, polyimide, polyvinyl alcohol, a polymer having a polymerizable group described in JP1997-152509A (JP-H9-152509A), or a vertical alignment film such as JP2005-097377A, JP2005-099228A, and JP2005-128503A can be preferably used. The vertical alignment film described in the present invention refers to an alignment film in which a major axis of a molecule of the polymerizable rod-shaped liquid crystal compound according to the present invention is aligned to be substantially perpendicular to a rubbing direction of the vertical alignment film. The thickness of the alignment film is not necessarily large as long as it can provide the alignment function, and is preferably 0.01 to 5 μm and more preferably 0.05 to 2 μm.

In addition, a so-called photo-alignment film obtained by irradiating a photo-alignable material with polarized light or non-polarized light can also be used. That is, the photo-alignment film may be prepared by applying the photo-alignable material to the support. The irradiation of polarized light can be performed in a direction perpendicular or oblique to the photo-alignment film, and the irradiation of non-polarized light can be performed in a direction oblique to the photo-alignment film. In particular, in the case of the irradiation from the oblique direction, a pre-tilt angle can be provided to liquid crystal.

Preferable examples of the photo-alignable material used in the photo-alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, polyamide, or ester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A. Among these, an azo compound, a photocrosslinking polyimide, polyamide, ester, a cinnamate compound, or a chalcone compound is more preferable.

In the present invention, the photo-alignment film is preferably used.

Figure 14:
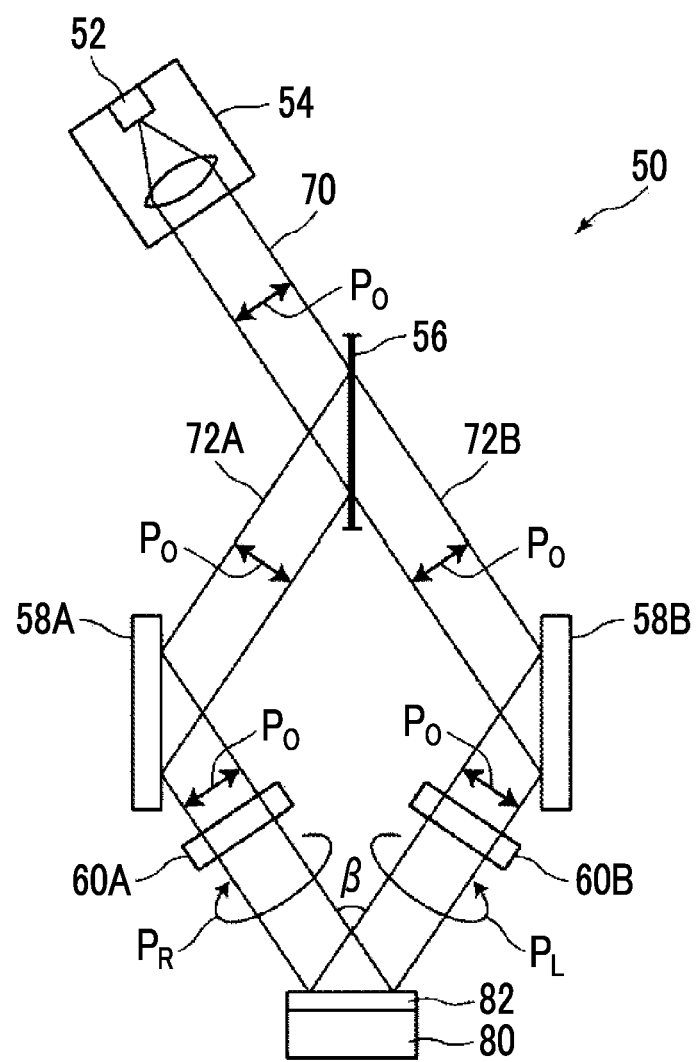
FIG. 14 is a diagram illustrating a schematic configuration of an exposure device that irradiates an alignment film with interference light.

The alignment film is applied to the support, is dried, and is exposed to laser to form the alignment pattern. FIG. 14 is a schematic diagram illustrating an exposure device for the alignment film. An exposure device 50 includes: a light source 54 including a laser 52 and a λ/2 plate (not shown); a polarization beam splitter 56 that splits laser light 70 emitted from the laser 52 (light source 54) into two beams 72A and 72B; mirrors 58A and 58B that are disposed on optical paths of the splitted two beams 72A and 72B; and λ/4 plates 60A and 60B. The λ/4 plates 60A and 60B have optical axes perpendicular to each other, the λ/4 plate 60A converts the linearly polarized light $P_0$ into right circularly polarized light $P_R$, and the λ/4 plate 60B converts the linearly polarized light $P_0$ into left circularly polarized light $P_L$.

Although not shown in the drawing, the light source 54 includes the λ/2 plate, and the λ/2 plate changes a polarization direction of laser light 70 emitted from the laser 52 to emit linearly polarized light $P_0$. The λ/4 plates 60A and 60B have optical axes parallel to each other. The λ/4 plate 60A converts the linearly polarized light $P_0$ (beam 72A) into right circularly polarized light $P_R$, and the λ/4 plate 60B converts the linearly polarized light $P_0$ (beam 72B) into left circularly polarized light $P_L$.

A support 80 including the alignment film 82 on which an alignment pattern is not yet formed is disposed at an exposed portion, the two beams 72A and 72B intersect and interfere each other on an alignment film 82, and the alignment film 82 is irradiated with and exposed to the interference light. Due to the interference at this time, the polarization state of light with which the alignment film 82 is irradiated periodically changes according to interference fringes. As a result, an alignment film 82 (hereinafter, also referred to as "patterned alignment film") having an alignment pattern in which the alignment state changes periodically is obtained. In the exposure device 50, by changing an intersection angle β between the two beams 72A and 72B, the pitch of the alignment pattern can be changed. By forming the optically-anisotropic layer described below on the patterned alignment film having the alignment pattern in which the alignment state periodically changes, the optically-anisotropic layer having the liquid crystal alignment pattern corresponding to the period can be formed.

In addition, by rotating the optical axes of the λ/4 plates 60A and 60B by 90°, respectively, the rotation direction of the optical axis 20 can be reversed.

As described above, the patterned alignment film has a liquid crystal alignment pattern in which the liquid crystal compound is aligned such that the direction of the optical axis of the liquid crystal compound in the optically-anisotropic layer formed on the patterned alignment film changes while continuously rotating in at least one in-plane direction.

In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the in-plane direction.

<Formation of Optically-Anisotropic Layer>

The optically-anisotropic layer can be formed by applying multiple layers of the liquid crystal composition to the patterned alignment film. The application of the multiple layers refers to repetition of the following processes including: preparing a first liquid crystal immobilized layer by applying the liquid crystal composition to the alignment film, heating the liquid crystal composition, cooling the liquid crystal composition, and irradiating the liquid crystal composition with ultraviolet light for curing; and preparing a second or subsequent liquid crystal immobilized layer by applying the liquid crystal composition to the liquid crystal immobilized layer, heating the liquid crystal composition, cooling the liquid crystal composition, and irradiating the liquid crystal composition with ultraviolet light for curing as described above. Even in a case where the optically-anisotropic layer is formed by the application of the multiple layers such that the total thickness of the optically-anisotropic layer is large, the alignment direction of the alignment film can be reflected from a lower surface of the optically-anisotropic layer to an upper surface thereof.

The same forming method can be adopted except that the liquid crystal composition of the optically-anisotropic layer according to the second embodiment is different from that of the optically-anisotropic layer according to the first embodiment.

Figure 3:
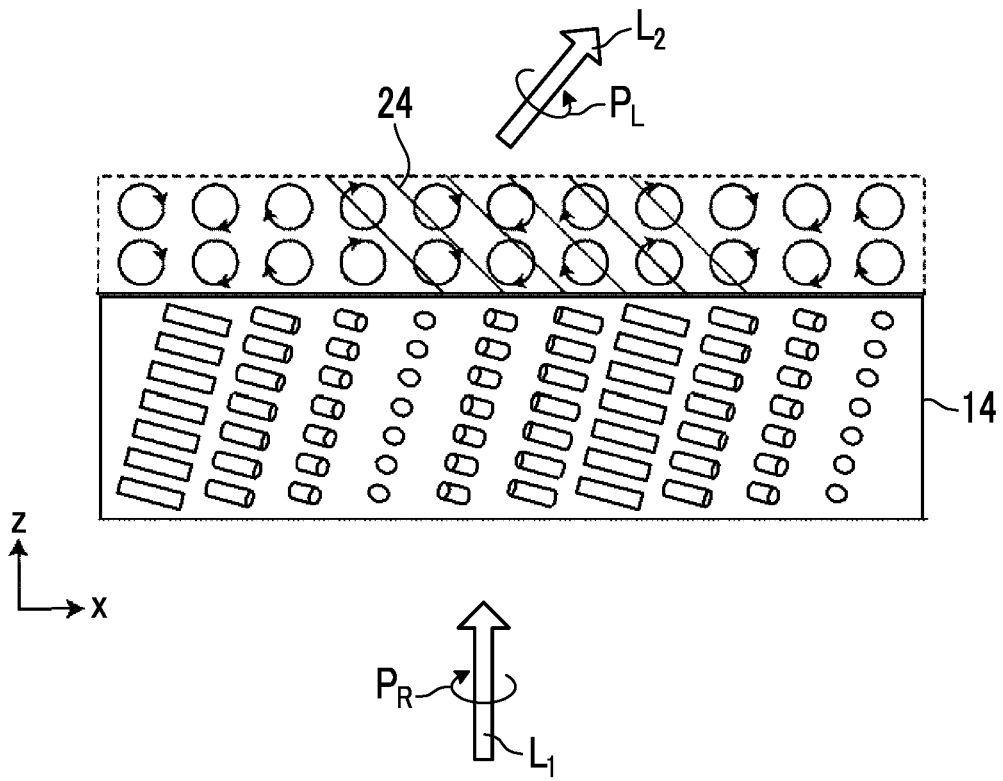
FIG. 3 is a diagram showing a principle in which the optically-anisotropic layer functions as a diffraction grating.

FIG. 3 is a diagram schematically showing the principle in which the incidence light $L_1$ vertically incident into the optical element 10 is emitted at the predetermined emission angle $\theta_2$. Hereinafter, the description will be made with reference to FIG. 3.

First, a case where right circularly polarized light PR having the wavelength λ is used as the incidence light $L_1$ will be described.

The incidence light $L_1$ as the right circularly polarized light $P_R$ transmits through the optically-anisotropic layer 14 to be imparted with a phase difference of λ/2 and is converted into left circularly polarized light $P_L$. In addition, in the optically-anisotropic layer 14, the absolute phase of the incidence light $L_1$ changes due to the optical axis 22 of the liquid crystal compound 20 in each of the regions. Here, the direction of the optical axis 22 of the liquid crystal compound 20 changes while rotating in the axis A direction (in this example, the X-axis direction). Therefore, the amount of change in absolute phase varies depending on the direction of the optical axis 22 of the liquid crystal compound 20 at x coordinates of a plane (x-y plane) of the optically-anisotropic layer 14 into which incidence light is incident. In a region indicated by a broken line in FIG. 3, the state where the amount of change in absolute phase varies depending on x coordinates is schematically shown. As shown in FIG. 3, due to a shift of the absolute phase in a case where light passes through the optically-anisotropic layer 14, an equiphase surface 24 having an absolute phase with an angle with respect to the plane of the optically-anisotropic layer is formed. As a result, a bending force in a direction perpendicular to the equiphase surface 24 is applied to the incidence light $L_1$ incident from the normal direction such that the traveling direction of the incidence light $L_1$ changes. That is, the incidence light $L_1$ as the right circularly polarized light $P_R$ is converted into left circularly polarized light $P_L$ after passing through the optically-anisotropic layer 14, and is emitted from the optically-anisotropic layer 14 as the emitted light $L_2$ that travels in a direction having the angle $\theta_2$ with respect to the normal direction.

As described above, in the optical element 10, the incidence light $L_1$ incident in the normal direction perpendicular to the plane of the optical element 10 is emitted as the emitted light $L_2$ in a direction different from the normal direction.

By changing the rotation period p of the direction of the optical axis in the liquid crystal alignment pattern of the optically-anisotropic layer 14, the slope of the emission angle can be changed. As the rotation period p decreases, a high bending force can be applied to the incidence light, and thus the slope can be increased.

This way, due to the liquid crystal alignment pattern in the optically-anisotropic layer 14, the amount of change in absolute phase can be changed to change a direction of the incidence light.

In the optically-anisotropic layer 14 in which the rotation period p of the direction of the optical axis in the liquid crystal alignment pattern is uniform, a variation (coefficient of variation) CV of the rotation period p is preferably 5% or lower and more preferably 3% or lower.

In a case where the variation of the rotation period p is large, the emission angle of emitted light varies. Therefore, the amount of emitted light in the desired diffraction direction decreases, and a peak having a width appears in the diffraction angle direction, which is not preferable. Accordingly, in a case where the variation of the rotation period p decreases, the amount of emitted light in the desired diffraction direction increases, and the diffraction efficiency only in the desired direction can be improved. Since a relationship between the rotation period and the emission angle is represented by Formula (1) described below, CV can be calculated from the width of the peak of the emission angle.

In addition, as described below, in the present invention, the optically-anisotropic layer has regions having different lengths of the rotation periods p in a plane. In this case, in the region where the rotation period p is uniform, it is preferable that the variation (coefficient of variation) of the rotation period p is in the above-described range.

In a case where the optical element 10 has the liquid crystal alignment pattern of the rotation period p that is uniform only in one direction, the conversion of the incidence light $L_1$ into the emitted light $L_2$ based on the above-described principle can be described as transmission diffraction. The optically-anisotropic layer 14 functions as a transmission diffraction grating with respect to the incidence light $L_1$, and the incidence light $L_1$ vertically incident into the optically-anisotropic layer 14 is transmitted and diffracted as transmitted and diffracted light $L_2$ having a predetermined diffraction angle $\theta_2$. In this case the following Expression (1) that is an general expression for light diffraction is satisfied.

$$n_2 \times \sin\theta_2 - n_1 \times \sin\theta_1 = m \times \lambda/p \qquad \text{Expression (1)}$$

Here, $n_1$ represents a refractive index of a medium 1 on the incidence surface side of a diffraction grating (here, the optically-anisotropic layer), $\theta_1$ represents an incidence angle, $n_2$ represents a refractive index of a medium 2 on the emission surface side of a diffraction grating (here, the optically-anisotropic layer), $\theta_2$ represents a diffraction angle (emission angle), $\lambda$ represents a wavelength, p represents a rotation period, and m represents a diffraction order. Here, conditions are set such that the maximum diffraction efficiency is obtained at m=1. In addition, here, since incidence angle $\theta_1=0°$, Expression (1) is as follows.

$$n_2 \times \sin\theta_2 = \lambda/p \qquad \text{Expression (2)}$$

Further in the first embodiment of the present invention, the optical axis of the liquid crystal compound is obliquely aligned with respect to the substrate surface. That is, by tilting liquid crystal molecules, in a case where light is diffracted, the effective birefringence of the liquid crystal layer (optically-anisotropic layer) can be increased, and the diffraction efficiency can be increased. In this case, although it is difficult to express the mechanism with a simple expression as in the above-described expression, it can be understood that, since light is incident from a direction substantially perpendicular to the major axis of the liquid crystal compound in the L2 direction as shown in FIG. 3, the effect of birefringence for light transmitted through the liquid crystal layer (optically-anisotropic layer) is high.

Figure 4:
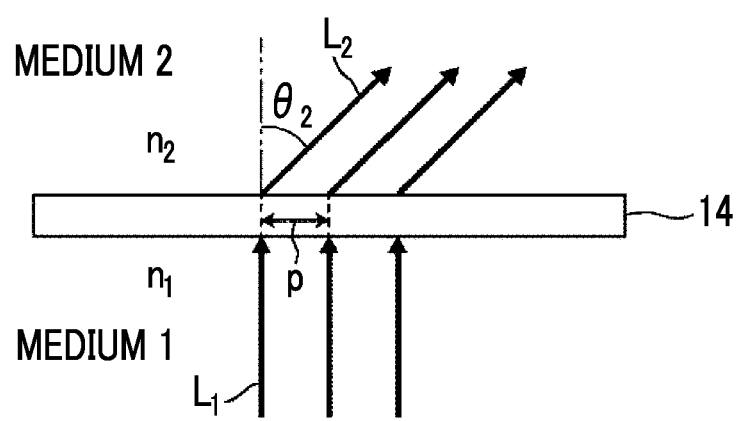
FIG. 4 is a diagram schematically showing a diffraction phenomenon in the first embodiment.

FIG. 4 is a diagram schematically showing the diffraction phenomenon represented by Expression (2).

The optically-anisotropic layer 14 as a diffraction grating is disposed between the medium $n_1$ and the medium $n_2$. The light $L_1$ incident from the medium 1 side having a refractive index $n_1$ into the optically-anisotropic layer 14 in the normal direction is diffracted due to the diffraction effect from the optically-anisotropic layer 14 and is emitted to the medium 2 side having a refractive index $n_2$. At this time, the emitted light $L_2$ emitted at the emission angle $\theta_2$ can be rephrased with the transmitted and diffracted light $L_2$ having the diffraction angle $\theta_2$.

This way, the optically-anisotropic layer 14 obtained by performing the horizontal rotation alignment on the liquid crystal compound 20 to be immobilized functions as diffraction grating.

The present inventors found that, in the optically-anisotropic layer 14 in which the liquid crystal compound 20 is tilted and immobilized after the horizontal rotation alignment, a higher diffraction efficiency can be obtained as compared to a diffraction grating of the related art including the optically-anisotropic layer in which the liquid crystal compound that is not tilted is immobilized after the horizontal rotation alignment. Here, the horizontal rotation alignment of the liquid crystal compound refers to an alignment in which a component of the rod-shaped liquid crystal compound parallel to the optical axis (major axis) changes while rotating in at least one direction.

The reason why a high diffraction efficiency can be obtained by pre-tilting the liquid crystal compound 20 in the optically-anisotropic layer as compared to the optically-anisotropic layer where the liquid crystal compound is not pre-tilted is presumed to be as follows.

As shown in FIG. 3, light that is vertically incident into the optically-anisotropic layer travels obliquely in an oblique direction in the optically-anisotropic layer along with a bending force. In a case where light travels in the optically-anisotropic layer, diffraction loss is generated due to a deviation from conditions such as a diffraction period that are set to obtain a desired diffraction angle with respect to the vertically incident light.

In a case where the liquid crystal compound is tilted, an orientation in which a higher birefringence is generated than that in an orientation in which light is diffracted is present. In this direction, the effective extraordinary light refractive index increases, and thus the birefringence as a difference between the extraordinary light refractive index and the ordinary light refractive index increases.

By setting the orientation of the pre-tilt angle according to the desired diffraction orientation, a deviation from the original diffraction conditions in the orientation can be suppressed. As a result, it is presumed that, in a case where the liquid crystal compound having a pre-tilt angle is used, a higher diffraction efficiency can be obtained.

The pre-tilt angle is in a range of 0 degrees to 90 degrees. However, in a case where the pre-tilt angle is excessively large, the birefringence on the front decreases. Therefore, the pre-tilt angle is desirably about 1 degree to 30 degrees. The pre-tilt angle is more preferably 3 degrees to 20 degrees and still more preferably 5 degrees to 15 degrees.

In addition, it is desirable that the pre-tilt angle is controlled by treating the interface of the optically-anisotropic layer. By pre-tilting the alignment film on the substrate side interface, the pre-tilt angle of the liquid crystal compound can be controlled. For example, by obliquely exposing the alignment film to ultraviolet light from the front during the formation of the alignment film, the liquid crystal compound in the optically-anisotropic layer formed on the alignment film can be made to have a pre-tilt angle. In this case, the liquid crystal compound is pre-tilted in a direction in which the single axis side of the liquid crystal compound can be seen with respect to the second irradiation direction. Since the liquid crystal compound having an orientation in a direction perpendicular to the second irradiation direction is not pre-tilted, a region where the liquid crystal compound is pre-tilted and a region where the liquid crystal compound is not pre-tilted are present. This configuration is suitable for improving the diffraction efficiency because it contributes to the most improvement of birefringence in the desired direction in a case where light is diffracted in the direction.

Further, an additive for promoting the pre-tilt angle can also be added to the optically-anisotropic layer or to the alignment film. In this case, the additive can be used as a factor for further improving the diffraction efficiency.

This additive can also be used for controlling the pre-tilt angle on the air side interface.

The wavelength λ of light that causes the diffraction effect to occur due to the optical element according to the embodiment of the present invention may be in a ultraviolet range or an infrared range or may be on an electromagnetic wave level. At the same rotation period p, as the wavelength of the incidence light increases, the diffraction angle increases, and as the wavelength of the incidence light decreases, the diffraction angle decreases. In a case where the wavelength λ is 380 nm and the rotation period p (μm) is in a range of $0.1<p<1$, a higher diffraction efficiency can be obtained as compared to a case where the liquid crystal compound is not tilted. In addition, in a case where the wavelength λ is 1100 nm and the rotation period p (μm) is in a range of $2<p<5$, a higher diffraction efficiency can be obtained as compared to a case where the liquid crystal compound is not tilted.

As described above, as shown in FIG. 1, in a case where incidence light $L_1$ of right circularly polarized light $P_R$ is incident along the normal line of the surface of the optical element 10, light $L_2$ of left circularly polarized light $P_L$ is emitted in a direction having the angle $\theta_2$ with respect to the normal direction. On the other hand, in a case where left circularly polarized light is incident into the optical element 10 as incidence light, the incidence light is converted into right circularly polarized light in the optically-anisotropic layer 14, and the traveling direction is changed by a bending force in a direction opposite to that of FIG. 1.

Figure 5:
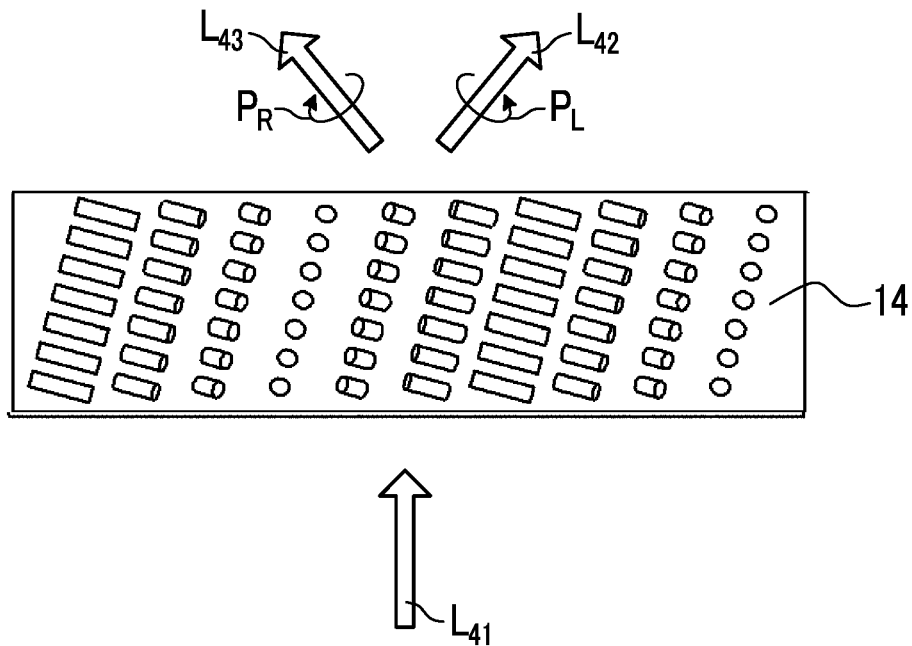
FIG. 5 is a diagram showing reflected light and transmitted light in a case where randomly polarized incidence light is incident into the optical element according to the first embodiment.

As shown in FIG. 5, in a case where randomly polarized incidence light $L_{41}$ is incident into the optical element 10, right circularly polarized light $P_R$ in the incidence light $L_{41}$ is converted into left circularly polarized light $P_L$ in the optically-anisotropic layer 14 as described above, the traveling direction is changed by a bending force due to the liquid crystal alignment pattern, and the left circularly polarized light $P_L$ transmits through the optically-anisotropic layer to be emitted as first transmitted and diffracted light $L_{42}$. On the other hand, left circularly polarized light $P_L$ in the incidence light $L_{41}$ is converted into right circularly polarized light $P_R$ in the optically-anisotropic layer 14, the traveling direction is changed by a bending force in a direction opposite to that of the left circularly polarized light converted from the right circularly polarized light, and the right circularly polarized light $P_R$ transmits through the optically-anisotropic layer 14 to be emitted as second transmitted and diffracted light $L_{43}$ from a surface opposite to the optical element 10. The traveling directions of the first transmitted and diffracted light $L_{42}$ and the second transmitted and diffracted light $L_{43}$ are substantially axisymmetric to each other with respect to the normal line.

Here, the liquid crystal compound of the optically-anisotropic layer 14 is tilted. Therefore, the diffraction efficiency of the first transmitted and diffracted light $L_{42}$ is different from and is higher than that of the second transmitted and diffracted light $L_{43}$. As a result, the optical design specialized in the first transmitted and diffracted light can be made. In addition, an intensity ratio between the first transmitted and diffracted light and the second transmitted and diffracted light can also be intentionally changed.

Figure 6:
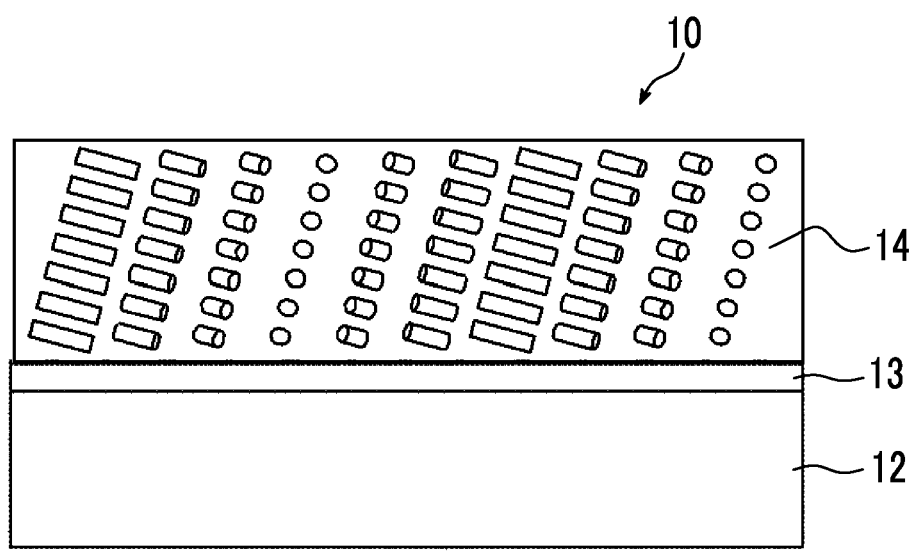
FIG. 6 is a diagram showing the optical element according to the first embodiment including an alignment film and an optically-anisotropic layer.

As shown in FIG. 6, the optical element 10 may include: the alignment film 13 that is provided on the support 12; and the optically-anisotropic layer 14 that is provided on the alignment film 13. The support 12 and the alignment film 13 are as described above.

In the optical element according to the embodiment of the present invention, it is not necessary that the 180° rotation period in the optically-anisotropic layer is uniform over the entire surface. That is, the optically-anisotropic layer may have regions having different lengths of the 180° rotation period in a plane. As a result, the diffraction angle of diffracted light in a plane can be changed.

In addition, the optically-anisotropic layer may have a portion where the direction of the optical axis is constant as long as a part thereof has the liquid crystal alignment pattern in which the direction of the optical axis rotates in at least one in-plane direction (axis A)

In the above description, the example in which incidence light is vertically incident into the optically-anisotropic layer. However, even in a case where incidence light is obliquely incident into the optically-anisotropic layer, the effect of transmission diffraction can also be obtained. In a case where incidence light is obliquely incident into the optically-anisotropic layer, the rotation period may be designed in consideration of the incidence angle $\theta_1$ such that Expression (1) is satisfied and the desired diffraction angle $\theta_2$ can be obtained.

As in the optically-anisotropic layer 14 of the optical element 10 shown in FIGS. 1 and 2, in a case where the optically-anisotropic layer has, uniformly in a plane, the liquid crystal alignment pattern in which the optical axis parallel to the plane changes while rotating in the 180° rotation period that is constant in the in-plane direction, the emission direction is fixed to the one direction.

On the other hand, in the liquid crystal alignment pattern, the direction in which the optical axis changes while rotating is not limited to one direction, and two directions or a plurality of directions may be adopted. By using the optically-anisotropic layer 14 including the liquid crystal alignment pattern corresponding to the desired direction of transmitted light, transmission of incidence light in the desired direction can be allowed.

Figure 7:
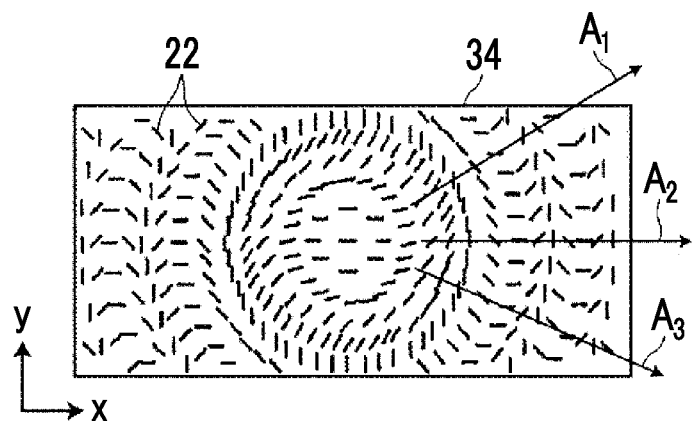
FIG. 7 is a diagram showing a design modification example of the optical element according to the first embodiment.

FIG. 7 is a schematic plan view showing an optically-anisotropic layer 34 in a design modification example of the optical element. A liquid crystal alignment pattern in an optically-anisotropic layer 34 is different from the liquid crystal alignment pattern in the optically-anisotropic layer 14 according to the above-described embodiment. FIG. 7 shows only the optical axis 22. The optically-anisotropic layer 34 in FIG. 7 has the liquid crystal alignment pattern in which the direction of the optical axis 22 gradually changes while rotating in multiple directions from the center side toward the outside, for example along axes $A_1$, $A_2$, $A_3$, and . . . . Depending on the liquid crystal alignment pattern shown in FIG. 7, the absolute phase of incidence light changes by different amounts of change between local regions having different directions of the optical axes 22. In a case where the liquid crystal alignment pattern in which the optical axes radially change while rotating is provided as shown in FIG. 7, incidence light can be caused to transmit through the optically-anisotropic layer as diverging light or converging light. That is, a function as a convex lens or a concave lens can be implemented by the liquid crystal alignment pattern in the optically-anisotropic layer 14.

Hereinabove, the example in which the pre-tilt angle is uniform in both the interfaces of the optically-anisotropic layer has been described. However, the pre-tilt angles in both the interfaces may be asymmetric as in FIGS. 8 and 9 without being uniform. That is, the pre-tilt angle on one interface side of the optically-anisotropic layer may be different from the pre-tilt angle on the other interface side of the optically-anisotropic layer. In both cases, the same effects as that in a case where the pre-tilt angle of the liquid crystal compound in the optically-anisotropic layer in FIG. 1 is uniform is exhibited.

In addition, the optically-anisotropic layer may have a region having different tilt angles of optical axes derived from the liquid crystal compound in a thickness direction.

Figure 8:
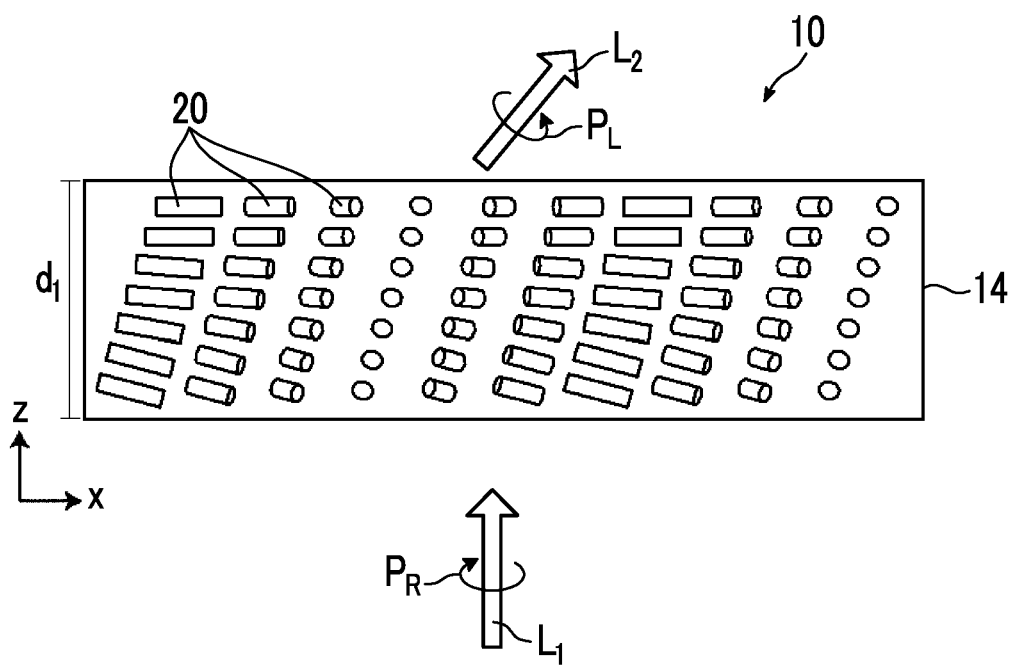
FIG. 8 is a diagram showing another design modification example of the optical element according to the first embodiment.

In the optically-anisotropic layer 14 of the optical element 10 shown in FIG. 8, the liquid crystal compound is tilted and aligned with respect to the interface side where the incidence light $L_1$ is incident, and the liquid crystal compound is aligned to be substantially parallel to the interface side where the light $L_2$ is emitted. That is, in the interface on incidence side of the optically-anisotropic layer 14, the pre-tilt angle of the liquid crystal compound is more than 0°, and the pre-tilt angle of the liquid crystal compound in the emission side interface is substantially 0°.

In addition, in a region between both the interfaces of the optically-anisotropic layer 14, the tilt angle of the liquid crystal compound gradually changes from the pre-tilt angle of the incidence side interface to the pre-tilt angle of the emission side interface in a direction from the incidence side toward the emission side. That is, the optically-anisotropic layer 14 has a region having different tilt angles in a thickness direction.

Figure 9:
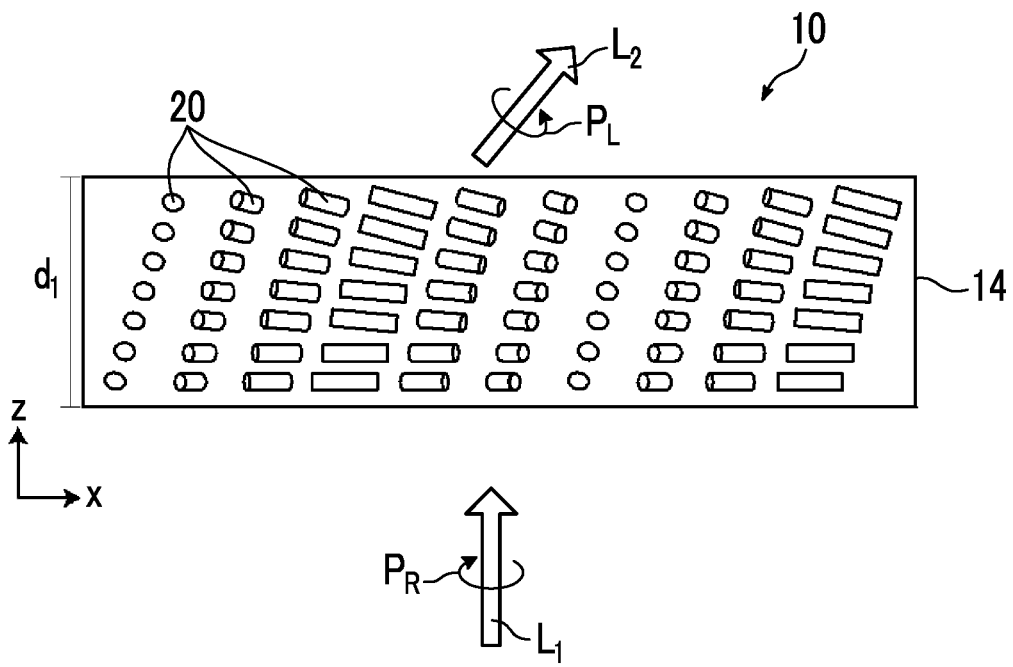
FIG. 9 is a diagram showing still another design modification example of the optical element according to the first embodiment.

In the optically-anisotropic layer 14 of the optical element 10 shown in FIG. 9, the liquid crystal compound is aligned to be parallel to the interface side where the incidence light $L_1$ is incident, and the liquid crystal compound is aligned to be tilted and aligned with respect to the interface side where the light $L_2$ is emitted. That is, in the interface on incidence side of the optically-anisotropic layer 14, the pre-tilt angle of the liquid crystal compound is substantially 0°, and the pre-tilt angle of the liquid crystal compound in the emission side interface is more than 0°.

In addition, in a region between both the interfaces of the optically-anisotropic layer 14, the tilt angle of the liquid crystal compound gradually changes from the pre-tilt angle of the incidence side interface to the pre-tilt angle of the emission side interface in a direction from the incidence side toward the emission side. That is, the optically-anisotropic layer 14 has a region having different tilt angles in a thickness direction.

FIGS. 8 and 9 shows the example where the pre-tilt angle on one interface side is 0°. However, the present invention is not limited to this example. Both the interfaces may have different pre-tilt angles.

Figure 10:
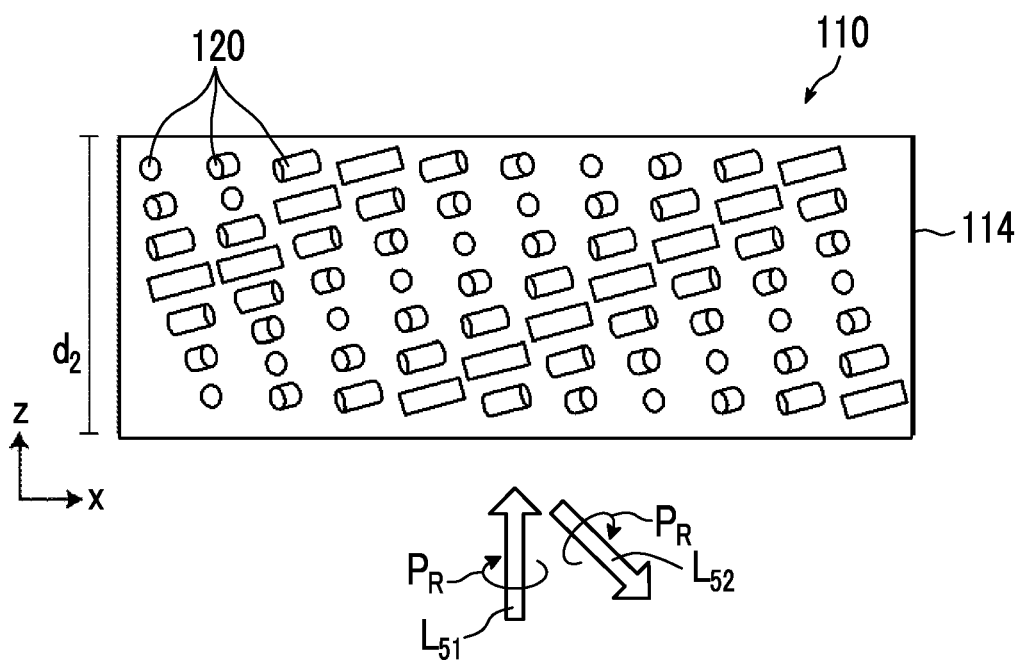
FIG. 10 is a schematic side view showing a liquid crystal alignment pattern in an optically-anisotropic layer of an optical element according to a second embodiment.

FIG. 10 is a schematic side view showing a configuration of an optical element 110 according to a second embodiment of the present invention. The schematic plan view showing the liquid crystal alignment pattern in the optically-anisotropic layer of the optical element according to the second embodiment is the same as that of the first embodiment shown in FIG. 2.

The optical element 110 according to the second embodiment includes an optically-anisotropic layer 114. The optical element 110 according to the embodiment may have the configuration in which the optically-anisotropic layer is formed on the alignment film formed on the support.

In the optical element 110, a liquid crystal alignment pattern in the optically-anisotropic layer 114 is different from that of the optically-anisotropic layer 14 according to the first embodiment.

The optically-anisotropic layer 114 is the same as the optically-anisotropic layer 14 in that a liquid crystal compound 120 is aligned by the horizontal rotation alignment in an in-plane direction. On the other hand, the optically-anisotropic layer 114 is different from the optically-anisotropic layer 14 in that the liquid crystal compound 120 is cholesterically aligned in a thickness direction.

The optically-anisotropic layer 114 exhibits a function of selectively reflecting only light in a predetermined selective wavelength range in specific circularly polarized light (right circularly polarized light or left circularly polarized light). A center wavelength of light to be selectively reflected is determined depending on a helical pitch and a thickness d2 of the cholesteric liquid crystalline phase. Circularly polarized light to be reflected is determined depending on a helical rotation direction.

A change of the optical axis 22 of the optical element 110 in an in-plane direction is the same as that of the optical element 10 according to the first embodiment shown in FIG. 2. Therefore, the same effects as those of the optical element 10 are exhibited. Accordingly, as in the optical element 10 according to the first embodiment, the optical element 110 exhibits an action of obliquely bending incidence light by changing an absolute phase with respect to the incidence light. In addition, the optical element 110 has the cholesteric liquid crystalline phase in the thickness direction, and thus selectively reflects light in a selective wavelength range in specific circularly polarized light among light components incident into the optically-anisotropic layer.

Here, the optically-anisotropic layer 114 is designed such that the cholesteric liquid crystalline phase reflects right circularly polarized light having a predetermined center wavelength. In this case, as shown in FIG. 10, in a case where light $L_{51}$ having a predetermined center wavelength that is right circularly polarized light is vertically incident into the plane of the optically-anisotropic layer 114 of the optical element 110, that is, along the normal line, reflected light $L_{52}$ that travels in a direction having a slope with respect to the normal direction is generated. That is, the optically-anisotropic layer 114 functions as a reflective diffraction grating for the light $L_{51}$.

Light having a wavelength other than the predetermined selective wavelength range and left circularly polarized light transmits through the optically-anisotropic layer 114.

Figure 11:
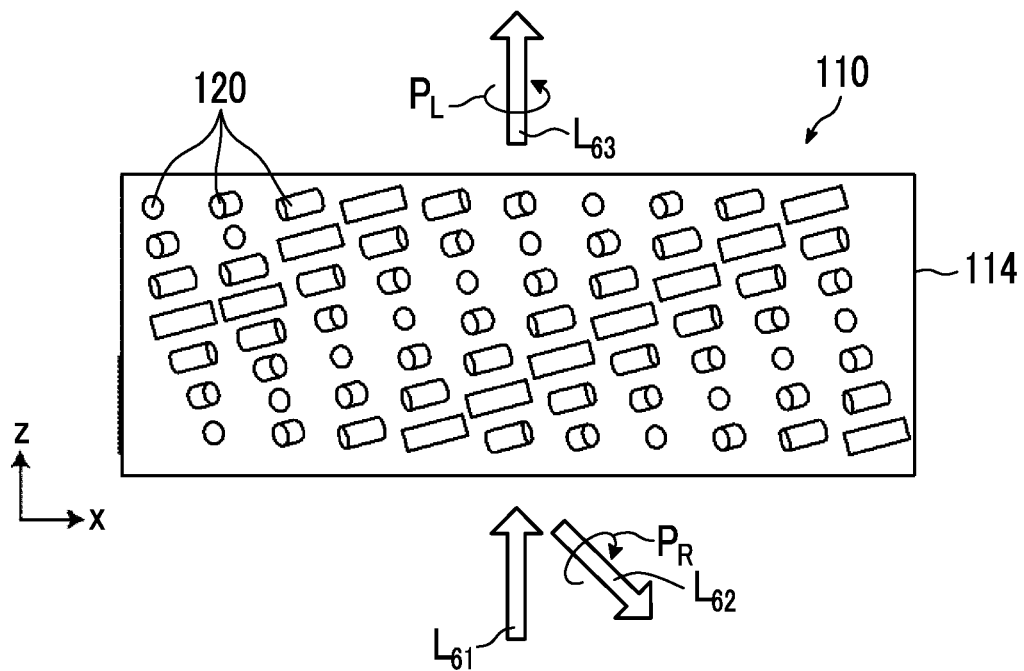
FIG. 11 is a diagram showing reflected light and transmitted light in a case where randomly polarized incidence light is incident into the optical element according to the second embodiment.

Accordingly, as shown in FIG. 11, in a case where a randomly polarized light L61 having a predetermined center wavelength is vertically incident into the optically-anisotropic layer 114, only right circularly polarized light $L_{62}$ is reflected and diffracted, and left circularly polarized light $L_{63}$ transmits through the optically-anisotropic layer 114.

In the optical element 110 according to the embodiment, the liquid crystal compound in the optically-anisotropic layer 114 is pre-tilted. Therefore, the diffraction efficiency can be improved as compared to a case where the liquid crystal alignment pattern having the horizontal rotation alignment and the cholesteric liquid crystalline phase in the thickness direction is formed using the rod-shaped liquid crystal compound, that is, a case where the liquid crystal compound is not pre-tilted as in the optical element 10 according to the first embodiment.

The optical element may include a combination of a plurality of optically-anisotropic layers having cholesteric liquid crystalline phases in different selective wavelength ranges.

Figure 12:
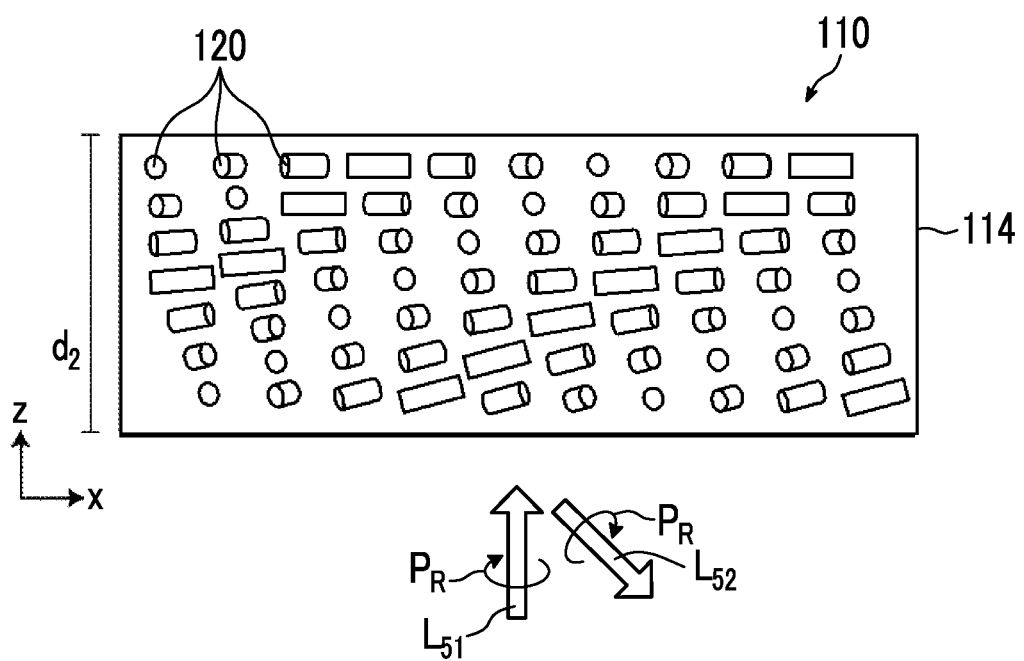
FIG. 12 is a diagram showing a design modification example of the optical element according to the second embodiment.
Figure 13:
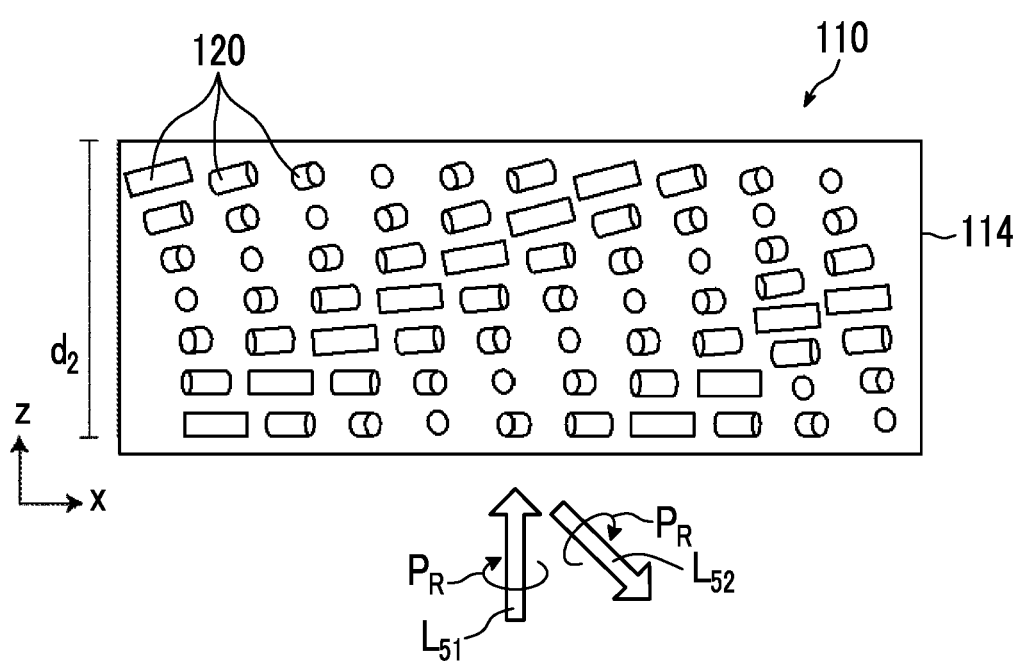
FIG. 13 is a diagram showing another design modification example of the optical element according to the second embodiment.

FIG. 10 shows the example in which the pre-tilt angle is uniform in both the interfaces of the optically-anisotropic layer. However, the pre-tilt angles in both the interfaces of the optically-anisotropic layer may be asymmetric as in FIGS. 12 and 13 without being uniform. That is, the pre-tilt angle on one interface side of the optically-anisotropic layer may be different from the pre-tilt angle on the other interface side of the optically-anisotropic layer. In both cases, the same effects as that in a case where the pre-tilt angle in the optically-anisotropic layer in FIG. 10 is uniform is exhibited.

In addition, in the example shown in FIG. 10 or the like, the liquid crystal compound is cholesterically aligned to exhibit twisting properties in the thickness direction. However, the present invention is not limited to this example, the liquid crystal compound may exhibit twisting properties in the thickness direction by alignment other than the cholesteric alignment. By exhibiting twisting properties in the thickness direction, the diffraction efficiency of obliquely incident light can be improved in the transmission diffraction grating. In addition, this configuration also contributes to the extension (widening) of a wavelength range of incidence light where the diffraction efficiency is high.

<<Cholesteric Liquid Crystalline Phase>>

It is known that the cholesteric liquid crystalline phase exhibits selective reflection properties at a specific wavelength. The center wavelength λ of selective reflection (selective reflection center wavelength λ) depends on a pitch P (=helical period) of a helical structure in the cholesteric liquid crystalline phase and satisfies a relationship of λ=n×P with an average refractive index n of the cholesteric liquid crystalline phase. Therefore, the selective reflection center wavelength can be adjusted by adjusting the pitch of the helical structure. The pitch of the cholesteric liquid crystalline phase depends on the kind of a chiral agent which is used in combination with a liquid crystal compound during the formation of the optically-anisotropic layer, or the concentration of the chiral agent added. Therefore, a desired pitch can be obtained by adjusting the kind and concentration of the chiral agent.

The details of the adjustment of the pitch can be found in "Fuji Film Research & Development" No. 50 (2005), pp. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric liquid crystalline phase exhibits selective reflection properties with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is right, right circularly polarized light is reflected, and in a case where the helical twisted direction of the cholesteric liquid crystalline phase is left, left circularly polarized light is reflected.

A turning direction of the cholesteric liquid crystalline phase can be adjusted by adjusting the kind of the liquid crystal compound that forms the optically-anisotropic layer and/or the kind of the chiral agent to be added.

In addition, a half-width Δλ (nm) of a selective reflection range (circularly polarized light reflection range) where selective reflection is exhibited depends on Δn of the cholesteric liquid crystalline phase and the helical pitch P and complies with a relationship of Δλ=Δn×P. Therefore, the width of the selective reflection range can be controlled by adjusting Δn. Δn can be adjusted by adjusting a kind of a liquid crystal compound for forming the optically-anisotropic layer and a mixing ratio thereof, and a temperature during aligned immobilization.

The half-width of the reflection wavelength range is adjusted depending on the application of the optical element 10 and is, for example, 10 to 500 nm and preferably 20 to 300 nm and more preferably 30 to 100 nm.

<<Method of Forming Optically-Anisotropic Layer Having Cholesteric Liquid Crystal Structure>>

The optically-anisotropic layer having the cholesteric liquid crystal structure can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the aligned state is not changed by an external field or an external force.

The structure in which a cholesteric liquid crystalline phase is immobilized is not particularly limited as long as the optical characteristics of the cholesteric liquid crystalline phase are maintained, and the liquid crystal compound 30 in the optically-anisotropic layer does not necessarily exhibit liquid crystallinity. For example, the molecular weight of the polymerizable liquid crystal compound may be increased by a curing reaction such that the liquid crystallinity thereof is lost.

Examples of a material used for forming the optically-anisotropic layer obtained by immobilizing a cholesteric liquid crystalline phase include a liquid crystal composition including the above-described liquid crystal compound. It is preferable that the liquid crystal compound is a polymerizable liquid crystal compound.

In addition, the liquid crystal composition used for forming the optically-anisotropic layer having the cholesteric liquid crystal structure may further include a surfactant and a chiral agent.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for turned nematic (TN) or super turned nematic (STN), p. 199), isosorbide, or an isomannide derivative can be used.

In general, the chiral agent includes an asymmetric carbon atom. However, an axially asymmetric compound or a surface asymmetric compound not having an asymmetric carbon atom can also be used as a chiral agent. Examples of the axially asymmetric compound or the surface asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group included in the polymerizable chiral agent is the same as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In addition, it is preferable that the optically-anisotropic layer has a wide range for the wavelength of incidence light and is formed of a liquid crystal material having a reverse birefringence dispersion. In addition, it is also preferable that the optically-anisotropic layer can be made to have a substantially wide range for the wavelength of incidence light by imparting a component such as a chiral agent for exhibiting twisting properties to the liquid crystal composition or by laminating different phase difference layers (optically-anisotropic layers having different selective reflection wavelengths). By adding the component for exhibiting twisting properties, twisting properties can be imparted in the thickness direction of the optically-anisotropic layer. The twisting properties may be right twisting properties or left twisting properties with respect to the thickness direction, and both optically-anisotropic layers having right twisting properties and left twisting properties may be laminated. For example, in the optically-anisotropic layer, a method of realizing a λ/2 plate having a wide-range pattern by laminating two liquid crystal layers having different twisted directions is disclosed in, for example, JP2014-089476A and can be preferably used in the present invention.

The optical element according to the embodiment of the present invention can be used even in a state where the optically-anisotropic layer, the support, and the alignment film are laminated. However, the optical element can be used in a state where the support is peeled off, that is, in a state where the optically-anisotropic layer and the alignment film are laminated, or can be used in a state where the support and the alignment film are peeled off, that is, in a state where the optically-anisotropic layer alone is provided.

Figure 15:
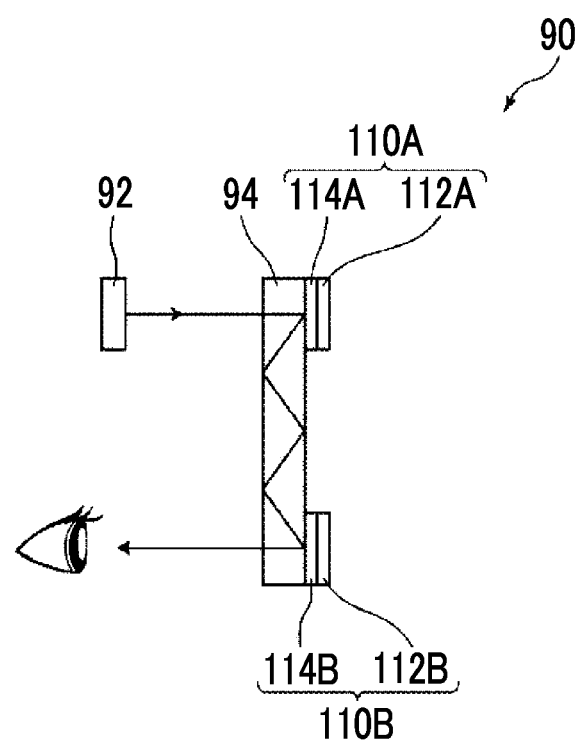
FIG. 15 is a diagram illustrating a schematic configuration of an exposure device that irradiates an alignment film with interference light.

Next, an example of an optical device including the optical element according to the embodiment of the present invention will be described. FIG. 15 is a diagram showing a main configuration of a head-mounted display 90 as an example of the optical device.

As shown in FIG. 15, the head-mounted display 90 includes: a liquid crystal display device 92 that is one aspect of a light source; and a light guide member 94 that guides light output from the liquid crystal display device 92. Optical elements 110A and 110B according to the second embodiment of the present invention are provided in a part of the light guide member 94. The liquid crystal display device 92 and the light guide member 94 are disposed such that light emitted from the liquid crystal display device 92 is vertically incident into a main surface of the light guide member 94, and the optical element 110A is disposed at a position where light incident into the light guide member 94 is vertically incident into the surface of the optical element 110A. That is, the optical element 110A is disposed at a position corresponding to the position of the liquid crystal display device 92 on a main surface of the light guide member 94 opposite to the main surface facing the liquid crystal display device 92. On the other hand, the optical element 110B is disposed at a position where light that is totally reflected and guided in the light guide member 94 and the guided light is emitted from the light guide member 94. In FIG. 15, the optical element 110B is disposed at a position different from the position of the optical element 110A on the main surface of the light guide member 94 where the optical element 110A is disposed.

In FIG. 15, the optical element 110A includes an optically-anisotropic layer 114A and a support 112A, in which specific circularly polarized light having a predetermined center wavelength that is vertically incident into the optically-anisotropic layer 114A is reflected in an oblique direction. The optical element 110B includes an optically-anisotropic layer 114B and a support 112B, in which specific circularly polarized light having a predetermined center wavelength that is vertically incident into the optically-anisotropic layer 114B in an oblique direction is reflected in the vertical direction.

In the configuration of FIG. 15, as indicated by an arrow, light displayed by the liquid crystal display device 92 is incident into the light guide member 94 from a main surface of one end portion of the light guide member 94 opposite to the main surface where the optical element 110A is disposed. The light incident into the light guide member 94 is reflected from the optical element 110A. At this time, the light is reflected in a direction having an angle different from that of a specular reflection direction due to the diffraction effect of the optical element 110A without being specularly reflected (regularly reflected). In the example shown in FIG. 15, light is incident from a direction substantially perpendicular to the main surface of the optical element 110A, and is reflected in a direction that is tilted with a large angle toward the longitudinal direction (in the drawing, the up-down direction) of the light guide member 94.

Since the light reflected from the optical element 110A is reflected with a large angle with respect to the angle of the incidence light, an angle of a light traveling direction with respect to the main surface of the light guide member 94 is small. Therefore, the light is totally reflected from both the surfaces of the light guide member 94 and is guided in the longitudinal direction in the light guide member 94.

The light guided in the light guide member 94 is reflected from the optical element 110B in another end portion of the light guide member 94 in the longitudinal direction. At this time, the light is reflected in a direction having an angle different from that of a specular reflection direction due to the diffraction effect of the optical element 110B without being specularly reflected. In the example shown in FIG. 15, the light is incident from an oblique direction with respect to the main surface of the optical element 110B and is reflected in a direction perpendicular to the main surface of the optical element 110B.

The light reflected from the optical element 110B reaches the main surface of the light guide member 94 opposite to the main surface where the optical element 110B is disposed, but is incident to be substantially perpendicular to the main surface. Therefore, the light is emitted to the outside of the light guide member 94 without being totally reflected. That is, the light is emitted to the observation position of the user.

This way, in a case where the optical element according to the embodiment of the present invention is used, the reflection direction of incidence light can be made to be a desired direction, and it is not necessary to separately provide a reflection element and an element for changing an optical path. Therefore, the size of the optical device can be reduced.

The optical element according to the embodiment of the present invention is not necessarily applied to the above-described head-mounted display 90, and can be applied to an AR projection device as a light reflection element that reflects light in a direction different from the incidence angle. In addition, the optical element according to the embodiment of the present invention can be applied to a light collecting mirror for a sensor, a reflective screen that diffuses light, or the like as a micromirror or a microlens that collects or diffuses light.

In the example shown in FIG. 1 and the like, the optical element includes one optically-anisotropic layer. However, the present invention is not limited to this example, and the optical element may include two or more optically-anisotropic layers that are formed using the composition including the liquid crystal compound. In a case where the optical element includes two or more optically-anisotropic layers, the liquid crystal compound of at least one optically-anisotropic layer may be aligned by the horizontal rotation alignment, and the optically-anisotropic layer may have a region in which an alignment direction of the liquid crystal compound in at least one interface has a pre-tilt angle with respect to the interface.

In addition, in a case where the optical element includes two or more optically-anisotropic layers, it is preferable that the optical element includes two or more optically-anisotropic layers having different alignment patterns of the liquid crystal compounds.

Specifically, it is preferable that the two or more optically-anisotropic layers have different pre-tilt angles. Alternatively, the two or more optically-anisotropic layers have different average values of tilt angles in a thickness direction (hereinafter, also referred to as "average tilt angle") with respect to the interface of the optical axis derived from the liquid crystal compound.

Figure 18:
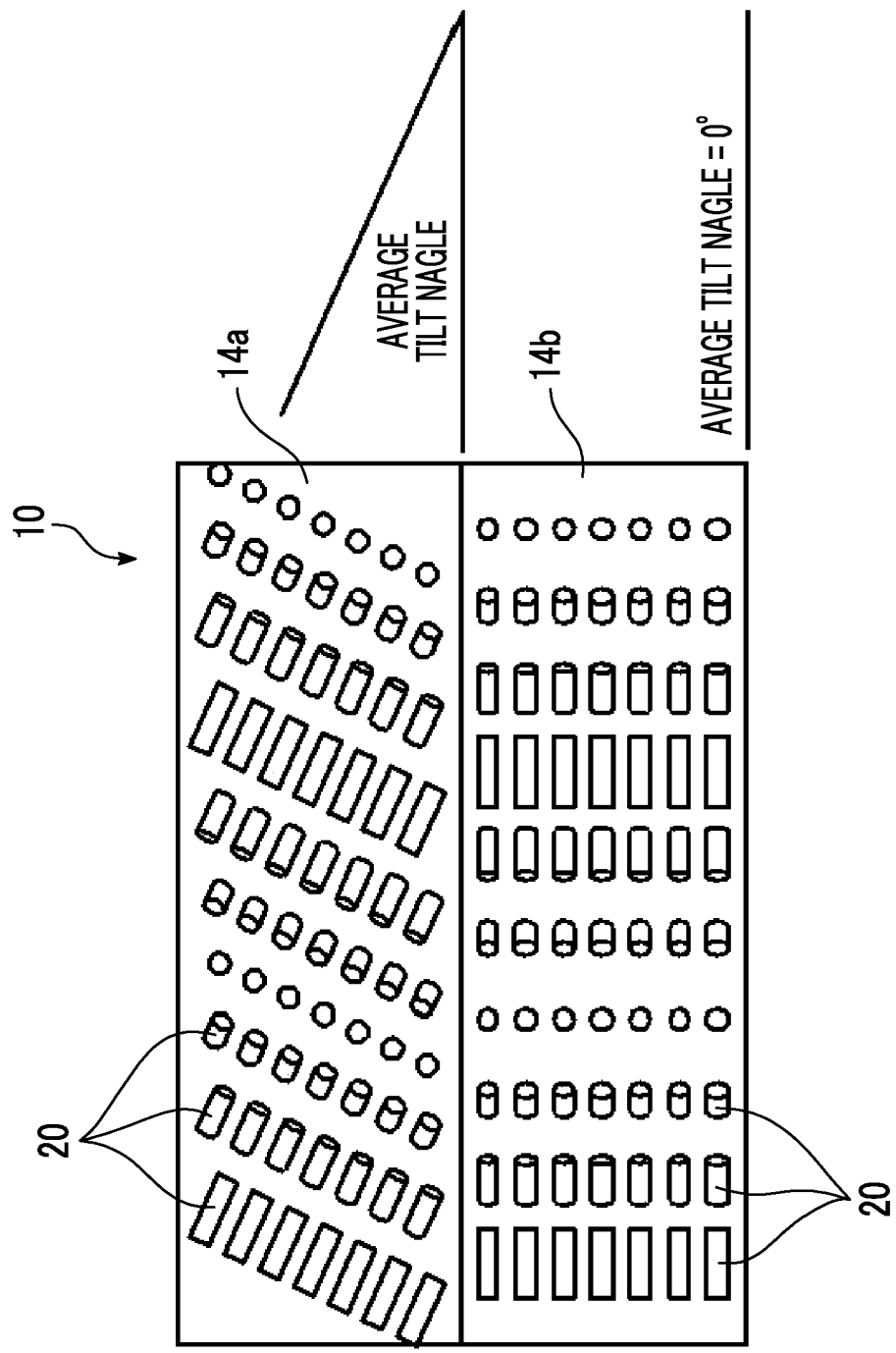
FIG. 18 is a side view schematically showing another example of the optical element according to the present invention.

For example, the optical element 10 shown in FIG. 18 has a configuration in which two optically-anisotropic layers 14a and 14b are laminated.

The optically-anisotropic layer 14a has the same configuration as the optically-anisotropic layer 14 of the optical element 10 shown in FIG. 1. That is, the optically-anisotropic layer 14a has a pattern in which the liquid crystal compound 20 is aligned by the horizontal rotation alignment and the alignment directions of the liquid crystal compound 20 in both the interfaces have a pre-tilt angle. The pre-tilt angles in both the interfaces are substantially the same. In addition, in the thickness direction of the optically-anisotropic layer 14a, the tilt angle of the liquid crystal compound 20 is uniform. Accordingly, the average tilt angle of the liquid crystal compound 20 in the optically-anisotropic layer 14a is substantially the same as the pre-tilt angle.

On the other hand, in the optically-anisotropic layer 14b, the liquid crystal compound 20 is not aligned by the horizontal rotation alignment, and the alignment directions of the liquid crystal compound 20 in both the interfaces do not have a pre-tilt angle (the pre-tilt angles are 0°). In addition, the tilt angle of the liquid crystal compound 20 in a region other than the interfaces is 0°. That is, the optically-anisotropic layer 14b has a pattern in which all the liquid crystal compounds 20 are aligned to be parallel to the interfaces. Accordingly, the average tilt angle of the liquid crystal compound 20 in the optically-anisotropic layer 14b is 0°.

Accordingly, the optically-anisotropic layer 14a and the optically-anisotropic layer 14b have different pre-tilt angles. In addition, the optically-anisotropic layer 14a and the optically-anisotropic layer 14b have different average tilt angles of the liquid crystal compounds 20.

This way, the optical element may include two optically-anisotropic layers in which the liquid crystal compound 20 is aligned by the horizontal rotation alignment, one of the two optically-anisotropic layers may be a layer having a pre-tilt angle, and another one of the two optically-anisotropic layers may be a layer not having a pre-tilt angle.

Figure 19:
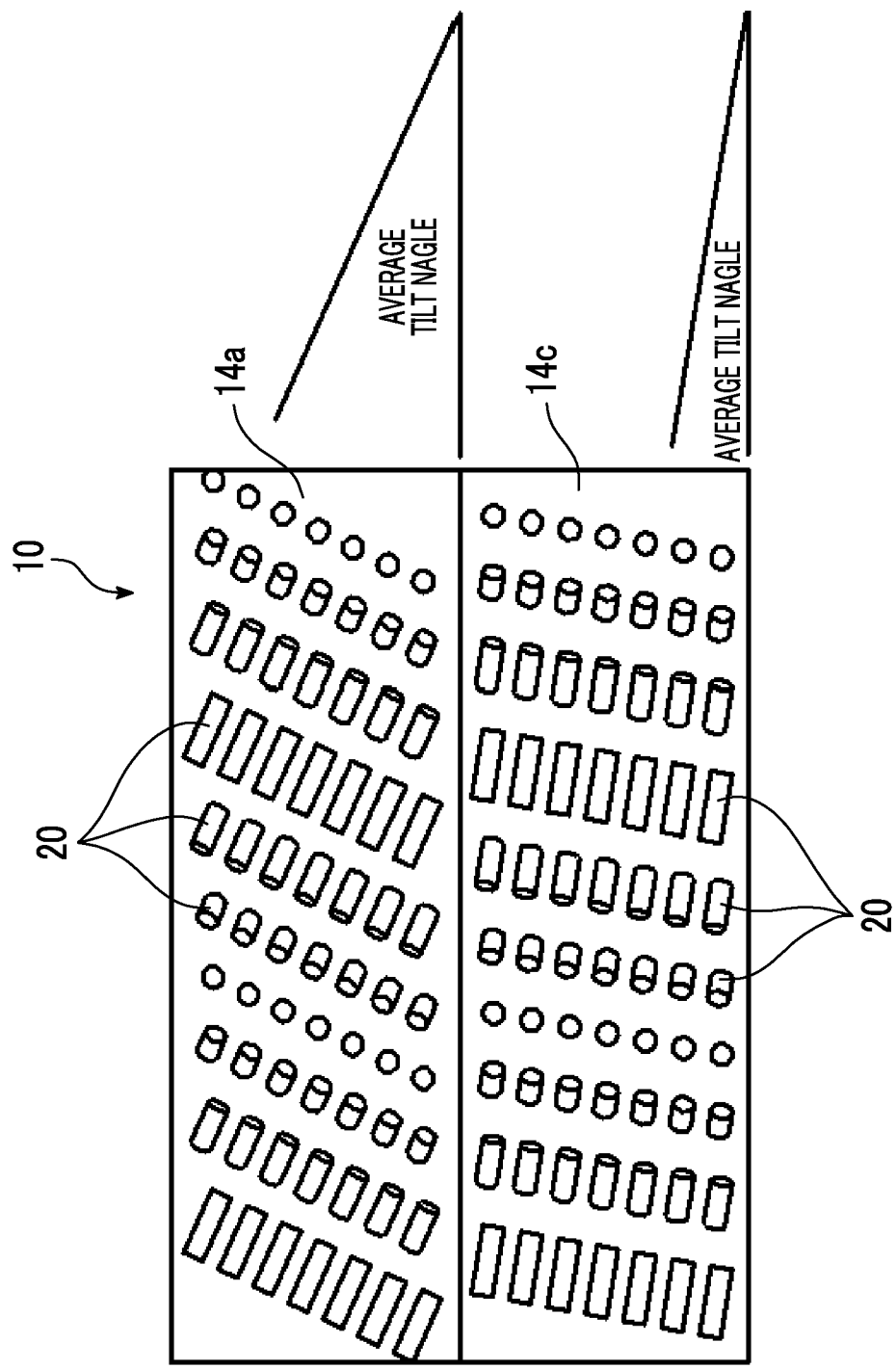
FIG. 19 is a side view schematically showing still another example of the optical element according to the present invention.

In addition, the optical element 10 shown in FIG. 19 in another example has a configuration in which two optically-anisotropic layers 14a and 14c are laminated.

The optically-anisotropic layer 14a and the optically-anisotropic layer 14c have a pattern in which the liquid crystal compound 20 is aligned by the horizontal rotation alignment and the alignment directions of the liquid crystal compound 20 in both the interfaces have a pre-tilt angle. In addition, each of the optically-anisotropic layer 14a and the optically-anisotropic layer 14c has substantially the same pre-tilt angle in both the interfaces. In addition, in the thickness direction of each of the optically-anisotropic layer 14a and the optically-anisotropic layer 14c, the tilt angle of the liquid crystal compound 20 is uniform.

Here, as shown in FIG. 19, the optically-anisotropic layer 14a and the optically-anisotropic layer 14c have different pre-tilt angles of the liquid crystal compounds 20 and different average tilt angles.

This way, the optical element may include two optically-anisotropic layers in which the liquid crystal compound 20 is aligned by the horizontal rotation alignment and that have a pre-tilt angle.

Figure 20:
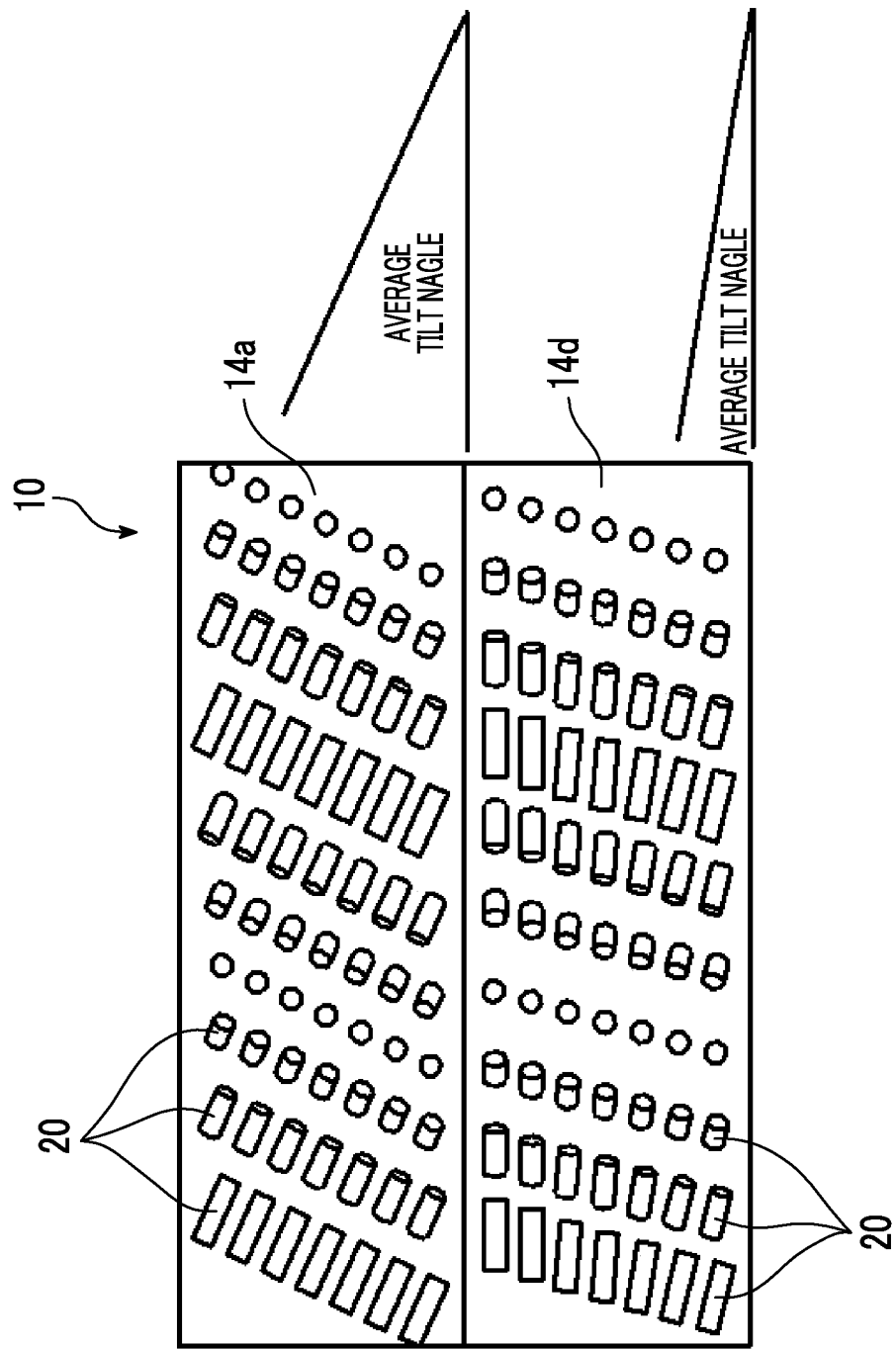
FIG. 20 is a side view schematically showing another example of the optical element according to the present invention.

In addition, the optical element 10 shown in FIG. 20 in another example has a configuration in which two optically-anisotropic layers 14a and 14d are laminated.

The optically-anisotropic layer 14a has the same configuration as the optically-anisotropic layer 14a of the optical element 10 shown in FIG. 18. That is, the optically-anisotropic layer 14a has a pattern in which the liquid crystal compound 20 is aligned by the horizontal rotation alignment and the alignment directions of the liquid crystal compound 20 in both the interfaces have a pre-tilt angle.

On the other hand, the optically-anisotropic layer 14d has the same configuration as the optically-anisotropic layer 14 of the optical element 10 shown in FIG. 8. That is, the optically-anisotropic layer 14d has the alignment pattern in which the pre-tilt angle on one interface side is different from the pre-tilt angle on the other interface side.

Specifically, in the optically-anisotropic layer 14d, the pre-tilt angle of the liquid crystal compound 20 in the interface on the optically-anisotropic layer 14a side is 0°, and the liquid crystal compound 20 in the interface opposite to the optically-anisotropic layer 14a is tilted with respect to the interface at a predetermined pre-tilt angle. In addition, in the alignment pattern, in a region between both the interfaces, the tilt angle of the liquid crystal gradually changes from the one interface side toward another interface side. That is, the optically-anisotropic layer 14d has a region having different tilt angles in a thickness direction.

As described above, examples of the optically-anisotropic layer having different pre-tilt angles in both the interfaces are not limited to the configuration where the pre-tilt angle on one interface side is 0° and are not particularly limited as long as the pre-tilt angles in both the interfaces are different from each other.

Accordingly, the optically-anisotropic layer 14a and the optically-anisotropic layer 14d have different pre-tilt angles. In addition, the optically-anisotropic layer 14a and the optically-anisotropic layer 14d have different average tilt angles of the liquid crystal compounds 20.

This way, the optical element may include at least one optically-anisotropic layer having different tilt angles of the liquid crystal compounds in a thickness direction. In addition, although not shown in the drawing, a configuration in which the optical element includes two or more optically-anisotropic layer having different tilt angles of the liquid crystal compounds in a thickness direction is also preferably used.

By adopting the configuration in which the optical element includes two or more optically-anisotropic layers having different pre-tilt angles and/or different average tilt angles as shown in FIGS. 18 to 20, the individual optically-anisotropic layers have different incidence angles at which the diffraction efficiency is the highest. Therefore, a high diffraction efficiency can be obtained at a wide incidence angle.

The average tilt angle may be obtained by measuring the tilt angles of the respective liquid crystal compounds in the thickness direction using the same method as that of the pre-tilt angle and obtaining the average value in the thickness direction.

Here, in FIGS. 18 to 20, the two optically-anisotropic layers have the same tilt orientation with respect to the interface of the optical axis derived from the liquid crystal compound. However, the present invention is not limited to this example, and the tilt orientations may be different from each other.

Figure 21:
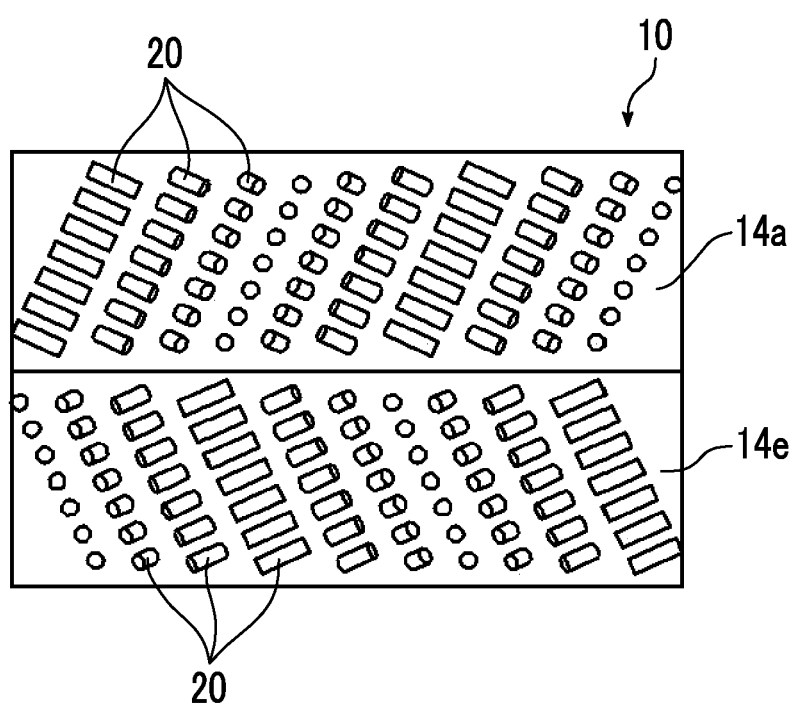
FIG. 21 is a side view schematically showing still another example of the optical element according to the present invention.

The optical element 10 shown in FIG. 21 has a configuration in which two optically-anisotropic layers 14a and 14e are laminated.

The optically-anisotropic layer 14a has the same configuration as the optically-anisotropic layer 14a of the optical element 10 shown in FIG. 18. That is, the optically-anisotropic layer 14a has a pattern in which the liquid crystal compound 20 is aligned by the horizontal rotation alignment and the alignment directions of the liquid crystal compound 20 in both the interfaces have a pre-tilt angle.

On the other hand, the optically-anisotropic layer 14d has the same alignment pattern as that of the optically-anisotropic layer 14a, except that the tilt orientation of the liquid crystal compound is opposite to that of the optically-anisotropic layer 14a. That is, the optically-anisotropic layer 14d has a pattern in which the liquid crystal compound 20 is aligned by the horizontal rotation alignment and the alignment directions of the liquid crystal compound 20 in both the interfaces have a pre-tilt angle.

This way, by adopting the configuration in which the optical element includes the optically-anisotropic layers having different tilt orientations of the liquid crystal compounds, a high diffraction efficiency can be obtained at a wide incidence angle.

In the example shown in FIG. 21, the optically-anisotropic layer 14a and the optically-anisotropic layer 14d have different tilt orientations of the liquid crystal compounds and have the same pre-tilt angle and the same average tilt angle. However, the present invention is not limited to this example, and the optical element may include two or more optically-anisotropic layers having different tilt orientations of the liquid crystal compounds and having different pre-tilt angles and/or different average tilt angles. In addition, the optical element may include an optically-anisotropic layer having different tilt angles of the liquid crystal compounds in a thickness direction.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Comparative Example 1

<Preparation of Optical Element>
(Support and Saponification Treatment of Support)

As the support, a commercially available triacetyl cellulose film (manufactured by Fuji Film Co., Ltd., Z-TAC) was used.

The support was caused to pass through an induction heating roll at a temperature of 60° C. such that the support surface temperature was increased to 40° C.

Next, an alkali solution shown below was applied to a single surface of the support using a bar coater in an application amount of 14 mL (liter)/m$^2$, the support was heated to 110° C., and the support was transported for 10 seconds under a steam infrared electric heater (manufactured by Noritake Co., Ltd.).

Next, 3 mL/m² of pure water was applied to a surface of the support to which the alkali solution was applied using the same bar coater. Next, water cleaning using a foundry coater and water draining using an air knife were repeated three times, and then the support was transported and dried in a drying zone at 70° C. for 10 seconds. As a result, the alkali saponification treatment was performed on the surface of the support.

Alkali Solution

| Potassium hydroxide | 4.70 parts by mass |
|---|---|
| Water | 15.80 parts by mass |
| Isopropanol | 63.70 parts by mass |
| Surfactant SF-1: $C_{14}H_{29}O(CH_2CH_2O)_2OH$ | 1.0 part by mass |
| Propylene glycol | 14.8 parts by mass |

(Formation of Undercoat Layer)

The following undercoat layer-forming coating solution was continuously applied to the surface of the support on which the alkali saponification treatment was performed using a #8 wire bar. The support on which the coating film was formed was dried using warm air at 60° C. for 60 seconds and was dried using warm air at 100° C. for 120 seconds. As a result, an undercoat layer was formed.

Undercoat Layer-Forming Coating Solution

| The following modified polyvinyl alcohol | 2.40 parts by mass |
|---|---|
| Isopropyl alcohol | 1.60 parts by mass |
| Methanol | 36.00 parts by mass |
| Water | 60.00 parts by mass |

Modified Polyvinyl Alcohol

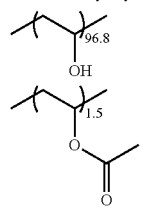

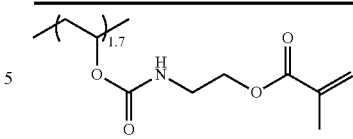

(Formation of Alignment Film)

The following alignment film-forming coating solution was continuously applied to the support on which the undercoat layer was formed using a #2 wire bar. The support on which the coating film of the alignment film-forming coating solution was formed was dried using a hot plate at 60° C. for 60 seconds. As a result, an alignment film was formed.

Alignment Film-Forming Coating Solution

| Material A for photo-alignment | 1.00 part by mass |
|---|---|
| Water | 16.00 parts by mass |
| Butoxyethanol | 42.00 parts by mass |
| Propylene glycol monomethyl ether | 42.00 parts by mass |

-Material A for Photo-Alignment-

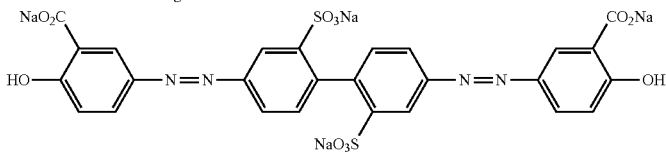

(Exposure of Alignment Film)

The alignment film was exposed using the exposure device shown in FIG. 14 to form an alignment film (patterned alignment film) P-1 having an alignment pattern.

In the exposure device, a laser that emits laser light having a wavelength (325 nm) was used as the laser. The exposure dose of the interference light was 100 mJ/cm². The single period (the length over which the optical axis derived from the liquid crystal compound rotates by 180°) of an alignment pattern formed by interference of two laser beams was controlled by changing an intersection angle (intersection angle β) between the two beams.

(Formation of Optically-Anisotropic Layer)

As the liquid crystal composition forming the optically-anisotropic layer, the following composition A-1 was prepared.

Composition A-1

| Liquid crystal compound L-1 | 100.00 parts by mass |
|---|---|
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 1088.00 parts by mass |

-continued

Liquid Crystal Compound L-1

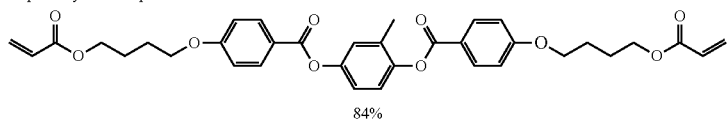

84%

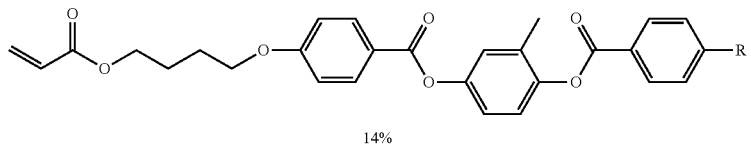

14%

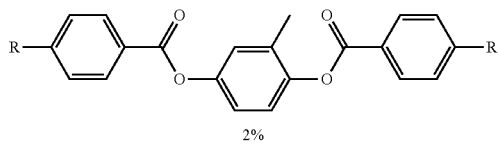

2%

R:
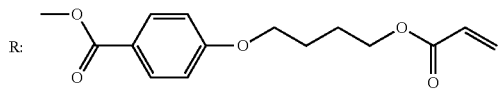

Leveling Agent T-1

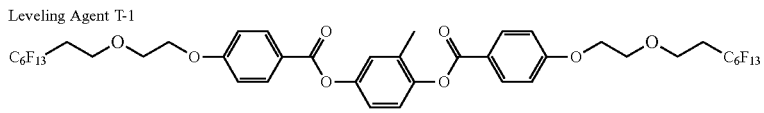

The optically-anisotropic layer was formed by applying multiple layers of the composition A-1 to the alignment film P-1. The application of the multiple layers refers to repetition of the following processes including: preparing a first liquid crystal immobilized layer by applying the first layer-forming composition A-1 to the alignment film, heating the composition A-1, cooling the composition A-1, and irradiating the composition A-1 with ultraviolet light for curing; and preparing a second or subsequent liquid crystal immobilized layer by applying the second or subsequent layer-forming composition A-1 to the formed liquid crystal immobilized layer, heating the composition A-1, cooling the composition A-1, and irradiating the composition A-1 with ultraviolet light for curing as described above. Even in a case where the liquid crystal layer was formed by the application of the multiple layers such that the total thickness of the liquid crystal layer (optically-anisotropic layer) was large, the alignment direction of the alignment film was reflected from a lower surface of the liquid crystal layer to an upper surface thereof.

Regarding the first liquid crystal layer, the following composition A-1 was applied to the alignment film P-1 to form a coating film, the coating film was heated using a hot plate at 70° C., the coating film was cooled to 25° C., and the coating film was irradiated with ultraviolet light having a wavelength of 365 nm at an irradiation dose of 100 mJ/cm$^2$ using a high-pressure mercury lamp in a nitrogen atmosphere. As a result, the alignment of the liquid crystal compound was immobilized. At this time, the thickness of the first liquid crystal layer was 0.2 μm.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired thickness, an optically-anisotropic layer was obtained, and an optical element was prepared.

Finally, in the optically-anisotropic layer, $\Delta_{n550}$×thickness (Re(550)) of the liquid crystals was 275 nm, and it was verified using a polarizing microscope that periodic alignment occurred on the surface as shown in FIG. 3. In the liquid crystal alignment pattern of the optically-anisotropic layer, the single period over which the optical axis derived from the liquid crystal compound rotated by 180° was 3.0 μm. Hereinafter, unless specified otherwise, "$\Delta_{n550}$×d" and the like were measured as described above.

(Measurement of Pre-Tilt Angle)

The optically-anisotropic layer was cut with a microtome, and a cross-section was observed with a polarizing microscope to measure the pre-tilt angle of the optical axis derived from the liquid crystal compound present in each of the interfaces of the aligned film interface side and the air interface side. In the measurement, the pre-tilt angle on the aligned film interface side and the pre-tilt angle on the air interface side were substantially 0 degrees.

Example 1

An alignment film (patterned alignment film) P-2 was formed using the same method as that of Comparative Example 1, except that only the exposure of the alignment film was changed as follows.

(Exposure of Alignment Film)

The alignment film P-1 having the alignment pattern was formed using the same method as that of Comparative Example 1. Further, the interference fringes of the alignment pattern was exposed to laser light depolarized with a depolarizer (depolarization element) in a direction (referred to as "second exposure orientation") of any one of two azimuthal angles perpendicular to each other at an angle of 45° from the normal direction of the substrate at an exposure dose of 10 mJ/cm². As a result, the alignment film was imparted with a function of pre-tilting the liquid crystal compound in a direction perpendicular to the second exposure orientation. As a result, the alignment film P-2 was formed. Next, an optical element was prepared using the same method as that of Comparative Example 1 except for the above-described conditions.

(Measurement of Pre-Tilt Angle)

Using the same method as that of Comparative Example 1, the pre-tilt angle of the optical axis derived from the liquid crystal compound present in each of the interfaces of the aligned film interface side and the air interface side was measured. In the measurement, the pre-tilt angle on the air interface side was substantially 0 degrees. Regarding the pre-tilt angle on the aligned film interface side, the pre-tilt angle of the liquid crystal compound having an orientation perpendicular to a plane formed between the second exposure orientation and the normal direction of the substrate was substantially 0 degrees, the pre-tilt angle of the liquid crystal compound having an orientation parallel to a plane formed between the second exposure orientation and the substrate normal direction was substantially 7 degrees, and a direction in which the pre-tilt angle rises was direction in which the major axis of the liquid crystal compound rises toward the second exposure orientation in the vertical direction. In addition, the tilt angle of the liquid crystal compound having an orientation between the interfaces gradually changed from 0 degrees to 7 degrees.

Example 2

An optical element was prepared using the same method as that of Comparative Example 1, except that the composition A-1 was changed to the following composition A-2.

Composition A-2

| | |
|---|---:|
| Liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-2 | 0.20 parts by mass |
| Leveling agent T-3 | 0.10 parts by mass |
| Methyl ethyl ketone | 1088.00 parts by mass |

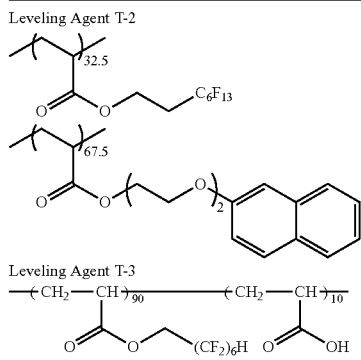

(Measurement of Pre-Tilt Angle)

Using the same method as that of Comparative Example 1, the pre-tilt angle of the optical axis derived from the liquid crystal compound present in each of the interfaces of the aligned film interface side and the air interface side was measured. In the measurement, the pre-tilt angle on the air interface side was substantially 10 degrees. Regarding the pre-tilt angle on the aligned film interface side, the pre-tilt angle of the liquid crystal compound having an orientation perpendicular to a plane formed between the second exposure orientation and the normal direction of the substrate was substantially 0 degrees, the pre-tilt angle of the liquid crystal compound having an orientation parallel to a plane formed between the second exposure orientation and the substrate normal direction was substantially 7 degrees, and a direction in which the pre-tilt angle rises was direction in which the major axis of the liquid crystal compound rises toward the second exposure orientation in the vertical direction. In addition, the tilt angle of the liquid crystal compound having an orientation between the interfaces gradually changed from 10 degrees to 7 degrees.

Example 3

An optical element was prepared using the same method as that of Comparative Example 1, except that the composition A-1 was changed to the following composition A-3.

Composition A-3

| | |
|---|---|
| Liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-2 | 0.20 parts by mass |
| Leveling agent T-3 | 0.10 parts by mass |
| Onium salt O-1 | 0.02 parts by mass |
| Methyl ethyl ketone | 1088.00 parts by mass |

Onium Salt O-1

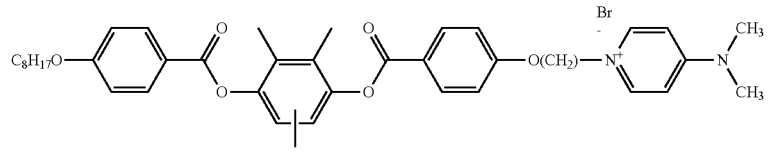

(Measurement of Pre-Tilt Angle)

Using the same method as that of Comparative Example 1, the pre-tilt angle of the optical axis derived from the liquid crystal compound present in each of the interfaces of the aligned film interface side and the air interface side was measured. In the measurement, the pre-tilt angle on the air interface side was substantially 10 degrees. Regarding the pre-tilt angle on the aligned film interface side, the pre-tilt angle of the liquid crystal compound having an orientation perpendicular to a plane formed between the second exposure orientation and the substrate normal direction was substantially 10 degrees, the pre-tilt angle of the liquid crystal compound having an orientation parallel to a plane formed between the second exposure orientation and the substrate normal direction was substantially 10 degrees, and a direction in which the pre-tilt angle rises was direction in which the major axis of the liquid crystal compound rises toward the second exposure orientation in the vertical direction. In addition, the tilt angle of the liquid crystal compound having an orientation between the interfaces was substantially uniform from 10 degrees to 10 degrees.

[Evaluation]

—Measurement of Diffraction Angle—

Each of the optical elements according to Examples 1 to 3 and Comparative Example 1 was a transmission optical element. Regarding these optical elements, light was caused to be vertically incident into the surface of the optically-anisotropic layer through the support of the optical element, and the diffraction angle of the transmitted and diffracted light was measured. Specifically, laser light as right circularly polarized light having an output center wavelength of 550 nm was caused to be vertically incident into one surface of the optical element, that is, one surface of the optically-anisotropic layer from a position at a distance of 50 cm in the normal direction, and a spot of the transmitted and diffracted light was captured with a screen disposed at a distance of 50 cm from the another surface of the optical element to calculate the diffraction angle.

—Measurement of Light Intensity—

Figure 16:
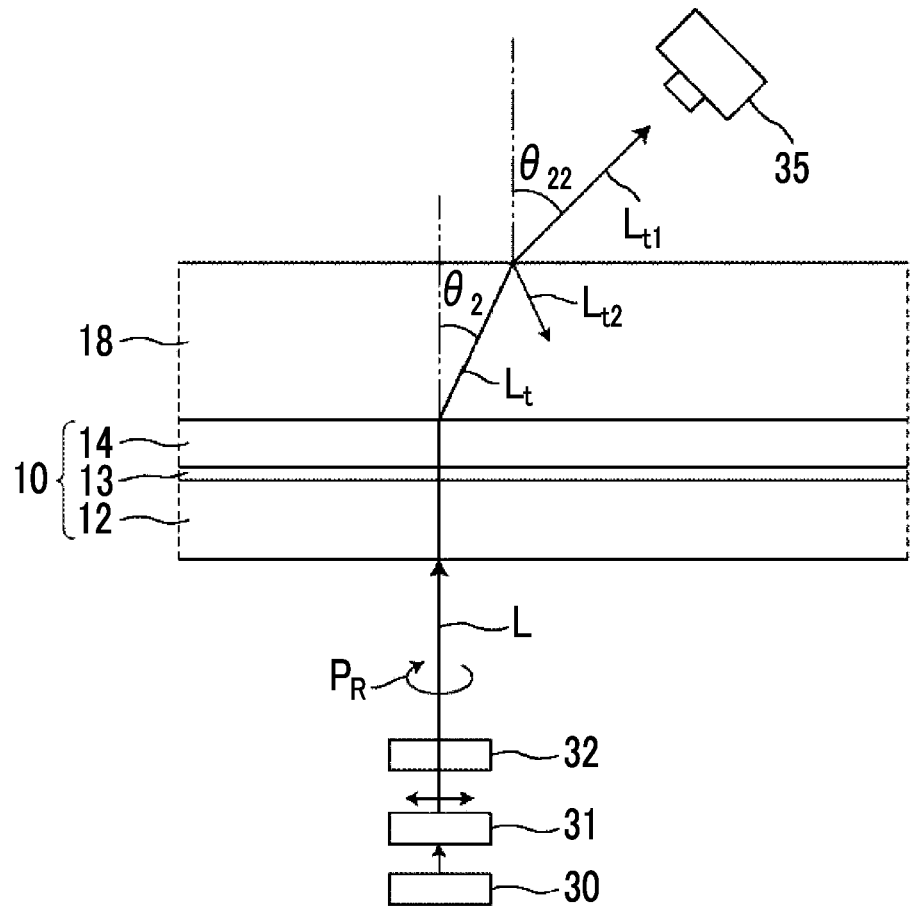
FIG. 16 is a diagram showing the summary of a method of measuring a light intensity.

A method of method of measuring a light intensity will be described with reference to FIG. 16. The optical element 10 according to each of Examples and Comparative Examples included the optically-anisotropic layer 14 on the alignment film 13 formed on the surface of the support 12. A second support 18 having substantially the same refractive index as that of the support 12 was bonded to another surface of the optically-anisotropic layer 14 opposite to the alignment film 13 side surface as the one surface. As a result, a measurement sample was obtained.

Semiconductor laser light having a wavelength of 531 nm emitted from the semiconductor laser 30 was caused to transmit through the linear polarizer 31 and the λ/4 plate 32. As a result, light L of right circularly polarized light $P_R$ was obtained. By causing the light L to be vertically incident into the support 12, the light L was vertically incident into the one surface of the optically-anisotropic layer 14. In this case, diffracted light Lt having the diffraction angle θ2 was output from the other surface of the optically-anisotropic layer 14 due to the diffraction effect of the optically-anisotropic layer 14. The diffracted light Lt traveled in the second support 18 connected to the other surface of the optically-anisotropic layer 14 and was emitted from the surface of the sample to the atmosphere. The intensity of the emitted light Lt1 was measured using a photodetector 35. Due to a difference in refractive index in the interface between the sample and the atmosphere, the diffracted light $L_t$ was bent such that emitted light $L_{t1}$ emitted at an emission angle θ22 and reflected light $L_{t2}$ reflected from the inside of the second support 18 were generated. The intensity of the light detected by the photodetector 35 and the intensity of the light $L_{t2}$ that was internally reflected by Fresnel reflection were obtained to calculate the intensity of the diffracted light $L_t$.

A ratio between the light intensity of the diffracted light $L_t$ and the light intensity of the light L was obtained to obtain the value of the relative light intensity of the diffracted light $L_t$ relative to the incidence light.

The evaluation results of the optical elements according to Examples 1 to 3 and Comparative Example 1 are shown below.

| Light Intensity Increase Rate relative to Comparative Example | |
|---|---|
| Comparative Example 1 | — |
| Example 1 | 5% |
| Example 2 | 10% |
| Example 3 | 12% |

As shown in the results, the light intensity increase rates of Examples 1 to 3 were determined compared to that of Comparative Example. The reason for this was presumed to be that the liquid crystal compound was tilted such that the effect of birefringence of the optically-anisotropic layer in the diffraction direction increased. As a result, the diffraction efficiency increased, and a high light intensity was obtained.

Comparative Example 11

<Preparation of First Reflecting Layer>
The support to which the alignment film was applied that was used in Comparative Example 1 was used, and the exposure of the alignment film was performed as described above.

(Exposure of Alignment Film)

The alignment film was exposed using the exposure device shown in FIG. 14 to form an alignment film P-1 having an alignment pattern.

In the exposure device, a laser that emits laser light having a wavelength (325 nm) was used as the laser. The exposure dose of the interference light was 100 mJ/cm². The single period (the length over which the optical axis rotates by 180°) of an alignment pattern formed by interference of two laser beams was controlled by changing an intersection angle (intersection angle β) between the two beams.

(Formation of G Reflection Cholesteric Liquid Crystal Layer)

As the liquid crystal composition forming the cholesteric liquid crystal layer as the optically-anisotropic layer, the following composition A-11 was prepared. This composition A-11 is a liquid crystal composition forming a cholesteric liquid crystal layer (cholesteric liquid crystalline phase) that has a selective reflection center wavelength of 530 nm and reflects right circularly polarized light.

Composition A-11

| | |
|---|---|
| Rod-shaped liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-1 | 5.68 parts by mass |
| Leveling agent T-1 | 0.08 parts by mass |
| Methyl ethyl ketone | 1180.00 parts by mass |

Rod-shaped liquid crystal compound L-1

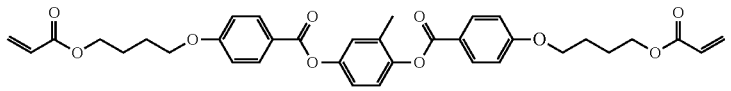

84%

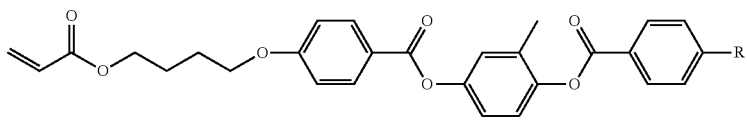

14%

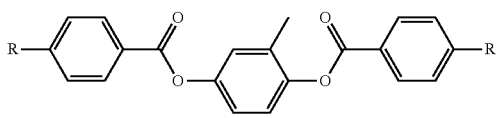

2%

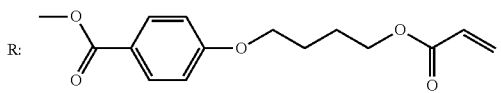

Chiral agent Ch-1

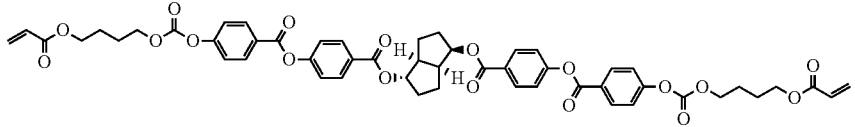 [SMILES: C=CC(=O)OCCCCOC(=O)Oc1ccc(C(=O)Oc2ccc(C(=O)O[C@H]3CC[C@H]4[C@@H]3CC[C@H]4OC(=O)c3ccc(OC(=O)c4ccc(OC(=O)OCCCCOC(=O)C=C)cc4)cc3)cc2)cc1]

Leveling Agent T-1

$C_6F_{16}$ ... $C_6F_{13}$

The G reflection cholesteric liquid crystal layer was formed by applying multiple layers of the composition A-11 to the alignment film P-1. The application of the multiple layers refers to repetition of the following processes including: preparing a first liquid crystal immobilized layer by applying the first layer-forming composition A-11 to the alignment film, heating the composition A-11, cooling the composition A-11, and irradiating the composition A-11 with ultraviolet light for curing; and preparing a second or subsequent liquid crystal immobilized layer by applying the second or subsequent layer-forming composition A-11 to the formed liquid crystal immobilized layer, heating the composition A-11, cooling the composition A-11, and irradiating the composition A-11 with ultraviolet light for curing as described above. Even in a case where the liquid crystal layer was formed by the application of the multiple layers such that the total thickness of the liquid crystal layer was large, the alignment direction of the alignment film was reflected from a lower surface of the liquid crystal layer to an upper surface thereof.

Regarding the first liquid crystal layer, the composition A-11 was applied to the alignment film P-1 to form a coating film, the coating film was heated using a hot plate at 95° C., the coating film was cooled to 25° C., and the coating film was irradiated with ultraviolet light having a wavelength of 365 nm at an irradiation dose of 100 mJ/cm$^2$ using a high-pressure mercury lamp in a nitrogen atmosphere. As a result, the alignment of the liquid crystal compound was immobilized. At this time, the thickness of the first liquid crystal layer was 0.2 μm.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired thickness, and a G reflection cholesteric liquid crystal layer was formed.

By performing the formation of the G reflection cholesteric liquid crystal layer on two supports, a first G reflecting layer and a second G reflecting layer were prepared.

In a case where a cross-section of the G reflecting layer was observed with a scanning electron microscope (SEM), the cholesteric liquid crystalline phase of the G reflecting layer had 8 pitches.

It was verified using a polarizing microscope that the G reflection cholesteric liquid crystal layer had a periodically aligned surface as shown in FIG. 3. In the liquid crystal alignment pattern of the G reflection cholesteric liquid crystal layer, the single period over which the optical axis derived from the liquid crystal compound rotated by 180° was 1.1 μm.

(Measurement of Pre-Tilt Angle)

The G reflection cholesteric liquid crystal layer was cut with a microtome, and a cross-section was observed with a polarizing microscope to measure the pre-tilt angle of the optical axis derived from the liquid crystal compound present in each of the interfaces of the aligned film interface side and the air interface side. In the measurement, the pre-tilt angle on the aligned film interface side and the pre-tilt angle on the air interface side were substantially 0 degrees.

Example 11

An alignment film P-2 was formed using the same method as that of Comparative Example 11, except that only the exposure of the alignment film was changed as follows.

(Exposure of Alignment Film)

The alignment film P-11 having the alignment pattern was formed using the same method as that of Comparative Example 1. Further, the interference fringes of the alignment pattern was exposed to laser light depolarized with a depolarizer (depolarization element) in a direction (referred to as "second exposure orientation") of any one of two azimuthal angles perpendicular to each other at an angle of 45° from the normal direction of the substrate at an exposure dose of 10 mJ/cm$^2$. As a result, the alignment film was imparted with a function of pre-tilting the liquid crystal compound in a direction perpendicular to the second exposure orientation. As a result, the alignment film P-2 was formed.

An optical element was prepared using the same method as that of Comparative Example 11 except for the above-described configuration.

(Measurement of Pre-Tilt Angle)

Using the same method as that of Comparative Example 1, the pre-tilt angle of the optical axis derived from the liquid crystal compound present in each of the interfaces of the aligned film interface side and the air interface side was measured. In the measurement, the pre-tilt angle on the air interface side was substantially 0 degrees. Regarding the pre-tilt angle on the aligned film interface side, the pre-tilt angle of the liquid crystal compound having an orientation perpendicular to a plane formed between the second exposure orientation and the substrate normal direction was substantially 0 degrees, the pre-tilt angle of the liquid crystal compound having an orientation parallel to a plane formed between the second exposure orientation and the substrate normal direction was substantially 7 degrees, and a direction in which the pre-tilt angle rises was direction in which the major axis of the liquid crystal compound rises toward the second exposure orientation in the vertical direction. In addition, the tilt angle of the liquid crystal compound having an orientation between the interfaces gradually changed from 0 degrees to 7 degrees.

Example 12

An optical element was prepared using the same method as that of Example 11, except that the composition A-11 was changed to the following composition A-12.

Composition A-12

| | |
|---|---|
| Rod-shaped liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-1 | 5.68 parts by mass |
| Leveling agent T-2 | 0.20 parts by mass |
| Leveling agent T-3 | 0.10 parts by mass |
| Methyl ethyl ketone | 1180.00 parts by mass |

(Measurement of Pre-Tilt Angle)

Using the same method as that of Comparative Example 1, the pre-tilt angle of the optical axis derived from the liquid crystal compound present in each of the interfaces of the aligned film interface side and the air interface side was measured. In the measurement, the pre-tilt angle on the air interface side was substantially 10 degrees. Regarding the pre-tilt angle on the aligned film interface side, the pre-tilt angle of the liquid crystal compound having an orientation perpendicular to a plane formed between the second exposure orientation and the substrate normal direction was substantially 0 degrees, the pre-tilt angle of the liquid crystal compound having an orientation parallel to a plane formed between the second exposure orientation and the substrate normal direction was substantially 7 degrees, and a direction in which the pre-tilt angle rises was direction in which the major axis of the liquid crystal compound rises toward the second exposure orientation in the vertical direction. In addition, the tilt angle of the liquid crystal compound having an orientation between the interfaces gradually changed from 10 degrees to 7 degrees.

Example 13

An optical element was prepared using the same method as that of Example 11, except that the composition A-11 was changed to the following composition A-13.

Composition A-13

| | |
|---|---|
| Rod-shaped liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-1 | 5.68 parts by mass |
| Leveling agent T-2 | 0.20 parts by mass |
| Leveling agent T-3 | 0.10 parts by mass |
| Onium salt O-1 | 0.02 parts by mass |
| Methyl ethyl ketone | 1180.00 parts by mass |

(Measurement of Pre-Tilt Angle)

Using the same method as that of Comparative Example 1, the pre-tilt angle of the optical axis derived from the liquid crystal compound present in each of the interfaces of the aligned film interface side and the air interface side was measured. In the measurement, the pre-tilt angle on the air interface side was substantially 10 degrees. Regarding the pre-tilt angle on the aligned film interface side, the pre-tilt angle of the liquid crystal compound having an orientation perpendicular to a plane formed between the second exposure orientation and the substrate normal direction was substantially 10 degrees, the pre-tilt angle of the liquid crystal compound having an orientation parallel to a plane formed between the second exposure orientation and the substrate normal direction was substantially 10 degrees, and a direction in which the pre-tilt angle rises was direction in which the major axis of the liquid crystal compound rises toward the second exposure orientation in the vertical direction. In addition, the tilt angle of the liquid crystal compound having an orientation between the interfaces was substantially uniform from 10 degrees to 10 degrees.

[Evaluation]

—Measurement of Diffraction Angle—

Each of the optical elements according to Examples 11 to 13 and Comparative Example 11 was a reflective optical element. Regarding these optical elements, light was caused to be vertically incident into the surface of the optically-anisotropic layer through the support of the optical element, and the diffraction angle of the reflected and diffracted light was measured. Specifically, laser light as right circularly polarized light having an output center wavelength of 531 nm was caused to be vertically incident into one surface of the optical element, that is, one surface of the optically-anisotropic layer from a position at a distance of 50 cm in the normal direction, and a spot of the reflected and diffracted light was captured with a screen disposed at a distance of 50 cm from the one surface of the optical element to calculate the diffraction angle.

—Measurement of Light Intensity—

A method of method of measuring a light intensity will be described with reference to FIG. 17.

Semiconductor laser light having a wavelength of 531 nm emitted from the semiconductor laser 30 was caused to transmit through the linear polarizer 31 and the λ/4 plate 32. As a result, light $L_{10}$ of right circularly polarized light $P_R$ was obtained. The light $L_{10}$ was caused to be incident into the surface of the optically-anisotropic layer 114. In this case, the intensity of the diffracted light $L_r$ that was reflected and diffracted at the diffraction angle $\theta_2$ due to the diffraction effect and the selective reflection effect of the optically-anisotropic layer 114 was measured using the photodetector 35. A ratio between the light intensity of the diffracted light $L_r$ and the light intensity of the light $L_{10}$ was obtained to obtain the value of the relative light intensity of the diffracted light $L_r$ relative to the incidence light.

| Light Intensity Increase Rate relative to Comparative Example 11 | |
|---|---|
| Comparative Example 11 | — |
| Example 11 | 6% |
| Example 12 | 13% |
| Example 13 | 19% |

As shown in the results, the light intensity increase rates of Examples 11 to 13 were determined compared to that of Comparative Example. The reason for this was presumed to be that the liquid crystal compound was tilted such that the effect of birefringence of the optically-anisotropic layer in the diffraction direction increased. As a result, the diffraction efficiency increased, and a high light intensity was obtained.

Comparative Example 21

An optical element was prepared using the same method as that of the exposure of the alignment film in Comparative Example 1, except that the intersection angle between two laser beams was changed.

(Measurement of Average Tilt Angle)

The optically-anisotropic layer was cut with a microtome, and a cross-section was observed with a polarizing microscope to measure the tilt angles of the optical axes derived from the liquid crystal compound from the aligned film interface side toward the air interface side interface, and the average value thereof was calculated as the average tilt angle. In the measurement, the average tilt angle was substantially 0 degrees.

Example 21

An alignment film was formed using the same method as that of Comparative Example 1, except that only the exposure of the alignment film was changed as follows.

(Exposure of Alignment Film)

An alignment film (patterned alignment film) including the alignment pattern was formed using the same method as that of the exposure of the alignment film in Comparative Example 1, except that the intersection angle between two laser beams was changed. Further, the interference fringes of the alignment pattern was exposed to laser light depolarized with a depolarizer (depolarization element) in a direction (referred to as "second exposure orientation") of any one of two azimuthal angles perpendicular to each other at an angle of 45° from the normal direction of the substrate at an exposure dose of 40 mJ/cm². As a result, the alignment film was imparted with a function of pre-tilting the liquid crystal compound in a direction perpendicular to the second exposure orientation. As a result, the alignment film was formed.

(Formation of First Optically-Anisotropic Layer)

As the liquid crystal composition forming the optically-anisotropic layer, the following composition A-21 was prepared.

A first optically-anisotropic layer was prepared using the same method as that of Example 1, except that the composition A-1 was changed to the following composition A-21.

Composition A-21

| | |
|---|---|
| Liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-2 | 0.20 parts by mass |
| Leveling agent T-3 | 0.10 parts by mass |
| Methyl ethyl ketone | 1088.00 parts by mass |

(Measurement of Average Tilt Angle)

The first optically-anisotropic layer was cut with a microtome, and a cross-section was observed with a polarizing microscope to measure the tilt angles of the optical axes derived from the liquid crystal compound from the aligned film interface side toward the air interface side interface, and the average value thereof was calculated as the average tilt angle. In the measurement, the average tilt angle was substantially 10 degrees. In addition, the tilt angle of the liquid crystal compound having an orientation between the interfaces was substantially uniform.

(Formation of Alignment Film)

A corona treatment was performed on the surface of the formed first optically-anisotropic layer. An alignment film-forming coating solution was continuously applied to the first optically-anisotropic layer on which the corona treatment was performed using a #2 wire bar with the same method as that of the formation of the alignment film in Comparative Example 1. The support on which the coating film of the alignment film-forming coating solution was formed was dried using a hot plate at 60° C. for 60 seconds. As a result, an alignment film was formed.

(Exposure of Alignment Film)

An alignment film including the alignment pattern was prepared using the same method as that of the exposure of the alignment film in Comparative Example 1, except that the intersection angle between two laser beams was changed. Further, the interference fringes of the alignment pattern was exposed to laser light depolarized with a depolarizer (depolarization element) in a direction (referred to as "second exposure orientation") of any one of two azimuthal angles perpendicular to each other at an angle of 45° from the normal direction of the substrate at an exposure dose of 200 mJ/cm². As a result, the alignment film was imparted with a function of pre-tilting the liquid crystal compound in a direction perpendicular to the second exposure orientation. As a result, the alignment film was formed.

(Formation of Second Optically-Anisotropic Layer)

As the liquid crystal composition forming the optically-anisotropic layer, the following composition A-22 was prepared.

A second optically-anisotropic layer was formed using the same method as that of the formation of the first optically-anisotropic layer in Example 1, except that the composition A-1 was changed to the following composition A-22.

Composition A-22

| | |
|---|---|
| Liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-2 | 0.20 parts by mass |
| Leveling agent T-3 | 0.25 parts by mass |
| Methyl ethyl ketone | 1088.00 parts by mass |

(Measurement of Average Tilt Angle)

The second optically-anisotropic layer was cut with a microtome, and a cross-section was observed with a polarizing microscope to measure the tilt angles of the optical axes derived from the liquid crystal compound from the aligned film interface side toward the air interface side interface, and the average value thereof was calculated as the average tilt angle. In the measurement, the average tilt angle was substantially 25 degrees. In addition, the tilt angle of the liquid crystal compound having an orientation between the interfaces was substantially uniform.

Example 22

A first optically-anisotropic layer was formed using the same method as that of Comparative Example 21.

(Formation and Exposure of Alignment Film)

The exposure of the alignment film was performed by performing a corona treatment on the first optically-anisotropic layer to form the alignment film on the first optically-anisotropic layer as in Example 21.

(Formation of Second Optically-Anisotropic Layer)

A second optically-anisotropic layer was formed using the same method as that of Example 21.

Example 23

A first optically-anisotropic layer was formed using the same method as that of Example 21.

(Formation and Exposure of Alignment Film)

The exposure of the alignment film was performed by performing a corona treatment on the first optically-anisotropic layer to form the alignment film on the first optically-anisotropic layer as in Example 21.

(Formation of Second Optically-Anisotropic Layer)

As the liquid crystal composition forming the optically-anisotropic layer, the following composition A-23 was prepared.

A second optically-anisotropic layer was formed using the same method as that of the formation of the first optically-anisotropic layer in Example 1, except that the composition A-1 was changed to the following composition A-23.

Composition A-23

| | |
|---|---|
| Liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-2 | 0.20 parts by mass |
| Leveling agent T-3 | 0.30 parts by mass |
| Methyl ethyl ketone | 1088.00 parts by mass |

(Measurement of Average Tilt Angle)

The second optically-anisotropic layer was cut with a microtome, and a cross-section was observed with a polarizing microscope to measure the tilt angles of the optical axes derived from the liquid crystal compound from the aligned film interface side toward the air interface side interface, and the average value thereof was calculated as the average tilt angle. In the measurement, the average tilt angle was substantially 20 degrees.

The pre-tilt angle on the air interface side was substantially 30 degrees. Regarding the pre-tilt angle on the aligned film interface side, the pre-tilt angle of the liquid crystal having an orientation perpendicular to a plane formed between the second exposure orientation and the substrate normal direction was substantially 0 degrees, and the pre-tilt angle of the liquid crystal compound having an orientation parallel to a plane formed between the second exposure orientation and the substrate normal direction was substantially 10 degrees. In addition, the tilt angle of the liquid crystal compound having an orientation between the interfaces gradually changed from 30 degrees to 10 degrees.

Comparative Example 22

An optical element was prepared using the same method as that of Comparative Example 21.

Example 24

An alignment film was formed using the same method as that of Comparative Example 1, except that only the exposure of the alignment film was changed as follows.

(Exposure of Alignment Film)

An alignment film including the alignment pattern was prepared using the same method as that of the exposure of the alignment film in Comparative Example 1, except that the intersection angle between two laser beams was changed. Further, the interference fringes of the alignment pattern was exposed to laser light depolarized with a depolarizer (depolarization element) in a direction (referred to as "second exposure orientation") of any one of two azimuthal angles perpendicular to each other at an angle of 45° from the normal direction of the substrate at an exposure dose of 200 mJ/cm². As a result, the alignment film was imparted with a function of pre-tilting the liquid crystal compound in a direction perpendicular to the second exposure orientation. As a result, the alignment film was formed.

(Formation of First Optically-Anisotropic Layer)

A first optically-anisotropic layer was formed using the same method as that of the second optically-anisotropic layer according to Example 21.

(Measurement of Average Tilt Angle)

The first optically-anisotropic layer was cut with a microtome, and a cross-section was observed with a polarizing microscope to measure the tilt angles of the optical axes derived from the liquid crystal compound from the aligned film interface side toward the air interface side interface, and the average value thereof was calculated as the average tilt angle. In the measurement, the average tilt angle was substantially 25 degrees. In addition, the tilt angle of the liquid crystal compound having an orientation between the interfaces was substantially uniform.

(Formation of Alignment Film)

A corona treatment was performed on the surface of the formed first optically-anisotropic layer. An alignment film-forming coating solution was continuously applied to the first optically-anisotropic layer on which the corona treatment was performed using a #2 wire bar with the same method as that of the formation of the alignment film in Comparative Example 1. The support on which the coating film of the alignment film-forming coating solution was formed was dried using a hot plate at 60° C. for 60 seconds. As a result, an alignment film was formed.

(Exposure of Alignment Film)

The first optically-anisotropic layer prepared as described was rotated by 180° and provided, and the alignment film was exposed as described above.

(Formation of Second Optically-Anisotropic Layer)

A second optically-anisotropic layer was formed using the same method as that of the first optically-anisotropic layer.

(Measurement of Average Tilt Angle)

The second optically-anisotropic layer was cut with a microtome, and a cross-section was observed with a polarizing microscope to measure the tilt angles of the optical axes derived from the liquid crystal compound from the aligned film interface side toward the air interface side interface, and the average value thereof was calculated as the average tilt angle. In the measurement, the average tilt angle was substantially 25 degrees. In addition, the tilt angle of the liquid crystal compound having an orientation between the interfaces was substantially uniform. The tilt orientation of the liquid crystal compound was different from that of the first optically-anisotropic layer by 180°.

[Evaluation]

—Measurement of Diffraction Angle—

Regarding each of the optical elements according to Examples 21 to 24 and Comparative Examples 21 and 22, light was caused to be incident into the surface of the optically-anisotropic layer through the support of the optical element, and the diffraction angle of the transmitted and diffracted light was measured. Specifically, laser light as right circularly polarized light having an output center wavelength of 531 nm was caused to be incident into one surface of the optical element, that is, one surface of the optically-anisotropic layer from a position at a distance of 50 cm in the normal direction, and a spot of the transmitted and diffracted light was captured with a screen disposed at a distance of 50 cm from the another surface of the optical element to calculate the diffraction angle. The angle of the incidence light into the optical element was evaluated using the value shown in Table 1.

—Measurement of Light Intensity—

The intensity of the diffracted light $L_t$ was calculated using the same method as that of Example 1.

A ratio between the light intensity of the diffracted light $L_t$ and the light intensity of the light L was obtained to obtain the value of the relative light intensity of the diffracted light $L_t$ relative to the incidence light. The angle of the incidence light into the optical element was evaluated using the value shown in Table 1.

By causing laser light to be incident at different incidence angles, the respective relative light intensity values were obtained, the light intensity increase rate of Example relative to Comparative Example was evaluated using the average value of the relative light intensity values.

A: the light intensity increase rate was 20% or higher

B: the light intensity increase rate was 10% or higher and lower than 20%

C: the light intensity increase rate was 5% or higher and lower than 10%

D: the light intensity increase rate was less than 5%

The results are shown in Table 1.

Comparative Example 21 and Examples 21 to 23 were compared, and Comparative Example 22 and Example 24 were compared to each other.

TABLE 1

|  |  | Comparative Example 21 | Example 21 | Example 22 | Example 23 | Comparative Example 22 | Example 24 |
|---|---|---|---|---|---|---|---|
| First Optically-Anisotropic Layer | Pitch [μm] | 1.5 | 1.5 | 1.5 | 1.5 | 1.5 | 1.5 |
|  | Average Tilt angle [°] | 0 | 10 | 0 | 10 | 0 | 25 |
|  | Tilt Orientation [°] | — | 0 | 0 | 0 | — | 0 |
| Second Optically-Anisotropic Layer | Pitch [μm] | — | 1.5 | 1.5 | 1.5 | — | 1.5 |
|  | Average Tilt angle [°] | — | 25 | 25 | 20 | — | 25 |
|  | Tilt Orientation [°] | — | 0 | 0 | 0 | — | 180 |
| Evaluation | Incidence Angle 1 [°] | 0 | 0 | 0 | 0 | 20 | 20 |
|  | Incidence Angle 2 [°] | 20 | 20 | 20 | 20 | −20 | −20 |
|  | Evaluation of Light Intensity Increate Rate | — | A | A | A | — | A |

As shown in the results, the light intensity increase rates of Examples 21 to 24 at the different incidence angles were determined compared to that of Comparative Example. The reason for this was presumed to be that the liquid crystal compound was tilted such that the effect of birefringence of the optically-anisotropic layer in the diffraction direction increased. As a result, the diffraction efficiency increased, and a high light intensity was obtained.

Comparative Example 23

An optical element was prepared using the same method as that of the exposure of the alignment film in Comparative Example 1, except that the intersection angle between two laser beams was changed.

Example 25

An optical element was prepared using the same method as that of the exposure of the alignment film in Example 24, except that the intersection angle between two laser beams was changed.

[Evaluation]

The light intensity increase rates of Comparative Example 23 and Example 25 were compared to each other. The light intensity increase rate was evaluated using the same method as that of Comparative Example 21 and Example 21, except that laser beams (right circularly polarized light and left circularly polarized light) having different polarization states were caused to be vertically incident into the optical element.

The results are shown in Table 2.

TABLE 2

|  |  | Comparative Example 23 | Example 25 |
|---|---|---|---|
| First Optically-Anisotropic Layer | Pitch [μm] | 0.8 | 0.8 |
|  | Average Tilt angle [°] | 0 | 25 |
|  | Tilt Orientation [°] | — | 0 |
| Second Optically-Anisotropic Layer | Pitch [μm] | — | 0.8 |
|  | Average Tilt angle [°] | — | 25 |
|  | Tilt Orientation [°] | — | 180 |
| Evaluation | Incidence Angle [°] | 0 | 0 |
|  | Incident Polarized Light 1 | Right | Right |
|  | Incident Polarized Light 2 | Circularly Polarized Light Left Circularly Polarized Light | Circularly Polarized Light Left Circularly Polarized Light |
|  | Evaluation of Light Intensity Increate Rate | — | A |

As shown in the results, the light intensity increase rate of Example 25 in the different incidence polarization states were determined compared to that of Comparative Example. The reason for this was presumed to be that the liquid crystal compound was tilted such that the effect of birefringence of the optically-anisotropic layer in the diffraction direction increased. As a result, the diffraction efficiency increased, and a high light intensity was obtained.

Comparative Example 31

(Formation of First Cholesteric Liquid Crystal Layer)

A cholesteric liquid crystal layer that had a selective reflection center wavelength of 530 nm and reflected right circularly polarized light was formed using the same method as that of the exposure of the alignment film in Comparative Example 11, except that the intersection angle between two laser beams was changed. This cholesteric liquid crystal layer was set as the first cholesteric liquid crystal layer.

(Measurement of Average Tilt Angle)

The first cholesteric liquid crystal layer was cut with a microtome, and a cross-section was observed with a polarizing microscope to measure the tilt angles of the optical axes derived from the liquid crystal compound from the aligned film interface side toward the air interface side interface, and the average value thereof was calculated as the average tilt angle. In the measurement, the average tilt angle was substantially 0 degrees.

(Formation of Alignment Film)

A corona treatment was performed on the surface of the formed first cholesteric liquid crystal layer. An alignment film-forming coating solution was continuously applied to the first cholesteric liquid crystal layer on which the corona treatment was performed using a #2 wire bar with the same method as that of the formation of the alignment film in Comparative Example 11. The support on which the coating film of the alignment film-forming coating solution was formed was dried using a hot plate at 60° C. for 60 seconds. As a result, an alignment film was formed.

(Exposure of Alignment Film)

The alignment film was exposed using the same method as that of the formation of the first cholesteric liquid crystal layer.

(Formation of Second Cholesteric Liquid Crystal Layer)

A second cholesteric liquid crystal layer that had a selective reflection center wavelength of 530 nm and reflected left circularly polarized light was formed using the same method as that of the first cholesteric liquid crystal layer, except that the composition was changed to the following composition A-31.

Composition A-31

| | |
|---|---|
| Rod-shaped liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-2 | 9.50 parts by mass |
| Leveling agent T-1 | 0.08 parts by mass |
| Methyl ethyl ketone | 1180.00 parts by mass |

Chiral agent Ch-2

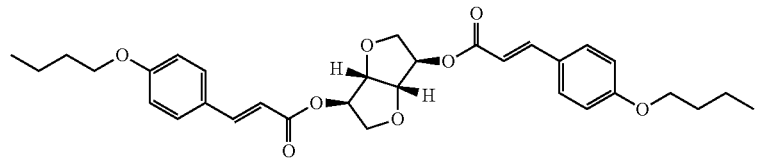 [SMILES: CCCCOc1ccc(/C=C/C(=O)O[C@@H]2CO[C@@H]3[C@H]2OC[C@H]3OC(=O)/C=C/c2ccc(OCCCC)cc2)cc1]

(Measurement of Average Tilt Angle)

The second cholesteric liquid crystal layer was cut with a microtome, and a cross-section was observed with a polarizing microscope to measure the tilt angles of the optical axes derived from the liquid crystal compound from the aligned film interface side toward the air interface side interface, and the average value thereof was calculated as the average tilt angle. In the measurement, the average tilt angle was substantially 0 degrees.

Example 31

(Formation of First Cholesteric Liquid Crystal Layer)

A first cholesteric liquid crystal layer that had a selective reflection center wavelength of 530 nm and reflected right circularly polarized light was formed using the same method as that of the first optically-anisotropic layer according to Example 24, except that the composition was changed to the following composition A-32.

Composition A-32

| | |
|---|---|
| Rod-shaped liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-1 | 5.68 parts by mass |
| Leveling agent T-2 | 0.20 parts by mass |
| Leveling agent T-3 | 0.25 parts by mass |
| Methyl ethyl ketone | 1180.00 parts by mass |

(Measurement of Average Tilt Angle)

The first cholesteric liquid crystal layer was cut with a microtome, and a cross-section was observed with a polarizing microscope to measure the tilt angles of the optical axes derived from the liquid crystal compound from the aligned film interface side toward the air interface side interface, and the average value thereof was calculated as the average tilt angle. In the measurement, the average tilt angle was substantially 25 degrees.

(Exposure of Alignment Film)

A corona treatment was performed on the surface of the formed first cholesteric liquid crystal layer. An alignment film was formed on the first cholesteric liquid crystal layer on which the corona treatment was performed using the same method as that Comparative Example 31.

The exposure was performed using the same method as that of the exposure of the alignment film during the formation of the first cholesteric liquid crystal layer, except that the irradiation orientation of laser light depolarized with a depolarizer (depolarization element) was changed to a different orientation by 180°.

(Formation of Second Cholesteric Liquid Crystal Layer)

A second cholesteric liquid crystal layer that had a selective reflection center wavelength of 530 nm and reflected left circularly polarized light was formed using the same method as that of the second cholesteric liquid crystal layer according to Comparative Example 31, except that the composition was changed to the following composition A-33.

Composition A-33

| | |
|---|---|
| Rod-shaped liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-2 | 9.50 parts by mass |
| Leveling agent T-2 | 0.20 parts by mass |
| Leveling agent T-3 | 0.25 parts by mass |
| Methyl ethyl ketone | 1180.00 parts by mass |

(Measurement of Average Tilt Angle)

The second cholesteric liquid crystal layer was cut with a microtome, and a cross-section was observed with a polarizing microscope to measure the tilt angles of the optical axes derived from the liquid crystal compound from the aligned film interface side toward the air interface side interface, and the average value thereof was calculated as the average tilt angle. In the measurement, the average tilt angle was substantially 25 degrees.

[Evaluation]

—Measurement of Diffraction Angle—

Regarding each of the optical elements according to Example 31 and Comparative Example 31, light was caused to be vertically incident into the surface of the optically-anisotropic layer through the support of the optical element, and the diffraction angle of the reflected and diffracted light was measured. Specifically, laser light as right circularly polarized light and left circularly polarized light having an output center wavelength of 531 nm was caused to be vertically incident into one surface of the optical element, that is, one surface of the optically-anisotropic layer from a position at a distance of 50 cm in the normal direction, and a spot of the reflected and diffracted light was captured with a screen disposed at a distance of 50 cm from the one surface of the optical element to calculate the diffraction angle.

—Measurement of Light Intensity—

Figure 17:
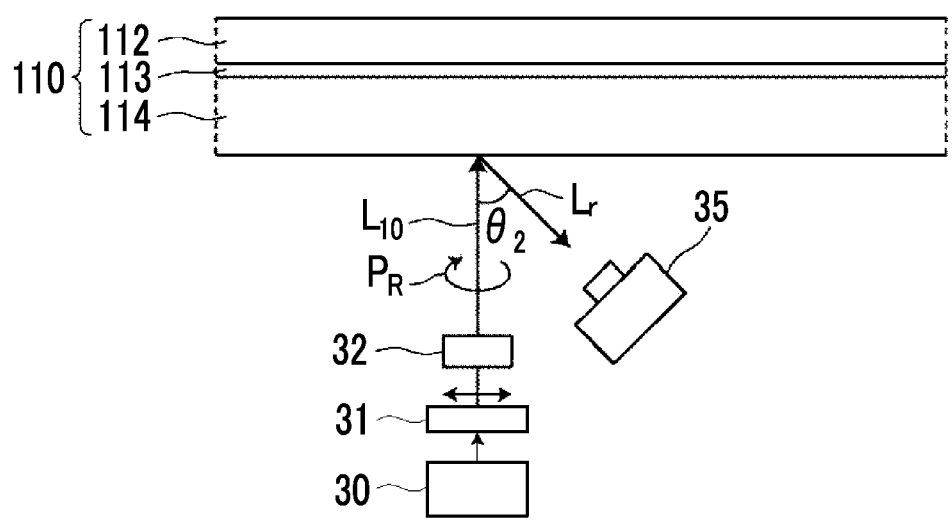
FIG. 17 is a diagram showing the summary of the method of measuring a light intensity.

Using a measurement system shown in FIG. 17, the light intensity was measured.

Semiconductor laser light having a wavelength of 531 nm emitted from the semiconductor laser 30 was caused to transmit through the linear polarizer 31 and the $\lambda/4$ plate 32. As a result, light $L_{10}$ of right circularly polarized light $P_R$ was obtained. The light $L_{10}$ was caused to be incident into the surface of the optically-anisotropic layer 114. In this case, the intensity of the diffracted light $L_r$ that was reflected and diffracted at the diffraction angle θ2 due to the diffraction effect and the selective reflection effect of the optically-anisotropic layer 114 was measured using the photodetector 35. A ratio between the light intensity of the diffracted light $L_r$ and the light intensity of the light $L_{10}$ was obtained to obtain the value of the relative light intensity of the diffracted light $L_r$ relative to the incidence light. In addition, in a case the polarization state was set to left circularly polarized light $P_L$, the value of the relative light intensity was measured using the same method. The light intensity increase rate of Example relative to Comparative Example was evaluated using the average value of the relative light intensity of the incidence light having different polarization states (right circularly polarized light and left circularly polarized light).

A: the light intensity increase rate was 20% or higher

B: the light intensity increase rate was 10% or higher and lower than 20%

C: the light intensity increase rate was 5% or higher and lower than 10%

D: the light intensity increase rate was less than 5%

The results are shown in Table 3.

TABLE 3

|  |  | Comparative Example 31 | Example 31 |
|---|---|---|---|
| First Optically-Anisotropic Layer | Pitch [μm] | 0.8 | 0.8 |
|  | Average Tilt angle [°] | 0 | 25 |
|  | Helical Twisted Direction | Right Twisted | Right Twisted |
|  | Tilt Orientation [°] | — | 0 |
| Second Optically-Anisotropic Layer | Pitch [μm] | 0.8 | 0.8 |
|  | Average Tilt angle [°] | 0 | 25 |
|  | Helical Twisted Direction | | |
|  | Tilt Orientation [°] | — | 180 |

TABLE 3-continued

|  |  | Comparative Example 31 | Example 31 |
|---|---|---|---|
| Evaluation | Incidence Angle [°] | 0 | 0 |
|  | Incident Polarized Light 1 | Right Circularly Polarized Light | Right Circularly Polarized Light |
|  | Incident Polarized Light 2 | Left Circularly Polarized Light | Left Circularly Polarized Light |
|  | Evaluation of Light Intensity Increate Rate | — | A |

As shown in the results, the light intensity increase rate of Example 31 in the different incidence polarization states were determined compared to that of Comparative Example. The reason for this was presumed to be that the liquid crystal compound was tilted such that the effect of birefringence of the optically-anisotropic layer in the diffraction direction increased. As a result, the diffraction efficiency increased, and a high light intensity was obtained.

EXPLANATION OF REFERENCES 10, 110, 110A, 110B: optical element
12, 112, 112A, 112B: support
13, 113: alignment film
14, 14a to 14e, 34, 114, 114A, 114B: optically-anisotropic layer
18: second support
20: liquid crystal compound
22: optical axis
24: equiphase surface
30: laser
31: linear polarizer
32: $\lambda/4$ plate
35: photodetector
50: exposure device
52: semiconductor laser
54: light source
56: polarization beam splitter
58A, 58B: mirror
60A, 60B: $\lambda/4$ plate
70: laser light
72A, 72B: beam
80: support
82: alignment film
90: head-mounted display
92: liquid crystal display device
94: light guide member

What is claimed is:

1. An optical element comprising:
   at least one optically-anisotropic layer that is formed using a composition including a liquid crystal compound,
   wherein at least one of the optically-anisotropic layers has a liquid crystal alignment pattern in which a direction of an optical axis derived from the liquid crystal compound changes while continuously rotating in at least one in-plane direction,
   the optically-anisotropic layer has a region in which an alignment direction of a liquid crystal compound in at least one of upper and lower interfaces has a pre-tilt angle with respect to the interface, and
   a tilt azimuth direction of the liquid crystal compound is constant in a region in which one period of the liquid crystal alignment pattern is constant when viewed in a cross section along the one in-plane direction.

2. The optical element according to claim 1,
wherein in the at least one interface, the region having a pre-tilt angle and a region not having a pre-tilt angle are periodically present.

3. The optical element according to claim 1,
wherein the optically-anisotropic layer has a region having twisting properties in a thickness direction.

4. The optical element according to claim 1,
wherein in the optically-anisotropic layer, the liquid crystal compound is cholesterically aligned in a thickness direction.

5. The optical element according to claim 1, comprising:
two or more optically-anisotropic layers having different alignment patterns.

6. The optical element according to claim 5,
wherein the two or more optically-anisotropic layers have different pre-tilt angles.

7. The optical element according to claim 5,
wherein the two or more optically-anisotropic layers have the same tilt orientation with respect to the interface of the optical axis derived from the liquid crystal compound.

8. The optical element according to claim 5,
wherein the two or more optically-anisotropic layers have different tilt orientations with respect to the interface of the optical axis derived from the liquid crystal compound.

9. The optical element according to claim 5,
wherein the two or more optically-anisotropic layers have different average values of tilt angles in a thickness direction with respect to the interface of the optical axis derived from the liquid crystal compound.

10. The optical element according to claim 1,
wherein at least one of the optically-anisotropic layers has a region having different tilt angles of optical axes derived from the liquid crystal compound in a thickness direction.

11. The optical element according to claim 1,
wherein in a case where a length over which the direction of the optical axis derived from the liquid crystal compound rotates by 180° in a plane is set as a single period, at least one of the optically-anisotropic layers has regions having different lengths of the single periods in a plane.

12. The optical element according to claim 3,
wherein at least one of the optically-anisotropic layers has a region where a tilt angle of twist in a thickness direction with respect to at least one of interfaces of an equiphase surface and a tilt angle of the optical axis derived from the liquid crystal compound in the thickness direction are different from each other in the thickness direction.

13. The optical element according to claim 1, further comprising:
a patterned alignment film that is laminated on one surface of at least one surface of the optically-anisotropic layer.

* * * * *